US008107320B2

(12) United States Patent
Novick et al.

(10) Patent No.: US 8,107,320 B2
(45) Date of Patent: Jan. 31, 2012

(54) AUTONOMOUS SONAR SYSTEM AND METHOD

(75) Inventors: Arnold W. Novick, Providence, RI (US); Michael F. Janik, Portsmouth, RI (US); Thomas J. McHale, Portsmouth, RI (US); Ilya Rozenfeld, North Providence, RI (US); Kenneth J. McPhillips, Warren, RI (US); John R. Short, Portsmouth, RI (US); James W. Casalegno, Bristol, RI (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 12/401,953

(22) Filed: Mar. 11, 2009

(65) Prior Publication Data

US 2009/0257312 A1 Oct. 15, 2009

Related U.S. Application Data

(60) Provisional application No. 61/035,870, filed on Mar. 12, 2008.

(51) Int. Cl.
*G01S 3/80* (2006.01)
(52) U.S. Cl. ...................................................... 367/118
(58) Field of Classification Search .................. 367/118, 367/119
See application file for complete search history.

(56) References Cited

U.S. PATENT DOCUMENTS

| | | | |
|---|---|---|---|
| 4,312,053 A | 1/1982 | Lipsky | |
| 4,473,896 A | 9/1984 | Loeser et al. | |
| H374 H * | 11/1987 | Abo-Zena et al. | 342/378 |
| 5,175,710 A | 12/1992 | Hutson | |
| 5,218,359 A | 6/1993 | Minamisono | |
| 5,305,286 A | 4/1994 | Woodsum et al. | |
| 5,357,484 A | 10/1994 | Bates et al. | |
| 5,420,827 A | 5/1995 | Feintuch | |
| 5,481,505 A * | 1/1996 | Donald et al. | 367/118 |
| 5,495,256 A * | 2/1996 | Piper | 342/195 |
| 5,565,764 A | 10/1996 | Priebe et al. | |
| 6,009,045 A * | 12/1999 | Yang et al. | 367/119 |
| 6,160,758 A | 12/2000 | Spiesberger | |

(Continued)

FOREIGN PATENT DOCUMENTS

EP 1 271 175 A1 1/2003

(Continued)

OTHER PUBLICATIONS

Novick, et al.; "Systems and Methods for Detection and Analysis of Amplitude Modulation of Underwater Sound;" U.S. Appl. No. 12/040,123, filed Feb. 29, 2008.

(Continued)

*Primary Examiner* — Daniel Pihulic
(74) *Attorney, Agent, or Firm* — Daly, Crowley, Mofford & Durkee, LLP

(57) ABSTRACT

An autonomous sonar system and method provide an arrangement capable of beamforming in three dimensions, detecting loud targets, adaptively beamforming in three dimensions to avoid the loud targets, detecting quiet targets, localizing the loud or quiet targets in range, bearing, and depth, detecting modulation of noise associated with propellers of the loud or quiet targets, generating three dimensional tracks of the loud or quiet targets in bearing, range and depth, making classification of the loud or quiet targets, assigning probabilities to the classifications, and generating classification reports according to the classifications for communication to a receiving station, all without human assistance.

24 Claims, 30 Drawing Sheets

U.S. PATENT DOCUMENTS

| | | | |
|---|---|---|---|
| 6,288,973 | B1 | 9/2001 | Joynes |
| 6,307,810 | B1 | 10/2001 | Shany et al. |
| 6,400,647 | B1 | 6/2002 | Huntress |
| 6,466,891 | B1 | 10/2002 | Carter et al. |
| 7,266,042 | B1 | 9/2007 | Gent et al. |
| 7,307,914 | B1 * | 12/2007 | Carter .......................... 367/118 |
| 7,315,488 | B2 | 1/2008 | Novick et al. |
| 7,738,319 | B2 * | 6/2010 | Novick .......................... 367/125 |
| 7,773,458 | B2 * | 8/2010 | Novick et al. ................. 367/119 |
| 2001/0019516 | A1 | 9/2001 | Wake et al. |
| 2003/0223311 | A1 | 12/2003 | Breed et al. |
| 2006/0133211 | A1 | 6/2006 | Yang |
| 2007/0280051 | A1 | 12/2007 | Novick et al. |
| 2008/0219099 | A1 | 9/2008 | Novick |
| 2009/0122649 | A1 | 5/2009 | Novick et al. |
| 2009/0257312 | A1 | 10/2009 | Novick et al. |

FOREIGN PATENT DOCUMENTS

| | | |
|---|---|---|
| GB | 1 430 051 | 3/1976 |
| WO | WO 2007/145761 A2 | 12/2007 |
| WO | WO 2007/145761 A3 | 12/2007 |
| WO | WO 2008/112445 A1 | 9/2008 |
| WO | WO 2009114578 A1 * | 9/2009 |

OTHER PUBLICATIONS

Papadopoulos et al.; "Implementation of an Intelligent Instrument for Passive Recognition and Two-Eimensional Location Estimation of Acoustic Targets;" IEEE Transactions on Instrumentation and Measurement; vol. 41, No. 9; Dec. 1992; pp. 885-980.
Spiesberger; "Finding the right cross-correlation peak for locating sounds in multipath environments with a fourth-moment function;" J. Acoust, Soc. Am.; vol. 108 (3), Pt. 1; Sep. 2000; pp. 1349-1352.
Spiesberger; "Identifying cross-correlation peaks due to multipaths with application to optimal passive localization of transient signals and tomographic mapping of the environment;" J.Acoust. Soc. Am.; vol. 100 (2), Pt. 1; Aug. 1996; pp. 910-917.
Spiesberger; "Linking auto- and cross-correlation functions with correlation equations: Application to estimating the relative travel times and amplitudes of multipath;" J. Acoust. Soc. Am.; vol. 104 (1); Jul. 1998; pp. 300-312.
PCT International Preliminary Report on Patentability and Written Opinion of the International Bureau dated Dec. 14, 2009 for PCT/US2007/011653 filed on May 15, 2007.
PCT International Search Report & Written Opinion of the ISA dated Apr. 1, 2008 for PCT/US2007/011653 filed on May 15, 2007.
PCT International Search Report & Written Opinion of the ISA dated Jul. 9, 2007 for PCT/US2008/055445 filed on Feb. 29, 2008.
PCT International Search Report & Written Opinion of the IDS dated Jun. 25, 2008 for PCT/US2008/054076 filed on Feb. 15, 2008.
U.S. Appl. No. 11/422,435, filed Jun. 6, 2006; 138 pages.
U.S. Appl. No. 12/040,123, filed Feb. 29, 2008; 115 pages.
U.S. Appl. No. 11/683,712, filed Mar. 8, 2007; 236 pages.
European Office Action dated Oct. 27, 2009 from EP Pat. App. No. 07809087.5.
Response to European Office Action dated Oct. 27, 2009 filed to the EPO on Feb. 17, 2010 from EP Pat. App. No. 07809087.5.
International Preliminary Report on Patentability; PCT/US2008/055445 dated Sep. 24, 2009; 8 pages.
International Preliminary Report on Patentability, PCT/US2008/054076 dated Sep. 17, 2009, 14 pages.
U.S. Appl. No. 12/040,123, filed Feb. 29, 2008; pp. 1-400.
U.S. Appl. No. 12/040,123, filed Feb. 29, 2008; pp. 1-383.
U.S. Appl. No. 11/683,712, filed Mar. 8, 2007; pp. 1-301.
Morgera et al.; "Source-Oriented Adaptive Beamforming;" Circuits Systems Signal Process, vol. 2, No. 4; XP008108350; Dec. 1983; pp. 487-516.
PCT International Search Report and Written Opinion of the ISA dated Jul. 22, 2009 for PCT/US2009/036731 filed on Mar. 11, 2009.
AU Official Communication dated May 31, 2010 for EP2007259330; 2 sheets.
PCT International Preliminary Report on Patentability of the ISA mailed on Sep. 23, 2010 for PCT/US2009/036731; 8 sheets.
AU Official Communication dated Jun. 20, 2010; for AU Pat. App. No. AU2007259330; 3 sheets.
AU Response as filed on Apr. 19, 2011 to Australian Official Communication dated Jun. 20, 2010; for AU Pat. App. No. AU2007259330; 71 sheets.

* cited by examiner

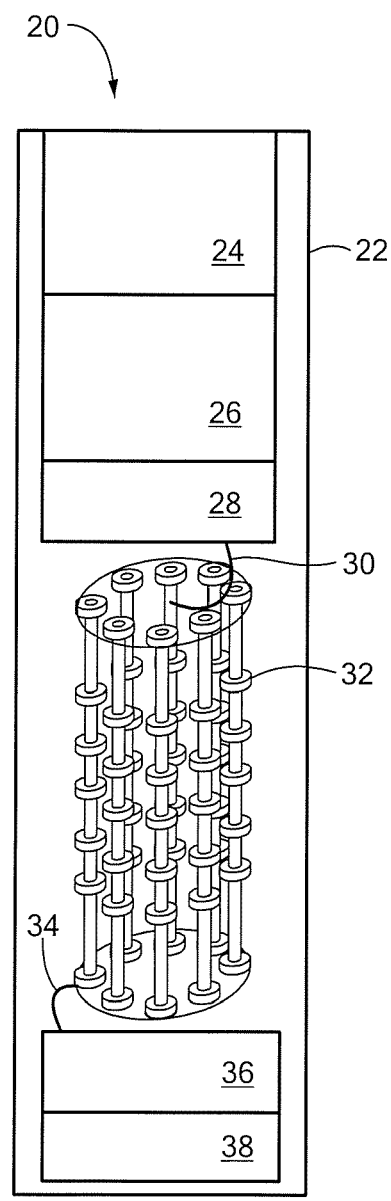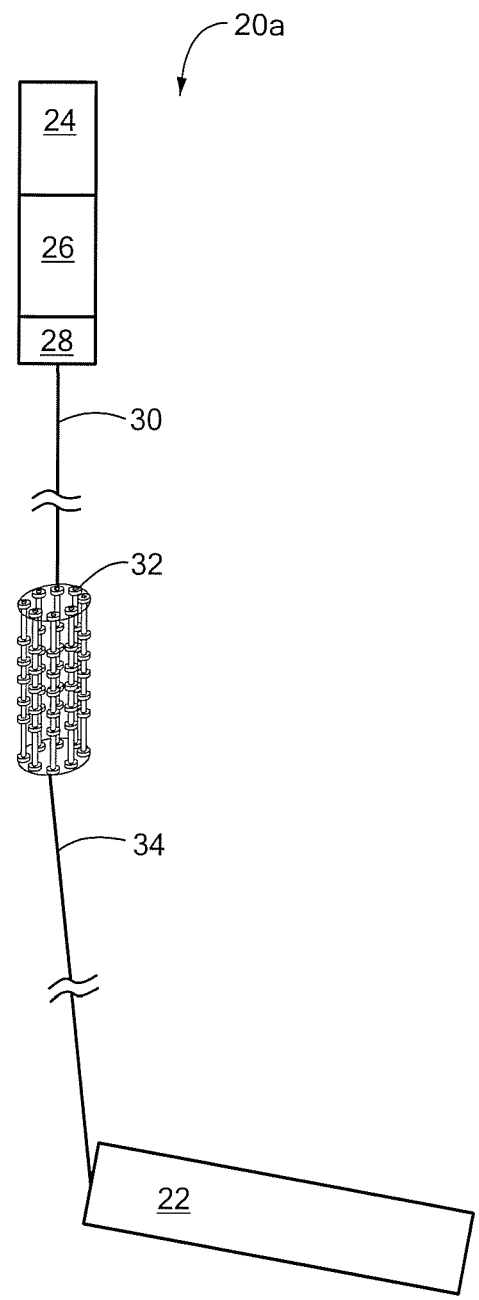
FIG. 2
FIG. 2A

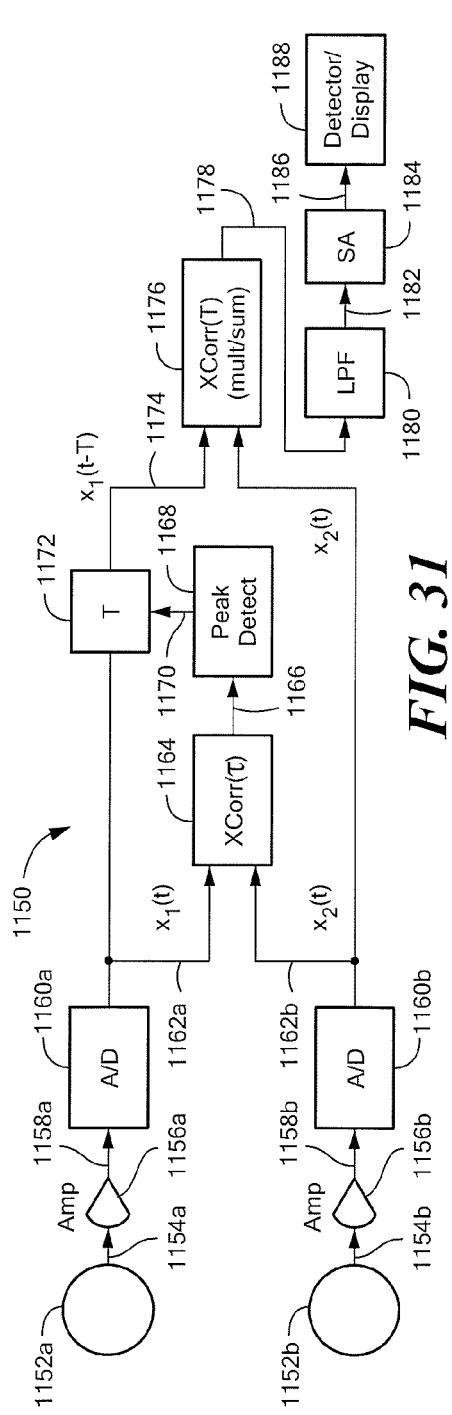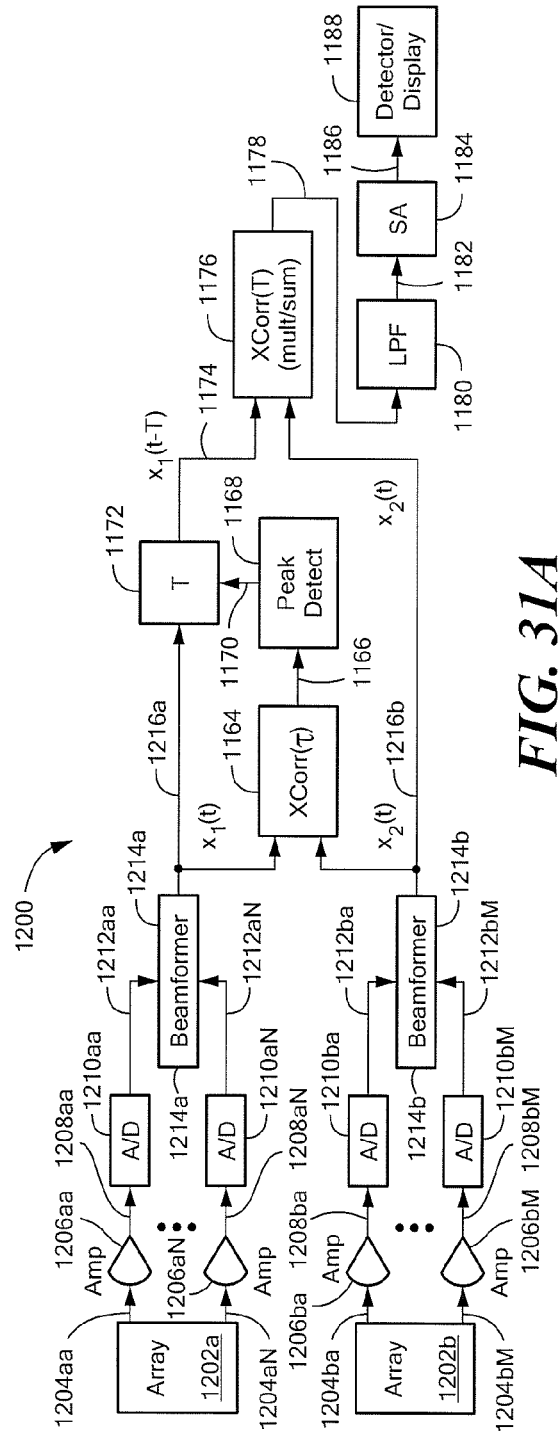
FIG. 31
FIG. 31A

AUTONOMOUS SONAR SYSTEM AND METHOD

CROSS REFERENCE TO RELATED APPLICATIONS

This application claims the benefit under 35 U.S.C. §119 (e) of U.S. Provisional Application No. 61/035,870 filed Mar. 12, 2008, which application is incorporated herein by reference in its entirety.

FIELD OF THE INVENTION

This invention relates generally to sonar systems and method and, more particularly, to an autonomous sonar system and method, which can perform complex sonar signal processing without human assistance.

BACKGROUND OF THE INVENTION

It is known that an underwater vessel (i.e., a submarine) generates sound as it travels through the water. The sound is generated by a variety of sources, including, but not limited to, sound generated by a submarine propulsion system, sound generated by a submarine propeller, and sound generated by a submarine electrical power generator. It is known that submarine designers attempt to reduce these and other sound sources in order to make a submarine difficult to detect by passive acoustic means, therefore remaining as covert as possible.

Some anti-submarine warfare (ASW) sonar systems attempt to detect the underwater sound generated by a submarine. Some other ASW sonar systems attempt to both detect the sound and also to localize and/or track the submarine. Localization is used to identify a position of the enemy submarine in azimuth, and/or in range, and/or in depth. Conventional systems that localize and track a source of sound require a substantial amount of human assistance.

Some known sonar systems use autonomous portions. For example, sonobuoy systems use one or more sonobuoys, which are autonomous free-floating units, some types of which are capable of providing beamforming processing to generate receive beams. Conventional sonobuoys provide output signals representative of only sound in the water, but, by themselves, are not capable of detecting, localizing, tracking, or classifying targets in the water. Furthermore, in general, the receive beam provided by a sonobuoy are statically steered only to fixed azimuthal or vertical angles.

Sonobuoy systems include not only the autonomous one or more sonobuoys, but also must include another asset, for example, an aircraft, with more advanced processing capabilities to receive the signals from the one or more sonobuoys. It is the other asset, e.g., the aircraft, which is configured to detect, localize, track, and classify targets. Within the aircraft, the detection, localization, tracking, and classification are performed with substantial human assistance.

As with the sonobuoy systems, some shipboard conventional passive sonar systems can beamform, detect, localize, track and classify a submarine. However, these systems are not autonomous and they rely upon a large amount of human assistance. For example, one type of conventional ship-board sonar system may beamform with an acoustic array, for example, a towed array, partially process the beamformed signals, and provide on a computer monitor a visual display of the partially-processed information. The visual display can have a variety of forms. One such form of display is a waterfall frequency domain display. A human operator may visually detect a submarine (i.e., make a detection and a classification) by way of the visual display, for example, by visual recognition of spectral line patterns representative of a narrowband frequency of sound generated by the submarine. The human operator may then assist in localizing and tracking the submarine.

It will be appreciated that identifying (detecting) the relatively quiet submarine from within a large number of relatively loud ships in the same area can be a formidable problem. Furthermore, it will be appreciated that localizing, tracking, and classifying the submarine once detected is also a formidable problem.

Even at relatively short ranges, localization in depth and range is not generally possible by conventional passive sonar systems, even with human assistance. This is because for any receive beam and associated vertical angle that points toward a submarine, the submarine can be positioned at an essentially infinite number of depths and ranges along the vertical beam steering angle.

At longer ranges, localization of the submarine in range and depth is made even more difficult by a variety of factors, including but not limited to, a tendency of the sound generated by the submarine to bend (i.e. refract), primarily in a vertical direction, as the sound propagates through the water. Therefore, the vertical angle of arrival at which the greatest amount of sound arrives at the sonar system, which is related to a particular receive vertical beam angle, does not necessarily point directly toward the submarine.

With human assistance, (i.e., in non-autonomous arrangements) a variety of processing techniques are used by conventional passive sonar systems. For example, some passive sonar systems use narrowband spatial processing. Narrowband matched field processing is a known technique used to localize a submarine in range and in depth. Narrowband processing generally requires a large sonar array, which is not practical for many applications. Narrowband matched field processing also suffers from the effects of the above-described sound refraction.

For another example, with human assistance, some passive sonar systems use broadband processing. Broadband autocorrelation processing is a known technique in which a signal received by a sonar element (i.e., sonar transducer), or a sonar array, is autocorrelated to identify a relative time delay between the sound arriving at the sonar element on a direct sound path and the sound arriving at the sonar element on a surface-reflected sound path. The relative time delay can be used to calculate range and depth. However, the performance of this technique can be greatly degraded at moderate to high sea states (i.e., when the sea surface has high waves) due to scattering of the sound reflected from the surface, which causes the autocorrelation to degrade.

Some sounds in the water tend to be amplitude modulated by the sound field emitted by a vessel's propellers. In particular, broadband sound received by the passive sonar system can be amplitude modulated in a manner related to characteristics of the propeller.

For yet another example, some passive sonar systems use amplitude modulation of the received sound in order to identify characteristics of the propeller, for example, rotation speed and number of propeller blades. With this information, the passive sonar systems, with human assistance, may be able to classify the type of vessel, including, but not limited to, whether the vessel is a surface vessel or a submarine. The processing can be of a type referred to as "detection of envelope modulation on noise." One conventional type of detection of envelope modulation on noise is conventionally referred to as DEMON.

In addition, some passive sonar systems use adaptive beamforming, wherein receive beams are steered so as to reduce their response in the directions of noise sources in the water, e.g., surface ships, that are not of interest.

It would be desirable to provide an autonomous system that can adaptively beamform, and also detect, localize, track, and classify sound generated by targets in the water, all without human assistance.

SUMMARY OF THE INVENTION

In accordance with one aspect of the present invention, an autonomous acoustic signal processing system includes a vertical beamformer coupled to receive a plurality of hydrophone signals from a corresponding plurality of hydrophones responsive to sound in water. The vertical beamformer is configured to form a plurality of vertical receive beam signals. The plurality of vertical receive beam signals are representative of a respective plurality of acoustic receive beams non-directional in azimuth and directional in elevation. The system further includes an azimuth beamformer coupled to receive the plurality of vertical receive beam signals and configured to form a plurality of directional receive beam signals. The plurality of directional receive beam signals are representative of a respective plurality of acoustic receive beams directional in azimuth and directional in elevation. The system further includes a loud target detection module coupled to receive the plurality of directional receive beam signals and configured to generate detections and to determine directions of one or more loud targets associated with the plurality of directional receive beam signals. The system further includes a matrix module coupled to receive the plurality of vertical receive beam signals, coupled to receive the detections of the one or more loud targets, and coupled to receive the directions of the one or more loud targets. The matrix module is configured to generate a covariance matrix in accordance with the plurality of vertical receive beam signals, and further configured to generate a modified covariance matrix in accordance with the detections of and directions of the loud targets.

In accordance with another aspect of the present invention, a computer-implemented method of autonomous acoustic signal processing includes forming a plurality of vertical receive beam signals using a plurality of hydrophone signals. The plurality of vertical receive beam signals are representative of a respective plurality of acoustic receive beams non-directional in azimuth and directional in elevation. The method further includes forming a plurality of directional receive beam signals using the plurality of vertical receive beam signals. The plurality of directional receive beam signals are representative of a respective plurality of acoustic receive beams directional in azimuth and directional in elevation. The method further includes generating detections of and directions of one or more loud targets associated with the plurality of directional receive beam signals. The method further includes generating a covariance matrix in accordance with the plurality of vertical receive beam signals, and generating a modified covariance matrix in accordance with the detections of and directions of the loud targets.

The system and method described above provide arrangements that can autonomously perform a substantial amount acoustic signal processing. The system and method can be configured to autonomously detect, track, classify, and report the presence of quiet targets, for example, submarine targets, which may be operating in densely trafficked areas.

BRIEF DESCRIPTION OF THE DRAWINGS

The foregoing features of the invention, as well as the invention itself may be more fully understood from the following detailed description of the drawings, in which:

FIG. 2 is a pictorial drawing of an exemplary autonomous sonar system before deployment in the water having a processing assembly and an acoustic receiving array;

FIG. 2A is a pictorial drawing of an exemplary autonomous sonar system as deployed in the water having the processing assembly and the acoustic receiving array of FIG. 2, which can be used as one of the autonomous sonar systems of FIG. 1;

FIG. 7 is a block diagram of an acoustic system representative of aspects of the autonomous sonar system of FIGS. 2, 2A, and 3;

FIG. 8 is a flowchart of a process to determine vertical angles of arrival of sound generated by a target, which can be representative of part of the processing provided by the electronic system of FIG. 3;

FIG. 9 is a graph of an example of a first receive beam and a second receive beam of the acoustic system of FIG. 7;

FIG. 10 is a graph of an autocorrelation of a first acoustic signal received by the first receive beam of FIG. 9;

FIG. 11 is a graph of a cross correlation of the first acoustic signal received by the first beam of FIG. 9 and a second acoustic signal received by the second receive beam of FIG. 9;

FIG. 12 is a graph of voltage ratios of the first receive beam of FIG. 9 and the second receive beam of FIG. 9 versus angle;

FIG. 13 is a block diagram of an exemplary processing system on which the process of FIG. 8 may be implemented (and on which the electronic system of FIG. 3 in general may be implemented);

FIG. 14 is a block diagram of processing for determining a vertical angle of arrival;

FIG. 15 is a flow chart showing a process of determining a range and a depth of an underwater target;

FIG. 16 is a flow chart showing further details of the process of FIG. 15;

FIG. 17 is a flow chart showing further details of the process of FIG. 15;

FIG. 18 is a flow chart showing still further details of the process of FIG. 15;

FIG. 19 is a pictorial showing a beamformed arrangement having two sound paths, for which a cross correlation is used;

FIG. 20 is a pictorial showing an omnidirectional arrangement having two sound paths, for which an autocorrelation is used;

FIG. 21 is a pictorial showing another beamformed arrangement having two sound paths, for which an autocorrelation is used;

FIG. 22 is a pictorial showing another beamformed arrangement having two sound paths, for which an autocorrelation is used;

FIG. 23 is a pictorial showing an omnidirectional arrangement having two sound paths, for which a cross correlation is used;

FIG. 24 is a graph showing correlation features achieved by an autocorrelation;

FIG. 25 is a graph showing correlation features achieved by a cross correlation;

FIG. 26 is a block diagram of a system for determining a range and a depth of an underwater target, which can form a part of the processing modules of FIG. 3;

FIG. 27 is a graph showing one technique for finding a localized depth of an underwater target;

FIG. 28 is a graph showing one technique for finding a localized range of the underwater target;

FIG. 29 is a graph showing one technique for finding a localized depth and range of the underwater target in accordance with the graph of FIG. 27;

FIGS. 30-33 are representative of a variety of types of "detection of envelope modulation on noise" processing, which can be performed by the electronic system of FIG. 3;

FIG. 30 is a block diagram showing a system having one omnidirectional hydrophone, the system adapted to perform detection of envelope modulation on noise processing;

FIG. 31 is a block diagram showing a system having two omnidirectional hydrophones, the system adapted to perform "dual-channel modulation detection" (DCMD);

FIG. 31A is a block diagram showing a system having two arrays, the system adapted to perform dual-channel modulation detection (DCMD);

FIG. 32 is a block diagram showing a portion of a system adapted to perform dual-channel modulation detection (DCMD) and also having a feature detector and a multipath delay association processor;

FIG. 32A is a block diagram showing further details of the feature detector of FIG. 32; and FIG. 33 is a series of graphs showing frequency spectra associated with the system of FIG. 32.

DETAILED DESCRIPTION OF THE INVENTION

Figure 1:
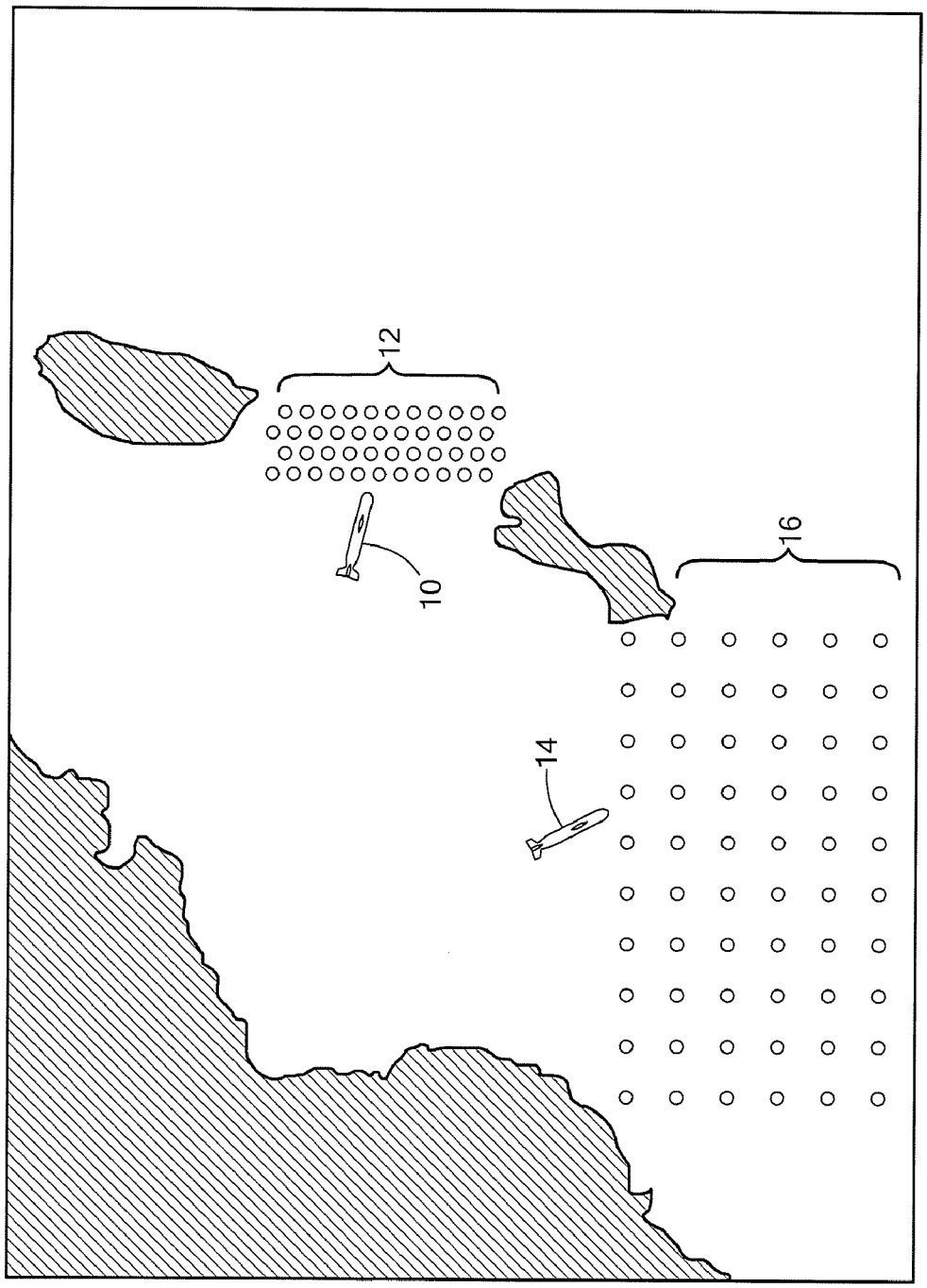
FIG. 1 is a pictorial drawing showing two exemplary deployment arrangements for a plurality of autonomous sonar systems.

Before describing the autonomous sonar system and method, some introductory concepts and terminology are explained. It is known that sound can travel through the water in so-called "propagation paths," which can be non-straight paths, particularly when the propagation paths extend over appreciable distances, e.g., miles. The propagation paths can be modeled with propagation models. Some propagation models assume that the sound travels in straight propagation paths. These models are often referred to as isovelocity models, since they presume that sound travels at the same sound speed at all water depths. Other propagation models do not assume that the sound travels in straight propagation paths. These models, which are sometimes referred to as "ray trace" models, can be used to more accurately predict the sound propagation paths and the resulting sound that arrives at a point in the ocean, for example at a sonar system that receives sound from an underwater target. Other propagation models accomplish the equivalent function but are less computationally convenient.

As is also known, sound that travels underwater can often take more than one propagation path. For example, sound can take a direct propagation path from a sound source to a sound receiver. The sounds can also travel upward from the sound source, on a so-called "surface reflected path," reflecting (or scattering) from the surface of the water and traveling downward to the sound receiver. The sound can also travel downward from the sound source, on a so-called "bottom reflected path," reflecting (or scattering) from the bottom of the water basin and traveling upward to the sound receiver. The sound can also take a variety of other propagation paths, having, for example, both a surface and a bottom reflection (or scattering) or more than one surface and bottom reflection (or scattering).

Though there exist a very large number of sound propagation paths between a sound source and a sound receiver, some of the propagation paths are dominant, i.e., sound received at a sound receiver will have an intensity largely from the dominant sound paths. In particular, because sound tends to lose intensity each time it reflects or scatters from the surface or the bottom, the propagation paths having the strongest sound intensity when received at a sound receiver tend to be the direct path, the surface reflected path, and the bottom reflected path. However, a surface to bottom reflected path and a bottom to surface reflected path can also be considered as well as paths with multiple boundary contacts.

A submarine, when traveling through the water, generates sound from a propulsion system, from a propeller, from an electrical power plant, and from flow-induced vibrations. The sound can have a variety of spectral characteristics, both narrowband and broadband, which are representative of the type of target (e.g., surface ship, submarine, etc.). While the systems and techniques described below are described in conjunction with underwater sound generators, for example, a submarine, the systems and techniques are not limited to water acoustics, but also apply to air acoustics and above water sound generators, for example, an aircraft.

As used herein, the term "spectrum analyzer" is used to describe a circuit or software algorithm, which receives a signal in the time domain and which generates an associated signal in the frequency domain. A spectrum analyzer can include a variety of continuous circuits or discrete circuits (e.g., digital circuits) or algorithms. For example, the spectrum analyzer can include a discrete Fourier transform (DFT) module, which can, in some arrangements, be a fast Fourier transform (FFT) module. It will be recognized that the DFT module can generate a frequency spectrum. In other arrangements, the spectrum analyzer can include one or more multiplication modules, each of which is adapted to multiply the time domain signal by a respective sinusoid signal, resulting in one or more respective product signals. In some particular arrangements, the spectrum analyzer can include at least two multiplication modules, a first one of which is adapted to multiply the time domain signal by a sine signal, resulting in a first product signal, and another one of which is adapted to multiply the time domain signal by a cosine signal, resulting in a second product signal. One of ordinary skill in the art will recognize that the first and second product signals can be combined to generate a magnitude and a phase of a frequency within the time domain signal, wherein the frequency is the frequency of the sine and cosine signals. By performing a plurality of such multiplications, a frequency spectrum can be generated.

Referring now to FIG. 1, two deployed fields 12, 16 of autonomous sonar systems are shown. The field 12 is arranged with closer spacing between individual autonomous sonar systems than the field 16.

Comparing the more closely spaced field 12 with the more sparsely spaced field 16, it should be appreciated that there may be a relatively high probability that at least one of the autonomous sonar systems within the more closely spaced field 12 will detect a submarine 10 traversing the field 12, as compared to a relatively low probability than at least one of the autonomous sonar systems within the more sparsely spaced field 16 will detect the submarine 14 (having the same sound generation as the submarine 10) traversing the larger field 16.

By selecting spacings between the autonomous sonar systems within a field of autonomous sonar systems, and by selecting the number of the autonomous sonar systems within the field of autonomous sonar systems (and therefore, the size of the field), it is possible to select a probability of detection of a submarine traversing the field of autonomous sonar systems.

In this way, barriers with a high cumulative probability of detection, of which the field 12 is representative, may be deployed. Also, larger areas, with a sparser density of sensors but still achieving a high cumulative probability of detection, may be deployed, of which the field 16 is representative. Each deployment arrangement can be configured for a different sort of mission.

The selection of deployment field arrangement is also available for some conventional sonar systems. For example, such a selection can be made when deploying conventional sonobuoys. As described above, conventional sonobuoys, which are deployed from the air, depend upon other assets, for example, an aircraft (e.g., a P3 aircraft) configured to both deploy the sonobuoys and also to receive radio signals continually transmitted from each sonobuoy within a field of sonobuoys. Thus, the aircraft must stay relatively near to the sonobuoys. The radio signals are only indicative of individual acoustic signals received by the sonobuoys. The sonobuoys may be capable of generating acoustic receive beams, but the sonobuoys provide no additional processing (e.g., no detections, no localizations, no tracking, no classifications). Instead, the aircraft is configured to process the radio signals indicative of the acoustic signals in a variety of ways, with substantial human assistance.

It will become apparent from discussion below that each one of the autonomous sonar systems within the fields 12, 16 is configured to generate a plurality of acoustic receive beams for the receipt of underwater sound, to detect loud targets, to adaptively shape the acoustic receive beams to avoid loud targets of low interest, to detect quiet targets, to localize the detected loud and quiet targets with respect to range, bearing, and depth, to generate target tracks of the load and quiet targets, to classify the loud and quiet targets in a variety of ways, and to provide reports about the tracked loud and quiet targets to a destination receiving station, all without human assistance.

As used herein, the term "loud target" refers to a generator of relatively loud sound in the water as received by a receiver. A loud target is generally a surface ship. However, a loud target can also be a submarine in close proximity to the receiver or a submarine travelling at high speed. As used herein, the term "quiet target" refers to a generator of relatively quiet sound in the water as received by a receiver. A quiet target will often be a submarine. However, a quiet target can also be a surface ship travelling at low speed or at a long distance from the receiver. The terms loud target and quiet target are used as relative terms herein, wherein a loud target results in more received sound power than a quiet target.

With this arrangement, the fields 12, 16 of autonomous sonar systems can operate for long periods of time with no receiving asset in the area. From time to time, an asset, for example, an aircraft, a surface ship, or a satellite, can approach the fields 12, 16 and receive the above-mentioned reports. Other communications arrangements involving acoustic, radio frequency (RF), or optical equipment or combinations of such equipment are also possible.

Referring now to FIG. 2, an autonomous sonar system 20 shown prior to deployment in the water can include an outer cylindrical shell 22, a floatation module to support an electronics module 28, and a cable spool holding a length of cable 30. The autonomous sonar system 20 can also include an acoustic receiving array 32 coupled to the electronics module 28 via the cable 30.

The acoustic receiving array 32 can have a plurality of hydrophones, here shown as small cylinders. In some arrangements, each one of the hydrophones has a substantially omnidirectional receiving beampattern.

The autonomous sonar system 20 can also include a battery 38 and another cable spool 36 holding another length of cable 34. The cable 34 can couple the battery 38 to the acoustic receiving array 32 and to the electronics module 26.

Referring now to FIG. 2A, the autonomous sonar system 20a is shown in a deployed configuration, in which the cables 30 and 34 are deployed. In some arrangements, the cable spool 38 and the battery 36 can remain within the outer cylindrical shell 22. In some arrangements, once deployed, the outer cylindrical shell 22 lies on the bottom of the ocean and the flotation module 24 is below the sea surface.

In other arrangements, the flotation module 24 is at the sea surface. In still other arrangements, the outer cylindrical shell 22 falls away, leaving the cable spool 36 and the battery 38 suspended off of the ocean bottom.

It should be recognized that there can be a variety of arrangements of the autonomous sonar system 20, 20a, both before and after deployment, some arrangements more suitable for shallow water and some more suitable for deep water. Other arrangements of the sonar system 20, 20a include, but are not limited to, drifting sensors (e.g., sonobuoys) or arrangements deployed on or from mobile or fixed platforms.

Figure 3:
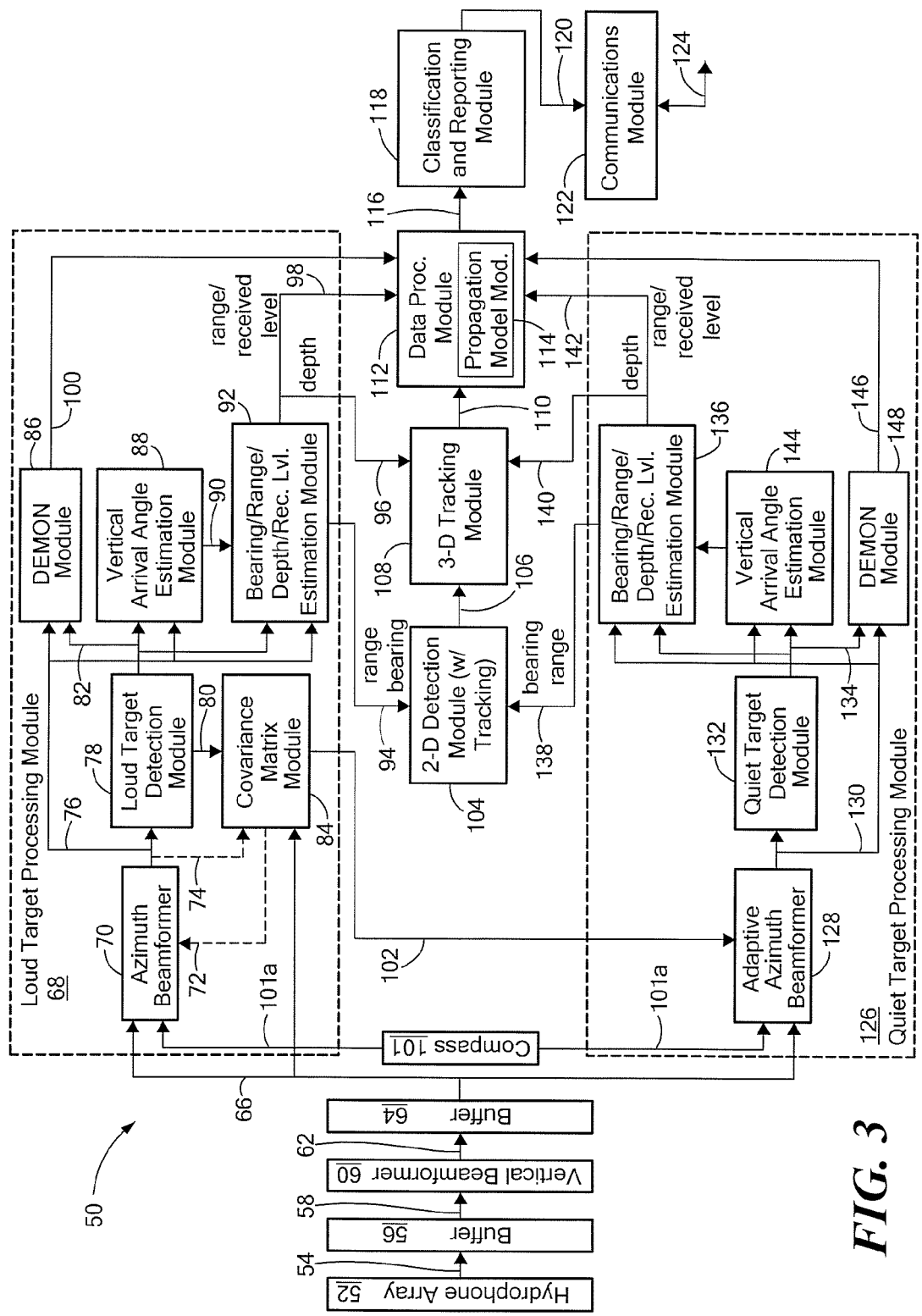
FIG. 3 is a block diagram showing processing modules that can be within the processing assembly of FIGS. 2 and 2A and also showing the acoustic receiving array of FIGS. 2 and 2A.

Referring now to FIG. 3 an electronic system 50 can be representative of electronics within the electronics module 26 of FIGS. 2 and 2A, in combination with an acoustic receiving array 52, which can be the same as or similar to the acoustic receiving array 32 of FIGS. 2 and 2A. It should be recognized that the electronic system 50 and associated processing modules of FIG. 3 can be implemented in any combination of software instructions and hardware. Furthermore, it should be appreciated that any of the processes shown below by way of flow charts or systems shown below by way of block diagrams can be implemented in any combination of software instructions and hardware.

As described above in conjunction with FIGS. 2 and 2A, the acoustic receiving array 52 can have a plurality of hydrophones, and each hydrophone can have a substantially omnidirectional beampattern. The plurality of hydrophones can provide a respective plurality of hydrophone signals 54, each of which can be an analog signal. A buffer 56 can be coupled to receive the plurality of hydrophone signals 54, to convert the plurality of hydrophone signals to digital hydrophone signals, and to temporarily store the digitized hydrophone signals in a buffer memory. The buffer 56 can provide the plurality of digitized hydrophone signals 58.

The electronic system 50 can also include a vertical beamformer 60 coupled to receive the plurality of digitized hydrophone signals 58 and configured to form a plurality of vertical receive beam signals 62. The plurality of vertical receive beam signals 62 is representative of a respective plurality of acoustic receive beams about the receiving array 52, each beam of which is non-directional in azimuth and directional in elevation.

Another buffer 64 can be configured to temporarily store the plurality of vertical receive beam signals 62 in a buffer memory and to provide a respective plurality of vertical receive beam signals 66.

The electronic system 50 can include a loud target processing module 68 configured to operate during a first time epoch and a quiet target processing module 126 configured to operate during a second time epoch. In some arrangements, the first and second time epochs occur periodically and sequentially, one after the other. In other arrangements, the first and second time epochs occur generally in parallel. The first and second time epochs may not have the same time durations. It will be understood from discussion below that the loud target processing module 68 generally processes loud targets (e.g., surface ships) and the quiet target processing module 126 generally processes quiet targets (e.g., submarines).

The loud target processing module 68 can include an azimuth beamformer 70 coupled to receive the plurality of vertical receive beam signals 66 and configured to provide a plurality of directional receive beam signals 76. The plurality of directional receive beam signals 76 are representative of a respective plurality of acoustic receive beams about the receiving array 52, each beam of which is directional in azimuth and also directional in elevation.

It will be understood that it is desirable that the plurality of directional receive beam signals 76 be identified as to direction with respect to a fixed coordinate system, for example the earth's coordinate system. It will also be understood that the receiving array 52 may tend to rotate about a vertical axis relative to the earth, which would tend to make the above-described directional acoustic receive beams, of which the direction receive beam signals 76 are representative, also rotate. Referring again briefly to FIG. 2A, it will be understood that the receiving array 32 can rotate about an axis of the cables 30, 34.

Referring again to FIG. 3, it is therefore desirable to include an electronic compass 101, which can be physically coupled to the receiving array 52 (32 of FIG. 2A), and which can detect a rotational position of the receiving array 52 relative to the earth.

The compass 101 can provide a compass signal 101a to the azimuth beamformer 70. With this arrangement, each one of the directional receive beam signals 76 can be related to the coordinate system of the earth, which can ultimately result in knowledge of the azimuth direction relative to the earth of any subsequent detected targets.

In some arrangements, the directional receive beam signals 76 are merely tagged with azimuth direction information indicative of their azimuth pointing directions relative to the earth. However, in other arrangements, the directional receive beams signals 76 can be corrected in azimuth pointing direction relative to the earth by the azimuth beamformer 70.

The azimuth beamformer can be a fixed-weight beamformer having predetermined beamforming coefficients or it can be an adaptive beamformer, similar to an adaptive azimuth beamformer 128 described in more detail below.

A loud target detection module can identify (i.e., detect) loud targets within the plurality of directional receive beam signals 76. At any time, the loud target detection module can detect loud targets in some of the directional receive beam signals 76, in none of the directional receive beam signals 76, or in all of the directional receive beam signals 76, depending upon ship traffic proximate to the receiving array 52.

The detections generated by the loud target detection module 78 can be performed in a variety of ways. For example, in one particular arrangement, the loud target detection module is configured to perform narrowband frequency analysis upon each one of the plurality of directional receive beam signals 76 in order to detect loud targets. With this arrangement, the loud target detection module 78 can first convert the time domain directional receive beam signals 76 to the frequency domain, for example, by way of respective Fast Fourier Transforms. The loud target detection module 78 can threshold the resulting frequency domain signals to identify narrowband spectral lines that are indicative of sources of loud acoustic sound.

In other arrangements, the loud target detection module 78 is configured to perform broadband analysis of each one of the plurality of directional receive beam signals 76 in order to detect loud targets. With this arrangement, the loud target detection module 78 can first convert the time domain directional receive beam signals 76 to the frequency domain, for example, by way of respective Fast Fourier Transforms. The loud target detection module 78 can compute a total power within selected broad bands of resulting frequency domain signals to identify high sound pressure levels that are indicative of sources of loud acoustic sound.

In some other arrangements, the loud target detection module 78 is configured to perform both narrowband and broadband analysis of each one of the plurality of directional receive beam signals 76 in order to detect loud targets. The above examples are but some of the processing that could be performed by the loud target detection module 78 in order to detect the loud targets. A variety of conventional techniques could be used.

As described above, the directional receive beam signals 76 from which the detections are made by the loud target detection module 78 can be tagged with azimuth direction information relative to the earth's coordinate system, or otherwise corrected relative to the earth's coordinate system. Therefore, the loud target detection module 78 can be configured to not only make detections of the loud targets but also to identify azimuth directions of the loud targets relative to the earth.

Loud target detection information 80 is provided to a covariance matrix module 84, which is also coupled to receive the vertical receive beam signals 66. The covariance matrix module 84 is configured to generate a "synthetic" covariance matrix 102 (and optionally the customary sample covariance matrix 72) associated with the vertical receive beam signals 66. Generation of a customary sample covariance matrix 72 will be understood by those of skill in the art. The covariance matrix module 84 can also be configured to modify (or adapt) the covariance matrix 102 in accordance with the loud target detection information 80 so that the covariance matrix 102 is an adapted or modified covariance matrix.

In one embodiment, the modified covariance matrix 102 is formed by placing two very loud "synthetic" sources, in directions L1 and L2 on either side of a known loud target at a small angular distance away (typically 1 degree). The amplitude of these sources is made extremely large. The covariance matrix is formed using vector outer products of the steering directions, e.g., $V_{L1}V_{L1}^H$, and $V_{L2}V_{L2}^H$. White noise (the identity matrix) is added to make the matrix invertible. The resulting "synthetic" covariance matrix 102 is:

$R_s = I + aV_{L1}V_{L1}^H + aV_{L2}V_{L2}^H$ and the inverse covariance matrix is:

$H = R_s^{-1}$

The inverse covariance matrix can be determined using the Matrix Inversion Lemma or other methods. By making the amplitude, a, of the synthetic sources very large, the angular width of the resulting beampattern can be made arbitrarily small so that its effect is unnoticed other than when the beamformer is pointed directly at the "synthetic" sources.

It will be understood that it is ultimately desirable to be able to point nulls of directional acoustic receive beams represented by some other directional receive beam signals (for example, directional receive beams signals described below in conjunction with the quiet target processing module 126) toward the detected loud targets so that quiet targets at directions away from the nulls can be detected and not be overwhelmed by high sound pressure levels of the loud targets. Processing of the quiet targets is described below in conjunction with discussion of the quiet target processing module 126.

The loud target detection module 78 provides detection and direction of detection information 82 to a detection of envelope modulation on noise (DEMON) module 86, to a vertical arrival angle estimation module 88, and to a bearing/range/depth/received level estimation module 90. The detection of envelope modulation on noise (DEMON) module 86, the vertical arrival angle estimation module 88, and the bearing/range/depth/received level estimation module 90 are also coupled to receive the directional receive beam signals 76. While the detection of envelope modulation on noise module 86 is indicated to be a DEMON module, it is not necessary that the detection of envelope modulation on noise module 86 perform only conventional DEMON processing.

The detection of envelope modulation on noise module 86 is described in greater detail in conjunction with FIGS. 30-33. The vertical arrival angle estimation module 88 is described more fully below in conjunction with FIGS. 7-14. The bearing/range/depth/received level estimation module 90 is described more fully below in conjunction with FIGS. 15-29.

The detection of envelope modulation on noise module 86 can be of a type described in U.S. patent application Ser. No. 12/040,123, entitled "Systems and Methods for Detection and Analysis of Amplitude Modulation of Underwater Sound," filed Feb. 29, 2008. The vertical arrival angle estimation module 88 can be of a type described in U.S. patent application Ser. No. 11/683,712, entitled "Determining Angles Of Arrival Using Multipaths," filed Mar. 8, 2007. The bearing/range/depth/received level estimation module 90 can be of a type described in U.S. Pat. No. 7,315,488, entitled "Methods and Systems for Passive Range and Depth Localization," issued Jan. 1, 2008. All of the above patent applications and patents are assigned to the assignee of the present invention, and each is incorporated by reference herein in its entirety.

Let it suffice here to say that the vertical arrival estimation module 88 is configured to identify dominant and associated arrival angles of sound from targets in the water and to provide vertical arrival angle information 90 to the bearing/range/depth/received level estimation module 90. As described above, sound generated by a target can arrive at the receiving array 52 from a plurality of vertical arrival angles, each corresponding to a different sound path through the water, but each associated with the same target.

Let is also suffice here to say that the bearing/range/depth/received level estimation module 90 is configured to identify a range and a depth to a loud target associated with the vertical arrival angle information 90. Due to the different sound paths on which underwater sound propagates, identification of a range to a target can be a particularly difficult problem. It should be recognized that a target depth identified to be below the sea surface is most likely a submarine.

The bearing/range/depth/received level estimation module 90 can also be configured to receive the detection and bearing information 82 from the loud target detection module 78 and to further process the directional beam information 76, for example, using beam interpolation techniques or the like, to identify more accurate azimuth bearings of the detected loud targets.

The bearing/range/depth/received level estimation module 90 can also be configured to identify a received sound pressure level associated with a loud target.

Let it still further suffice here to say that the detection of envelope modulation on noise module 86 can detect a modulation of ocean noise associated with a propeller of a loud target. This information can be used to classify a target as a submarine or a surface ship.

In some arrangements, the detection of envelope modulation on noise module 86, the vertical arrival estimation module 88, and the bearing/range/depth/received level estimation module 90 can initiate their respective processing upon a detection of a loud target by the loud target detection module 78, in order to process information associated with the detected loud targets.

Turning now to the quiet target processing module 126, the quiet target processing module 126 has many elements similar to or the same as the loud target processing module 68. However, the quiet target processing module has the adaptive azimuth beamformer 128, which may be different from the azimuth beamformer 70. The adaptive azimuth beamformer 128 is coupled to receive the above-described modified covariance matrix 102 from the covariance matrix module 84. Values of the modified covariance matrix 102 can be used by the adaptive azimuth beamformer 128 to steer nulls of resulting adaptively directional receive beam signals 130 toward the loud targets detected by the loud target detection module 78.

The beamformer 128 can use a beamforming weight, w, which is the product of a scale factor, b, a Hermitian matrix, H, computed by the covariance matrix module 80 and the steering vector $V_s$. The scale factor, b, can be selected to produce a flat response across all steering directions when applied to a data field of white noise for which a covariance matrix is the identity matrix I.

$$w = bHV_s = \frac{HV_s}{\sqrt{V_s^H HHV_s}}$$

Thus, the subsequent processing by the quiet target processing module 126 is less overwhelmed by loud targets so that quiet targets can be detected and processed.

Similarly, the azimuth beamformer 70, in some embodiments, can receive the customary sample covariance matrix 72, and adapt its beams using Minimum Variance Distortionless Response (MVDR) beamforming or similar methods.

The quiet target processing module 126 includes a quiet target detection module 132 that operates on the adaptively directional receive beam signals 130 in the same way that the loud target detection module 78 operates on the directional receive beam signals 76.

A quiet target detection module 132, a detection of envelope modulation on noise module 148, a vertical arrival angle estimation module 144, and a bearing/range/depth/received level estimation module 136 operate using the adaptively directional receive beam signals 130 rather than the directional receive beam signals 76, but are otherwise the same as or similar to the detection of envelope modulation on noise module 86, the vertical arrival angle estimation module 188, and the bearing/range/depth/received level estimation module 92, respectively.

In some arrangements, the detection of envelope modulation on noise module 148, the vertical arrival estimation module 144, and the bearing/range/depth/received level estimation module 136 can initiate their respective processing upon a detection of a quiet target by the quiet target detection module 132, in order to process information associated with the detected quiet targets.

The bearing/range/depth/received level estimation module 90 can provide range and bearing information 94 associated with detected loud targets to a 2-D detection module configured to process the range and bearing information 94 associated with detected loud targets to identify some range and bearing information within the bearing and range information 94 having sufficient quality for further processing. In one particular arrangement, in order to identify range and bearing quality, the 2-D detection module is configured to generate two-dimensional tracks (range and bearing) of targets associated with the range and bearing information 94. Two-dimensional target tracks that are sufficiently stable (i.e., have direction jitter (noise) below a predetermined jitter threshold, and which are unambiguous) can be deemed to be acceptable for further processing.

Similarly, the bearing/range/depth/received level estimation module 136 can provide range and bearing information 138 associated with detected quiet targets to the 2-D detection module, which is configured to process the range and bearing information 138 associated with detected quiet targets to identify some range and bearing information within the bearing and range information 138 having sufficient quality for further processing in substantially the same way described above.

Good quality two-dimensional tracks 106 (range and bearing) associated with both loud and quiet targets are received by a 3-D tracking module 108, which is also coupled to receive target depth information from the bearing/range/depth/received level estimation module 90 and from the bearing/range/depth/received level estimation module 136. The 3-D tracking module 108 is configured o generate three-dimensional tracks (range, bearing, and depth) of some or all of the loud and quiet targets detected by the loud target detection module 78 and by the quiet target detection module 132.

A data processing module 112 is coupled to receive three-dimensional tracks 110 from the 3-D tracking module 108, to receive range and received sound pressure level information 98 from the bearing/range/depth/received level estimation module 90, and to receive range and received sound pressure level information 142 from the bearing/range/depth/received level estimation module 136.

The data processing module 112 can include a propagation model module 114, which can process propagation paths with an isovelocity model and/or with a ray-trace model. The propagation model module 114 is configured to reverse calculate to estimate the sound pressure level at the loud and quiet detected targets as opposed to the received sound pressure level at the receiving array 52. It will be recognized that source sound pressure level can be indicative of the type of target, for example, submarine or surface ship.

The detection of envelope modulation on noise module 86 can provide frequencies and amplitudes associated with the propeller rate (and number of blades on the propeller), referred to herein as demodulated noise information 100, associated with bearings of loud targets to the data processing module 112. Similarly, the detection of envelope modulation on noise module 148 can provide demodulated noise information 146 associated with bearings of quiet targets to the data processing module 112.

The data processing module 112 can pass the demodulated noise information 100, 148 the three dimensional target tracks 10, and the calculated source sound pressure levels as a combined signal 116 to a classification and reporting module 118. The classification and reporting module 118 can at least classify those targets as submarines that have tracks that are below the surface of the ocean. Furthermore, the classification and reporting module 118 can use other information to classify targets, for example, source sound pressure level, track velocity, track direction, and demodulated noise information (e.g., propeller blade rate). Though not shown to be coupled for clarity, the classification and reporting module 118 can receive detection information from the loud target detection module 78 and detection information from the quiet target detection module 132, which may use narrowband or broadband processing and which may identify narrowband spectral lines or broadband frequency regions of high source level associated with detected loud and quiet targets. The classification and reporting module 118 can use this information to classify targets as submarines or surface ships and types of vessels. The classification and reporting module 118 can also assign probabilities to each of its classifications.

The classification and reporting module 118 can assemble the demodulated noise information 100, 146, the three-dimensional target tracks 110, the detection information 82, 134, and the calculated source sound pressure levels within the combined signal 116 along with classification decisions and along with computed probabilities of classification accuracies into reports 120 coupled to a communications module 122.

The communications module 122 can operate to send the reports 124 to another asset. In some arrangements, the communications module 122 can send the reports 124 via a radio frequency link to an aircraft, ship, or satellite. In some other arrangements, the communications module 122 can send the reports 124 via an underwater acoustic link to a ship or other communications node. Other arrangements are also possible.

It will be recognized that all of the processing associated with the electronic system 50 is accomplished without human assistance and without human decisions. Therefore, the electronic system 50 is able to detect targets, to localize the targets, to track the targets in three dimensions, and to classify the targets.

Figure 4:
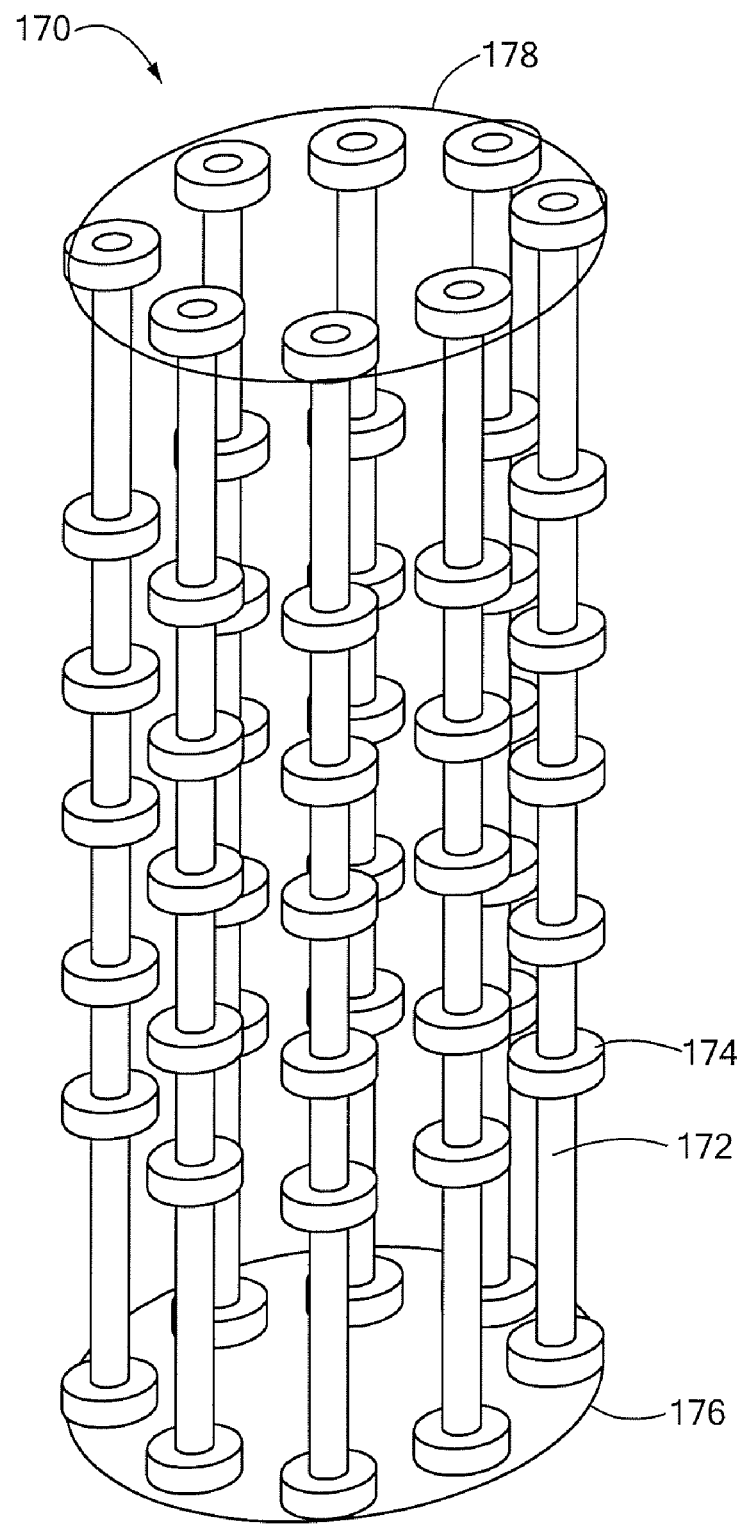
FIG. 4 is a pictorial diagram of an exemplary acoustic receiving array that can be used as the acoustic receiving array of FIGS. 2, 2A, and 3.

Referring now to FIG. 4, one embodiment of acoustic receiving array 170 that can be used as the receiving array 52 of FIG. 3 includes a plurality of vertical "staves," of which a stave 172 is but one example. Each vertical stave can include a plurality of hydrophones, of which a hydrophone 174 is but one example.

The acoustic receiving array 170 is essentially a type of volumetric array, of which there are may types, with many hydrophone arrangements. It will be recognized that a volumetric array is particularly suited to form beams that are directional in both azimuth and in elevation.

Figure 5:
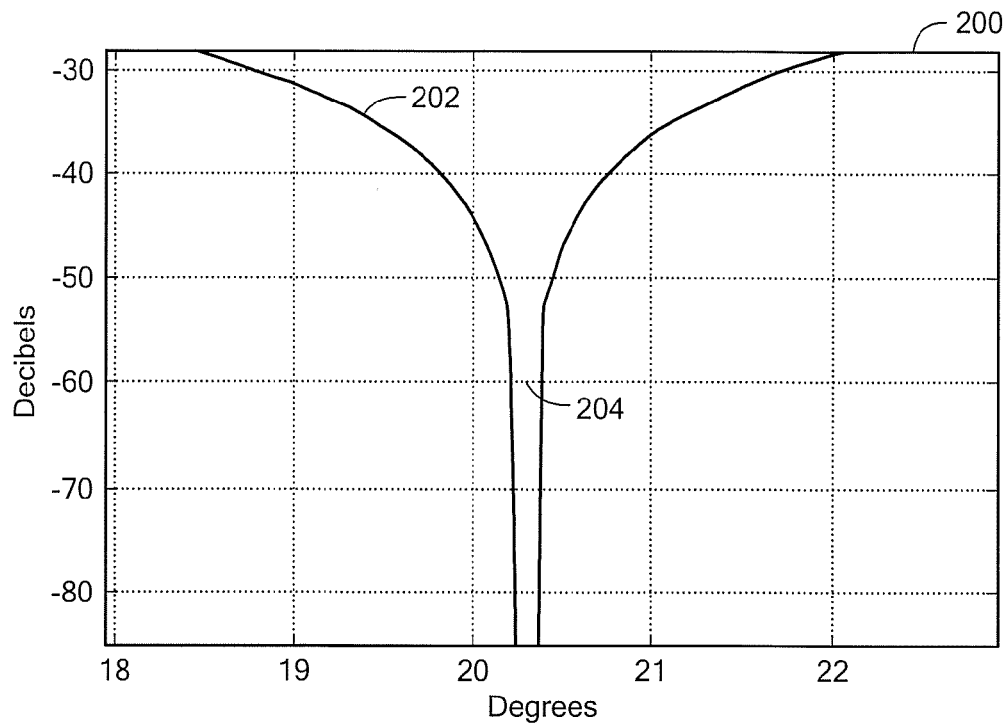
FIG. 5 is a graph showing an adaptive beampattern that can be provided by the processing modules of FIG. 3.

Referring now to FIG. 5, a graph 200 includes a vertical axis in units of decibels and a horizontal axis having units of angles in degrees, which may be vertical or azimuthal degrees. A curve 202 is representative of a beam pattern (vertical or horizontal) of an acoustic receive beam associated with one of the directional receive beam signals 76 of FIG. 3. The curve 202 has a null 204.

Figure 6:
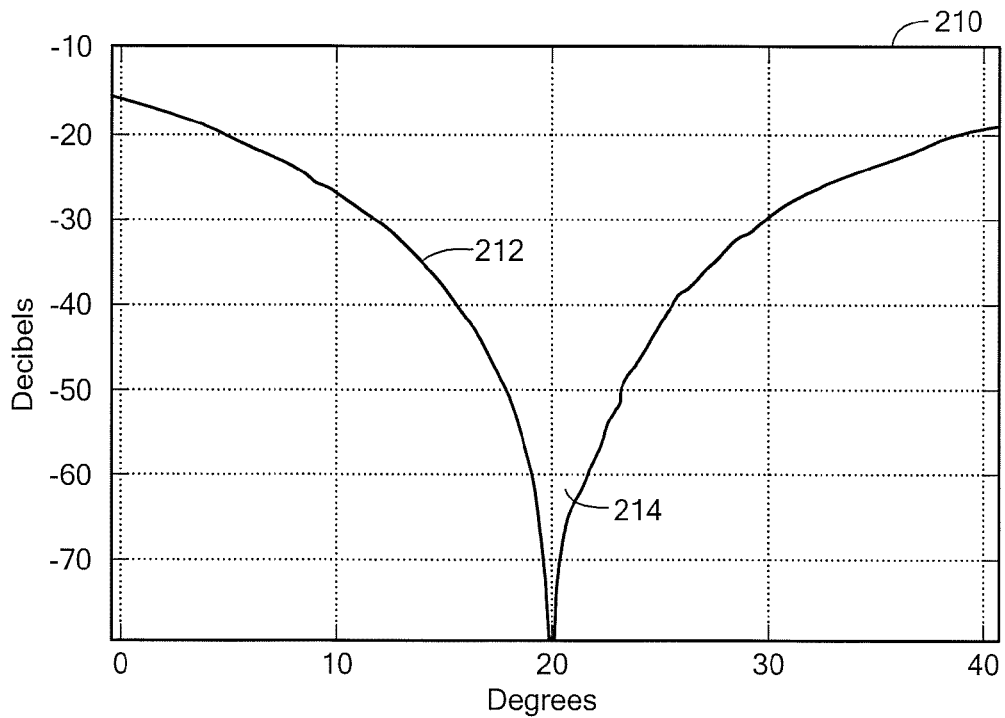
FIG. 6 is a graph showing an alternate (adaptive) beampattern having a broader null that can be provided by the processing modules of FIG. 3.

Referring now to FIG. 6, a graph 210 includes a vertical axis in units of decibels and a horizontal axis having units of angular degrees, which may be vertical or azimuthal degrees, the same as the graph of FIG. 5. A curve 212 is representative of a beam pattern of an adapted acoustic receive beam associated with one of the adaptively directional receive beam signals 130 of FIG. 3. The curve 212 has a null 214 formed by placing two very loud "synthetic" sources, in directions L1 and L2 on either side of a known loud target at a small angular distance away, as described above. It will be appreciated that the null 214 occurs at a slightly different angle than the null 204 of FIG. 5. The null 214 also is adapted to have a broader null width than the null 204. The broader null width of the null 214 can be achieved, for example, by using the "synthetic" covariance matrix 102 as input to the adaptive azimuthal beamformer 128 processing of FIG. 3.

The vertical arrival angle estimation modules 88, 144 of FIG. 3 are described more fully below in conjunction with FIGS. 7-14. It will be recognized that the vertical arrival angle estimation discussed below in conjunction with FIGS. 7-14 is a method of estimation of vertical arrival angles from a single array with multiple vertical beams. If a system with vertically separated receivers or receiving arrays is employed, arrival angle estimates can be made using inter-array path differences. A range-depth estimation method, described below in conjunction with FIGS. 15-29, requires estimates of the path arrival angles, regardless of technique employed.

Described herein is an approach for determining angles of arrival (e.g., vertical, horizontal and so forth) of sound that uses more than one receive beam for multipath environments, e.g., using two receive beam patterns for receiving two signals from two arrival paths. However, in using more than one receive beam to receive signals from the multipaths, received signals interact multiplicatively and therefore it is hard to mathematically separate the received signals.

While the techniques in the description herein focus on broadband acoustic signals in the water, the techniques may be applied to any broadband signal environment.

It will be understood from discussion below that an estimation of vertical arrival angles of received sound is necessary for the range and depth estimation described further below in conjunction with FIGS. 15-29.

Figure 7:
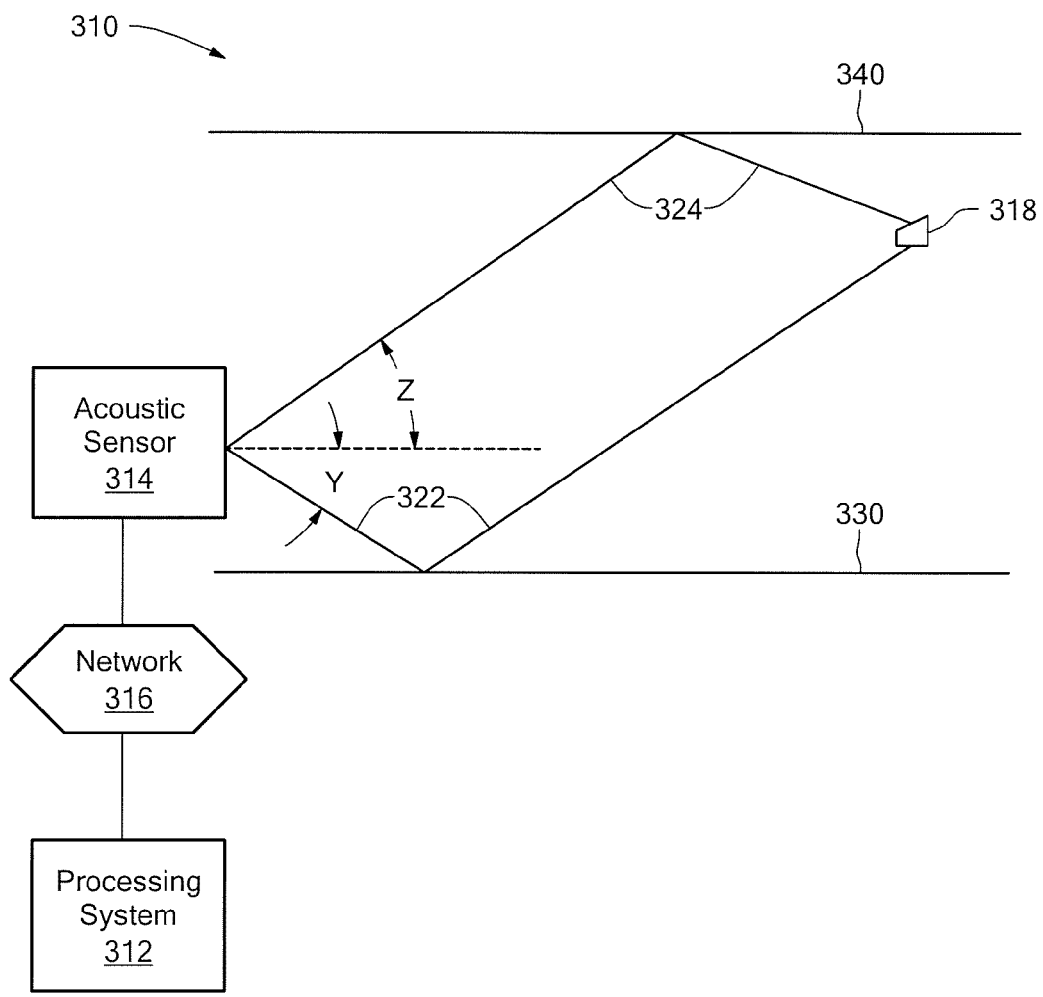
FIGS. 7-14 are representative of vertical arrival angle estimation performed by the electronic system of FIG. 3.

Referring now to FIG. 7, an acoustics system 310 includes a processing system 312 and an acoustic sensor system 314, which can be the same as or similar to the acoustic receiving array 52 of FIG. 3), connected to the processing system 312 by a network 316. The processing system 312 can be the same as or similar to the vertical arrival angle estimation processors 88, 144 of FIG. 3, in combination with the buffer 56, the vertical beamformer 60, the buffer 64, the azimuth beamformer 70, and the adaptive azimuth beamformer 128.

The acoustic sensor system 314, receives acoustic signals from an object 318 (i.e., a target). In general, the received acoustic signals may be from active measures (e.g., a reflected signal resulting from a signal sent from the acoustic system 310) or from passive measures (e.g., receiving an acoustic signal resulting from movement of the object 318 or other acoustics emanating from the object 318). However, for the autonomous sonar system 50 of FIG. 3, only acoustic signals resulting from the movement of an object or acoustic signals emanating from the object are considered.

The received signals may take more than one path to the acoustic sensor system 314. For example, a first arrival path 322 (a bottom-reflected path) is reflected off an ocean floor 330. A second arrival path 324 (a surface-reflected path), is reflected off a surface 340 of water. In other examples, either the first arrival path 322 or the second arrival path 324 may be a direct path to the acoustic sensor system 314.

An angle, Y, represents the angle of arrival of the first arrival path 322. An angle, Z, represents the angle of arrival of the second arrival path 324. In this example, the angles of arrival, Y and Z, are vertical angles. In other examples, the angles of arrival may be horizontal angles.

In one example, the acoustic sensor system 314 may include one or more sound sensors. In one example, the network 316 may be a wired or a wireless network. However, with regard to the autonomous sonar system 50 of FIG. 3, the acoustic sensor system 314 can be the same as or similar to the receiving array 170 of FIG. 4.

The processing system 312 may be located on a ground-based platform (e.g., in a building, in a vehicle and so forth), a space-based platform (e.g., a satellite, a space-vehicle and so forth), a sea-based platform (e.g., a ship, a submarine, a buoy, an anchored sea structure, a torpedo, an undersea robotic vehicle and so forth) or on an air-based platform (e.g., an aircraft, a helicopter, a missile and so forth). However, with regard to the autonomous sonar system 50 of FIG. 3, the processing system 312 is located as shown, for example, in FIGS. 2 and 2A, within the electronics module 26. In this arrangement, the processing system 312 may be co-located (i.e., on the same autonomous sonar system) with the acoustic sensor system 314. However, in other arrangements, the processing system 312 is not co-located with the acoustic sensor system 314.

As will be shown below, the approach described herein uses more than one arrival path to determine the vertical angles of arrival of sound traveling from a target to the autonomous sonar system 20a of FIG. 2A. The following discussion provides illustrative mathematical support to determine the vertical angles of arrival using two receive beams to receive two signals from two arrival paths.

For a first arrival path, a relative arrival time is $t_1$, a relative amplitude of a medium (e.g., an ocean) is $A_1$, a first beam pattern voltage amplitude is $v_{11}$ and a second beam pattern voltage amplitude is $v_{21}$. For a second arrival path, a relative arrival time is $t_2$, a relative amplitude of the medium is $A_2$, a first beam pattern voltage amplitude is $v_{12}$ and a second beam pattern voltage amplitude is $v_{22}$. As used herein, the term "voltage amplitude" refers to a signal amplitude of a beamformed signal, for example, the directional receive beams signal 76 or the adaptively directional receive beam signal 130 of FIG. 3.

In the above discussion, $A_i$ is a complex medium transfer function of an i-th path. It will be appreciated that a complex medium transfer function can include a variety of effects, for example, an attenuation versus range, a complex surface reflection loss, and a complex bottom reflection loss. Also in the above discussion, $v_{ij}$ is a j-th beam pattern response for the i-th path arrival angle and $t_i$ is a travel time associated with the i-th path. Voltage amplitude, $v_{ij}$, is assumed to be real to simplify the analysis since the extension for a complex beam pattern response is straightforward for one of ordinary skill in the art. It is assumed that $t_2$ is greater than $t_1$.

If s(t) represents a signal source, a received signal received at the first receive beam from the signal source received from the first arrival path and the second arrival path is described as:

$$s_1(t) = v_{11} \cdot A_1 \cdot s(t-t_1) + v_{12} \cdot A_2 \cdot s(t-t_2).$$

A received signal received at the second beam source from the signal source received from the first arrival and the second arrival path is described as:

$$s_2(t) = v_{21} \cdot A_1 \cdot s(t-t_1) + v_{22} \cdot A_2 \cdot s(t-t_2).$$

The two signal components included within $s_1(t)$ are separated in time by a time difference, $\tau = t_2 - t_1$. The autocorrelation of $s_1$ results in a correlator output exhibiting peaks at delays of $\tau = 0$, $\pm(t_2 - t_1)$. The magnitude of the peak at $\tau = 0$ is given by $$[|v_{11} \cdot A_1| + |v_{12} \cdot A_2|^2] \cdot <s^2>,$$

where $<s^2>$ is the average energy of the source. The magnitude of the peak at $\tau = 0$ provides the measure of the total signal energy, but is not useful for determining the angles of arrival because the signals from the two paths are combined.

Next consider the peak at $\tau = +(t_2 - t_1) = \tau_{21}$, where the signal is being delayed. The magnitude of the peak is given by:

$$\rho_{11}(\tau_{21}) = v_{11} \cdot v_{12} \cdot A_1 \cdot A_2^* <s^2>.$$

Similarly, if the signal is advanced by $\tau = -(t_2 - t_1)$, then $$\rho_{11}(\tau_{21}) = v_{11} \cdot v_{12} \cdot A_1 \cdot A_2^* <s^2>$$

$\rho_{11}(\tau_{21})$ and $\rho_{11}(-\tau_{21})$ are identical and contain the product of the beam pattern at the two different angles, $v_{11}$, $v_{12}$, but it is not possible to uniquely solve for an angle pair from this product.

Next consider the cross correlation of signals received at the first and second receive beams (beams 1 and 2), which will produce peaks at the same delays as the above autocorrelation because the receiver of the receive beams is at one location. At $\tau = +\tau_{21}$, where the copy of beam 2 signal is being delayed, the magnitude of the peak is given by $$\rho_{12}(\tau_{21}) = v_{12} \cdot v_{21} \cdot A_1 \cdot A_2^* <s^2>.$$

Similarly if beam 2 is advanced by $\tau = -(t_2 - t_1)$, the magnitude of the peak is given by:

$$\rho_{12}(-\tau_{21}) = v_{22} \cdot v_{11} \cdot A_1 \cdot A_2 <s^2>.$$

Once again, these terms contain the product of two unknown beam pattern values and it is not possible to uniquely determine the angles of arrival.

However, using the auto correlation and cross correlation together, one may solve for the angles of arrival. For example, let the ratio of the cross correlation peak amplitude to the corresponding autocorrelation peak be denoted by $X(\tau)$, then $$X(\tau_{21}) = (\rho_{12}(\tau_{21}))/(\rho_{11}(\tau_{21}))$$

$$X(\tau_{21}) = (v_{11} \cdot v_{22} \cdot A_1 \cdot A_2^* <s^2>)/(v_{11} \cdot v_{12} \cdot A_1 \cdot A_2^* <s^2>)$$

$$X(\tau_{21}) = v_{22}/v_{12}.$$

Since the ratio of the beam pattern main lobes is a monotonic function (i.e., a unique relationship between the beam pattern main lobe ratios and the angle of arrival over the interval of interest is guaranteed), the ratio will enable one to determine the second path arrival angle by inverting or interpolating the beam pattern ratio function using the measured value of $X(\tau)$.

Similarly, the ratio of the correlation peaks for $\tau = -\tau_{21}$ produces the ratio for the first path angle of arrival, that is $$X(-\tau_{21}) = v_{21}/v_{11}$$

It should be appreciated that flowcharts shown below correspond to the below contemplated techniques which would be implemented in a processor such as a processor represented by the electronic systems 50 of FIG. 3. The rectangular elements (typified by element 612 in FIG. 15), herein denoted "processing blocks," represent computer software instructions or groups of instructions. The diamond shaped elements (typified by element 634 in FIG. 15), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

The processes shown below by way of flowcharts are not limited to use with any particular hardware or software; they may be used in any computing or processing environment and with any type of machine or set of machines that is capable of running a computer program. The processes shown below may be implemented in hardware, software, or a combination of the two. The processes may be implemented in computer programs executed on programmable computers/machines that each include a processor, a storage medium or other article of manufacture that is readable by the processor (including volatile and non-volatile memory and/or storage elements), at least one input device, and one or more output devices. Program code may be applied to data entered using an input device to perform the processes and to generate output information.

Figure 8:
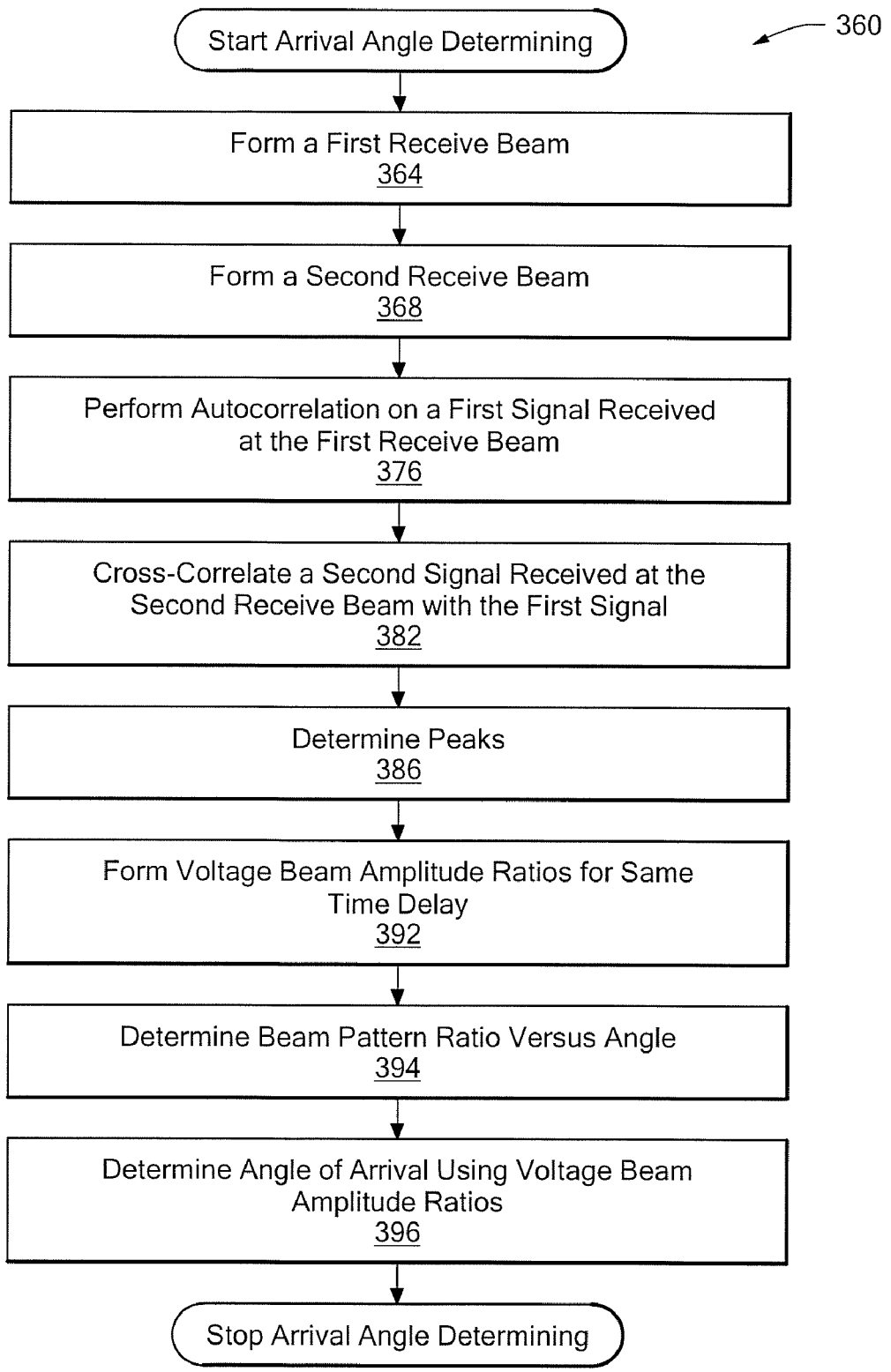
Figure 9:
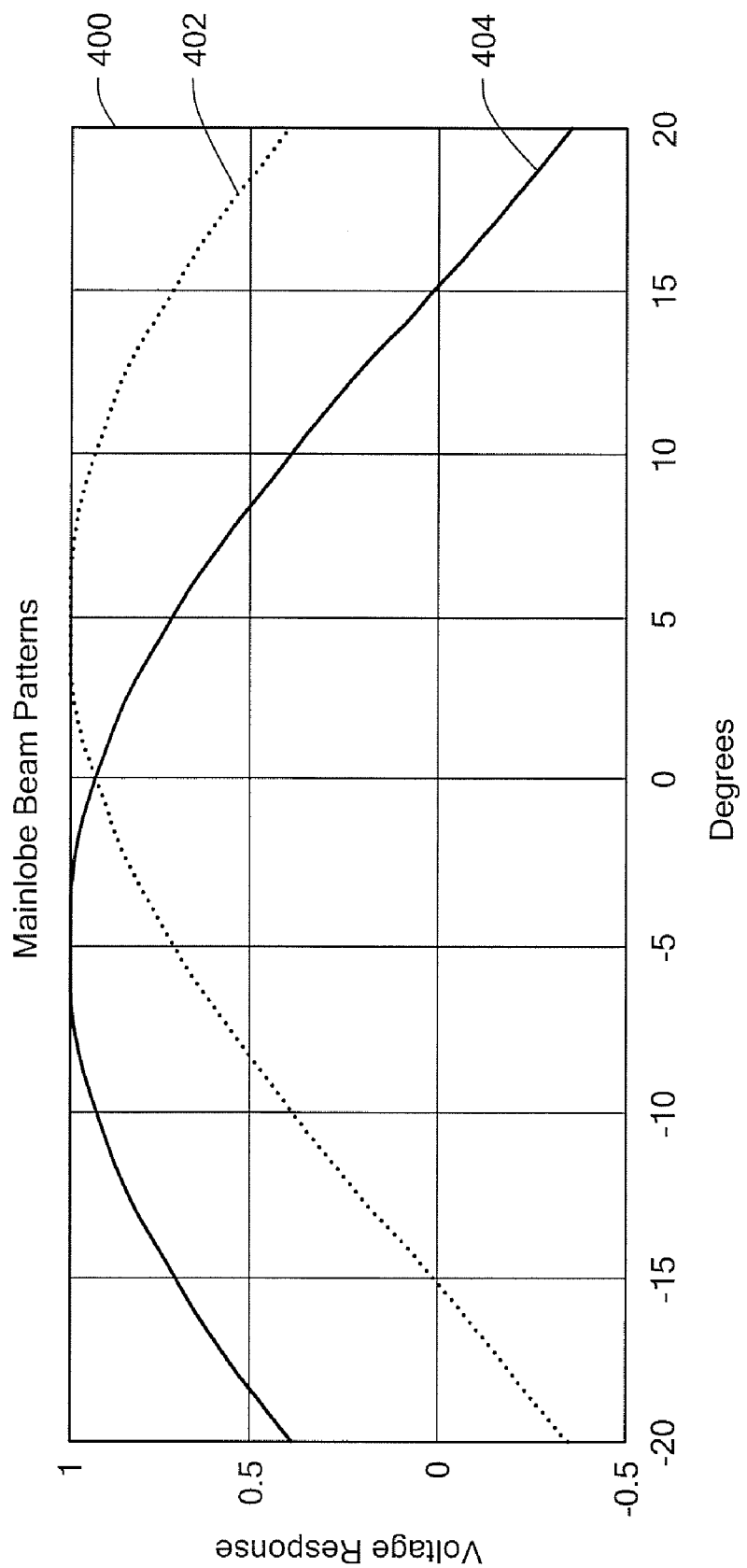

Referring now to FIG. 8, a process 360 is representative of one method to determine angles of arrival. At block 364, the process 360 forms a first receive beam having a first beam angle. Referring briefly to FIG. 9, in one example, the first receive beam 402 has a main lobe with a maximum response angle (MRA) at +5 degrees, as seen in a graph 400.

At block 368, the process 360 forms a second receive beam having a second beam angle. In some arrangements, the second receive beam overlaps the first receive beam. Referring briefly again to FIG. 9, in one example, the second receive beam 404 has a main lobe with an MRA −5 degrees in the graph 400.

For convenience, and in accordance with the autonomous sensor system 20a of FIG. 2A, the present example considers the case of the first and second beams being formed from the same acoustic receiving array. However, the technique will operate with separate arrays provided that the channel amplitude functions are comparable or can be estimated, and that the corresponding multipath pair delays can be matched.

When more than two paths and/or two beams are available, the present technique can be applied to each of the path-pair and/or beam combinations. This process may generate multiple estimates of arrival angles of the same arrival path; in this case, the estimates can be weighted and averaged to obtain a better estimate than that achieved using a single path.

At block 376, the process 360 performs an autocorrelation of a first signal received at the first receive beam. In one example, the first arrival path 322 (FIG. 7) has relative travel time, $t_1$, of 17 ms with a relative amplitude, $A_1$, of zero dB. The second arrival path 324 (FIG. 7) has a relative travel time, $t_2$, of 29 ms and a relative amplitude, $A_2$, of −2 dB. The arrival time difference, $\tau$, is $t_2-t_1$ or 12 ms. The unknown angles to solve are Y and Z (FIG. 7).

Figure 10:
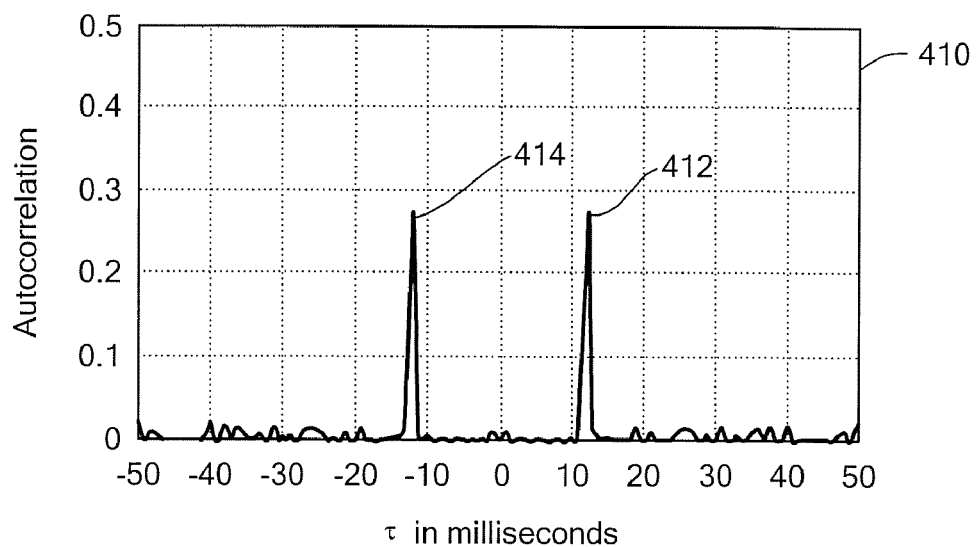

Referring briefly to FIGS. 9 and 10, an autocorrelation of the first signal received at the first receive beam 402 (FIG. 9) is shown in a graph 410 depicted in FIG. 10.

At block 382, the process 360 cross-correlates a second signal received in the second receive beam with the first signal received in the first beam.

Figure 11:
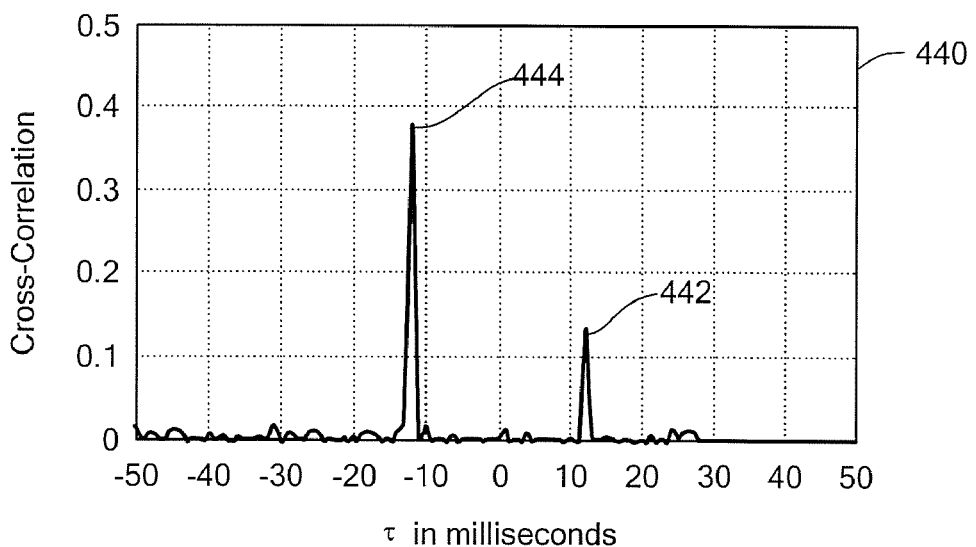
Figure 12:
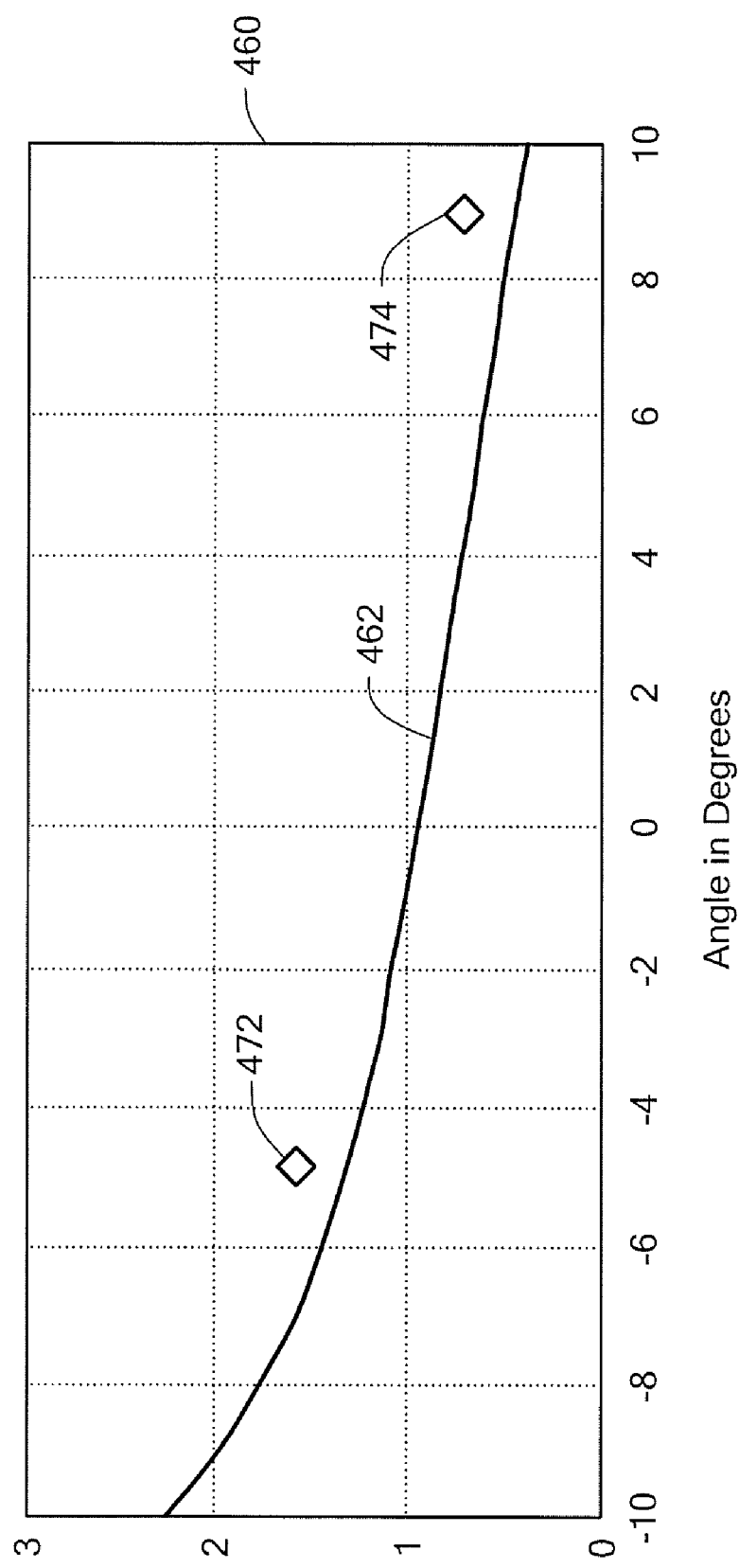

Referring briefly to FIGS. 9 and 11, a graph 440 shows an exemplary cross correlation of the first signal received at the first beam 402 and the second signal received at the second beam 404.

At block 386, the process 360 determines peaks. For example, the autocorrelation peaks and the cross correlation peaks are determined.

Referring briefly to FIG. 10, in one example of the autocorrelation, one peak 412 is at 12 ms and has an autocorrelation amplitude of 0.28 and the other peak 414 is at −12 ms and has an autocorrelation amplitude of 0.28. A correlation peak at time equal to zero has been omitted for scaling purposes.

Referring briefly to FIG. 11, in one example of the cross correlation, one peak 442 is at 12 ms and has a cross correlation amplitude of 0.125 and the other peak 444 is at −12 ms and has a cross correlation amplitude of 0.38 (See FIG. 11).

At block 362, the process 360 forms voltage beam amplitude ratios for the same time delay. For example, the voltage beam amplitude ratio of the second path is given by:

$$v_{22}/v_{12}=(\rho_{12}(+\tau_{21}))/(\rho_{11}(+\tau_{21})),$$

and the voltage beam amplitude ratio of the first path is given by:

$$v_{21}/v_{11}=(\rho_{12}(-\tau_{21}))/(\rho_{11}(-\tau_{21}))$$

Using the autocorrelation and cross correlation peaks in the example for processing of block 386:

$$v_{21}/v_{11}=0.38/0.28=1.35$$

and $$v_{22}/v_{12}=0.125/0.28=0.45$$

At block 394, the process 360 determines beam pattern voltage ratio versus angle. For example, referring briefly to FIG. 12, a graph 460 has a curve 462 representative of the voltage ratios of the first receive beam divided by the second receive beam (e.g., from FIG. 9) versus angles.

The curve 462 can be generated by assuming a path vertical arrival angle, computing a voltage response for two beampatterns of interest, computing their ratio, then repeating for other assumed path vertical arrival angles.

At block 396, the process 360 solves for angles of arrival using the voltage beam amplitude ratios. In the preceding examples, $v_{22}/v_{12}=0.125/0.28=0.45$ at a point 472 (FIG. 12), which corresponds to a first path arrival angle (Angle Y, FIG. 7) of −5 degrees and $v_{21}/v_{11}=0.38/0.28=1.35$ at a point 474 (FIG. 12), which corresponds to a second path arrival angle (Angle Z, FIG. 7) of +9 degrees.

Figure 13:
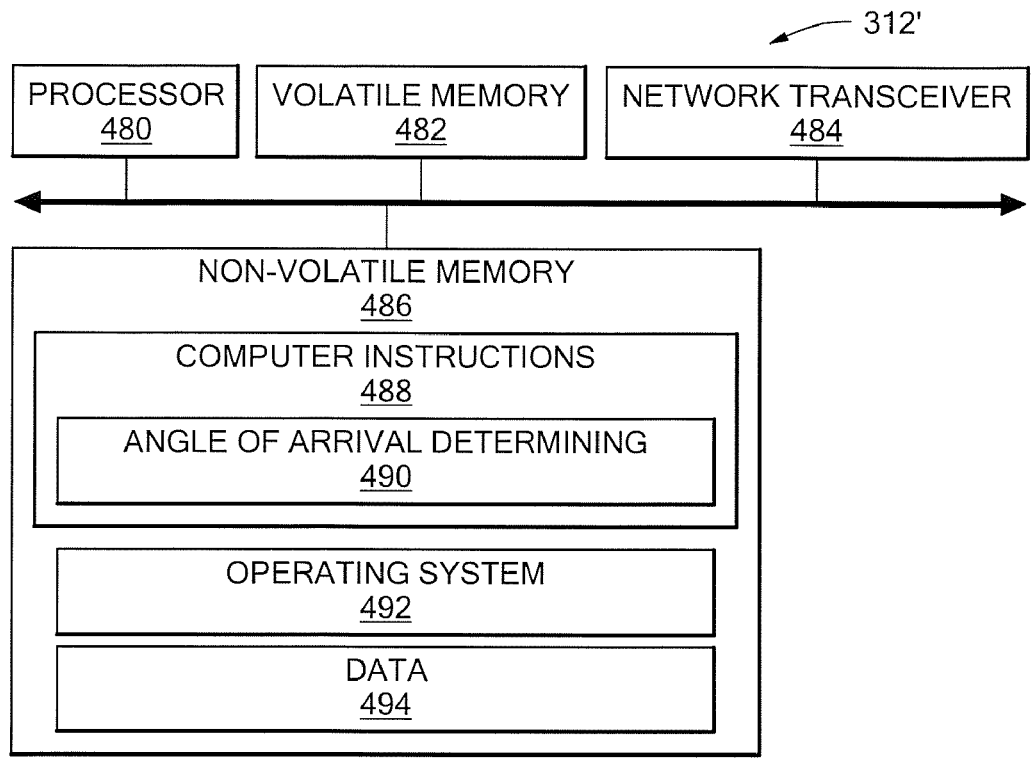
Figure 14:
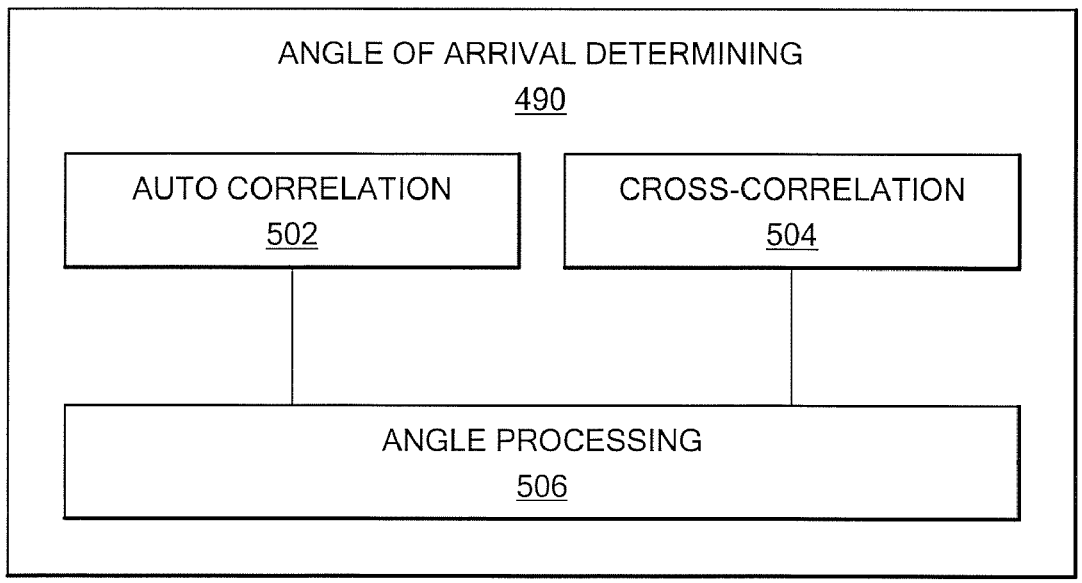

Referring now to FIG. 13, in one example, the processing system 312 of FIG. 7 may be a processing system 312′. The processing system 312′ includes a processor 480, a volatile memory 482, a non-volatile memory 486 (e.g., hard disk) and a network transceiver 484. The non-volatile memory 486 stores computer instructions 488, an operating system 492 and data 494. The computer instructions 488 include instructions 490 to determine an angle of arrival. In one example, depicted in FIG. 14, the instructions 490 to determine an angle of arrival include auto correlation instructions 502 (e.g., instructions to perform processing block 376 of FIG. 8), cross-correlation instructions 504 (e.g., instructions to perform processing block 382 of FIG. 8) and angle processing instructions 506 (e.g., instructions to perform processing blocks 386, 392, 394 and 396 of FIG. 8). The transceiver 484 is used to communicate with the acoustic sensor system 314 of FIG. 7. In one example, the computer instructions 488 are executed by the processor 480 out of the volatile memory 482 to perform process 360.

The process 360 is not limited to the specific processing order of FIG. 8. Rather, any of the processing blocks of FIG. 8 may be re-ordered, combined or removed, performed in parallel or in serial, as necessary, to achieve the results set forth above.

The processing blocks in FIG. 8 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

The bearing/range/depth/received level estimation modules 90, 136 of FIG. 3 are described more fully below in conjunction with FIGS. 15-29. With the techniques described below in conjunction with FIGS. 15-29, the range to and depth of a target can be determined. The techniques are first described in terms of processes of FIGS. 15-18, and then by way of pictorials in FIGS. 19-25. Azimuthal bearing can be refined from that defined by the beam pointing angles, for example, by using beam amplitude interpolation or other methods. Received amplitude levels can be directly measured and also refined by interpolation between beams.

Figure 15:
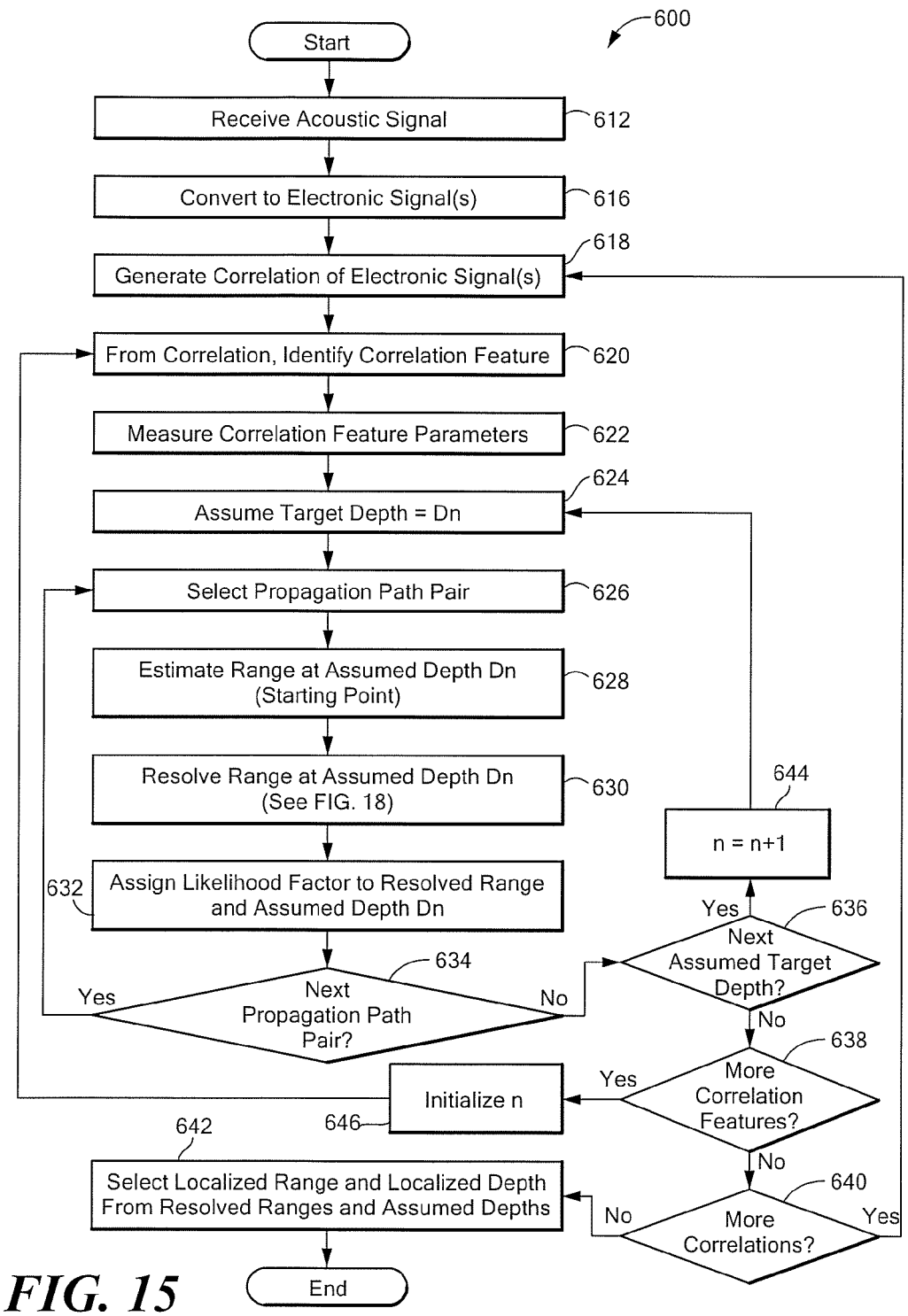
FIGS. 15-29 are representative of target range and depth estimation performed by the electronic system of FIG. 3.

Referring now to FIG. 15, a method 600 of determining a range and a depth of an underwater target (i.e., localizing the target in range and depth) begins at block 612, where an acoustic signal, generated by a target, is received at a sonar system, for example, at the autonomous sonar system 20a of FIG. 2A. The sound signal travels on at least two propagation paths, i.e., a first and a second propagation path, to the sonar system, which receives and processes the sonar signal. Therefore, the sonar signal includes at least a first sound signal portion and a second sound signal portion according to respective sound signal paths. The sound signal can be received with one or more sound transducers (also referred to herein as sound sensors), for example, by the receiving array 32 of FIG. 2A. At block 616, the one or more sound sensors convert the sound signal to another form of energy, for example to a respective one or more electronic signals, collectively referred to as an electronic signal.

While processing of an electronic signal is described herein, it should be appreciated that the same techniques described below can apply to an optical signal, generated in accordance with the acoustic signal received at block 612.

At block 618, the electronic signal is correlated, to provide a correlation having correlation features. The correlation of block 618 can be either an autocorrelation, in which the electronic signal is correlated with itself, or a cross correlation, in which an electronic signal is cross correlated with another electronic signal. In either case, the correlation can generate correlation features (e.g., peaks), one of which can be identified at block 620, which has correlation feature parameters (e.g., time delay, amplitude, and phase), which can be measured at block 622. Correlation features and parameters are described more fully below in conjunction with FIGS. 24 and 25.

At block 624, a depth of a sound-generating target is assumed. In general, the assumed depth can be bounded by known depth capabilities of submarines. For example, in some embodiments, the assumed depth can be bounded between zero and one thousand feet.

At block 626, a propagation path pair can be selected, which could generate the correlation feature identified at block 620 given the assumed depth selected at block 624. As described above, there exist a plurality of discrete propagation paths between a sound source and a sound receiver. At block 626, a pair of the discrete propagation paths can be selected from among the plurality of possible sound paths. For example, a direct path and a surface reflected path can be selected. For another example, a surface reflected path and a bottom reflected path can be selected. In general, the maximum path range can be bounded based on known sound source levels of submarines and a knowledge of ocean acoustics.

Time delay of the identified correlation feature can be an indicator of which propagation paths to select in the propagation path pair, since the time delay of the correlation feature is indicative of a time delay difference of sound traveling on the two propagation paths. Phase of the identified correlation feature can also be an indicator of which propagation paths to select, since it is known that sound bouncing from the ocean surface tends to undergo a phase reversal, while sound bouncing from the ocean bottom, in particular a hard ocean bottom, tends not to undergo a phase reversal.

Though the plurality of potential sound paths is great in number, the propagation path pair is selected from a relative small number of discrete propagation path types. As described above, when sound bounces multiple times from surfaces, it tends to lose intensity and become negligible in a received sound signal.

As described above, through there exist a large number of sound paths between a sound source and a sound receiver, some of the propagation paths will be dominant, i.e., sound received at a sound receiver will have content largely from the dominant sound paths.

Figure 17:
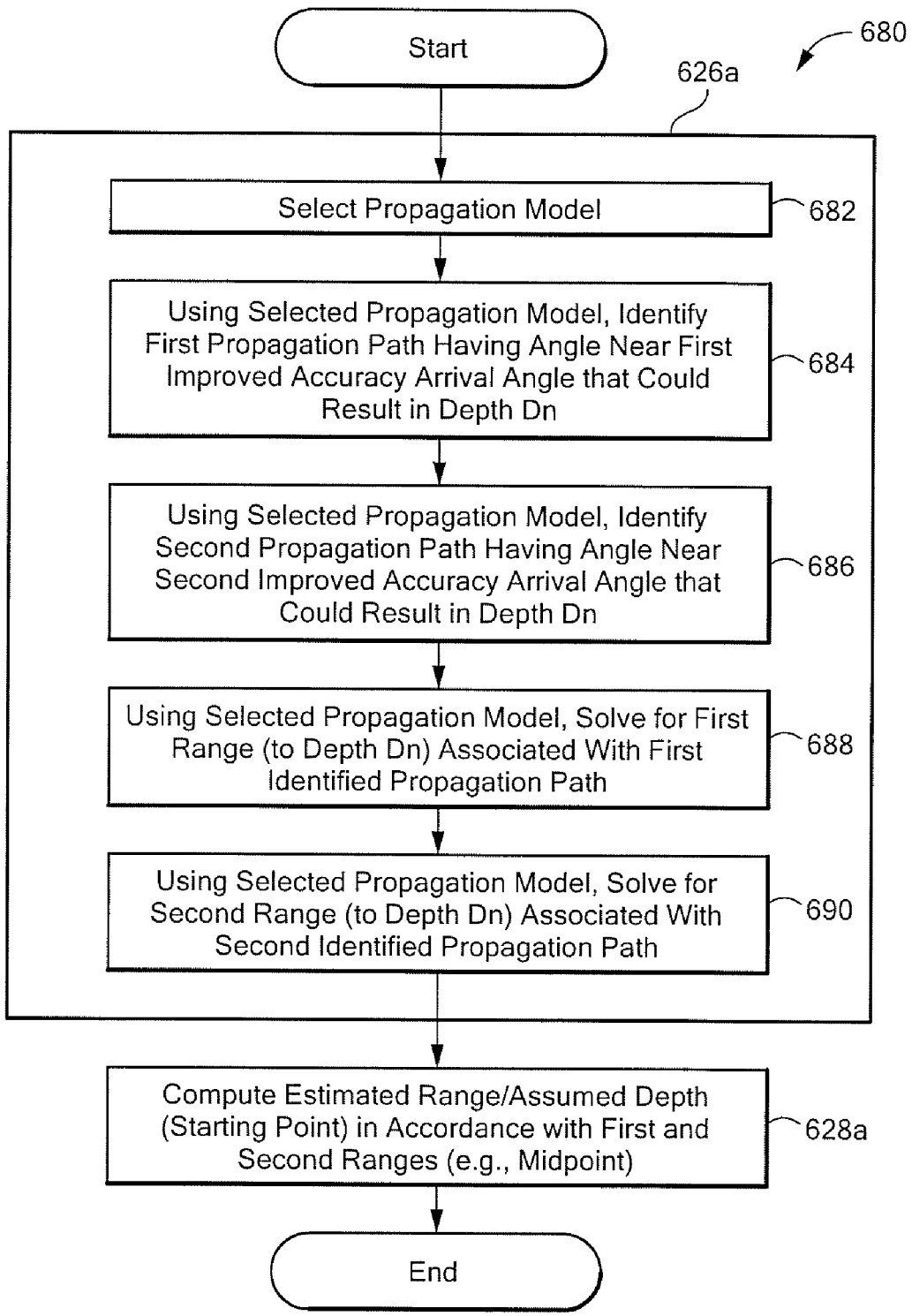
Figure 17A:
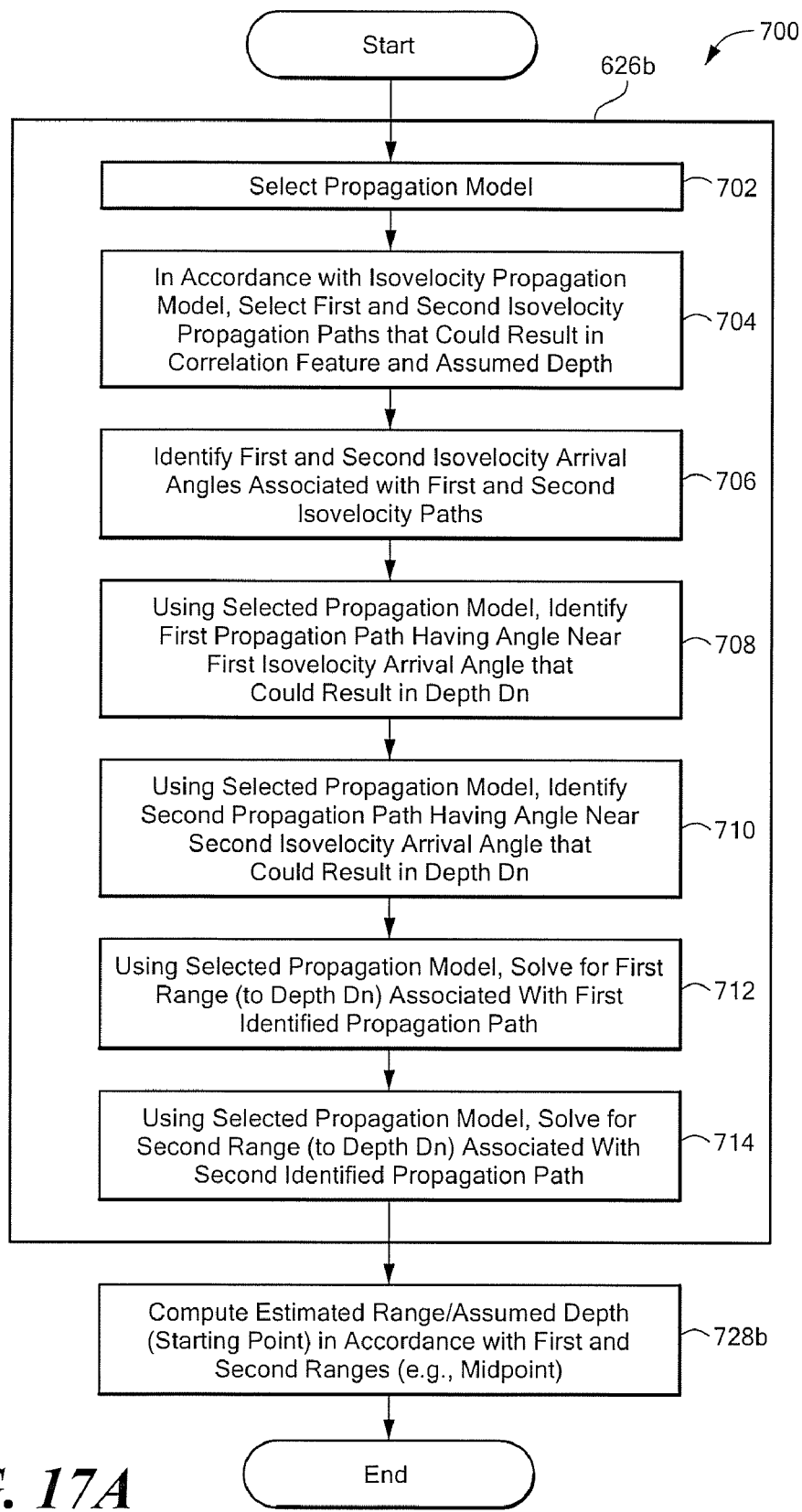
FIGS. 17A and 17B are flow charts showing further details of the process of FIG. 15 alternate to those of FIG. 17.
Figure 17B:
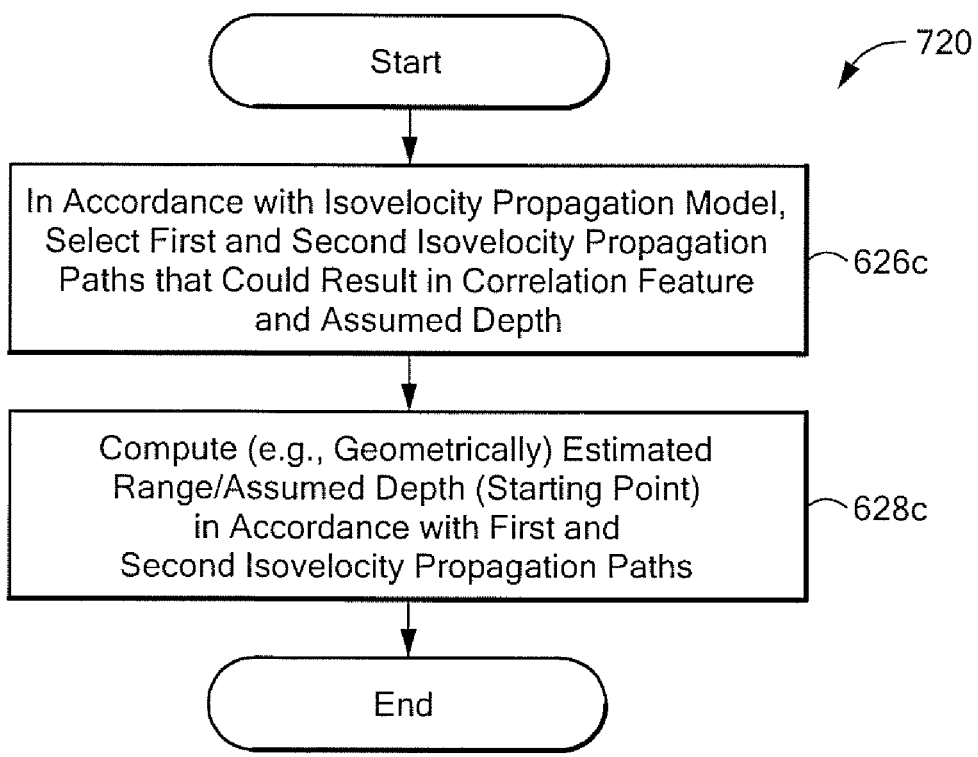

The selection of the propagation path pair is described more fully below in conjunction with FIGS. 17-17B, in which the selection is made knowing an arrival angle of the sound at the sound receiver (FIG. 17), and in which the selection is made without knowing the arrival angle (FIGS. 17, 17B).

From the selected propagation path pair of block 626, and given the assumed depth of the target at block 624, a range to the target is first estimated at block 628, to provide an estimated range at the assumed depth (estimated range/assumed depth, also referred to herein as a starting point), and then resolved at block 630, to provide a resolved range at the assumed depth (resolved range/assumed depth).

The estimated range/assumed depth is more fully described below in conjunction with FIGS. 17-17B, and the resolved range/assumed depth is more fully described below in conjunction with FIG. 18. Let it suffice here to say that the estimated range/assumed depth provides a starting point, from which the resolved range/assumed depth can be determined. However, the resolved range/assumed depth may not be indicative of a final range and depth (localization) of the target.

To this end, at block 632, a likelihood factor is assigned to the resolved range/assumed depth generated at block 630. The likelihood factor is described more fully below in conjunction with FIG. 18. The likelihood factor is a value, which can be generated in a variety of ways, which is indicative of the quality of the accuracy of the resolved range/assumed depth generated at block 630. Therefore, the resolved range/assumed depth generated at block 630 can be compared with other resolved ranges/assumed depths generated as described below, in order to select a best resolved ranges/assumed depth as indicative of the location of the target in range and depth.

Decision blocks 634-640 are representative of loops that can be performed through the block 618-632 in order to generate further resolved ranges/assumed depths at block 630 and further corresponding likelihood factors at block 632. Decision block 634 can be used to select other propagation path pairs at block 626. Decision block 636 in conjunction with block 644 can be used to select other assumed target depths at block 624. Decision block 638 in conjunction with block 646 can be used to identify another correlation feature at block 620 in the correlation generated at block 618. Decision block 640 can be used to generate further correlations at block 618.

Having completed all of the loops by way of decision blocks 634-640, and therefore, having generated a plurality of resolved ranges/assumed depths and corresponding likelihood factors, at block 642, one resolved range/assumed depth is selected from among the plurality of resolved ranges/assumed depths, by inspecting the corresponding likelihood factors. The one resolved range/assumed depth is referred to herein as a localized range and localized depth (localized range/localized depth). In some embodiments, as further described below in conjunction with FIGS. 27-29, the likelihood factors may be used to compute the localized range/localized depth as a weighted average range and a weighted average depth. The localized range/localized depth represents the best estimate of range and depth to the target and is further described below is conjunction with FIG. 18 and FIGS. 27-29.

Figure 16:
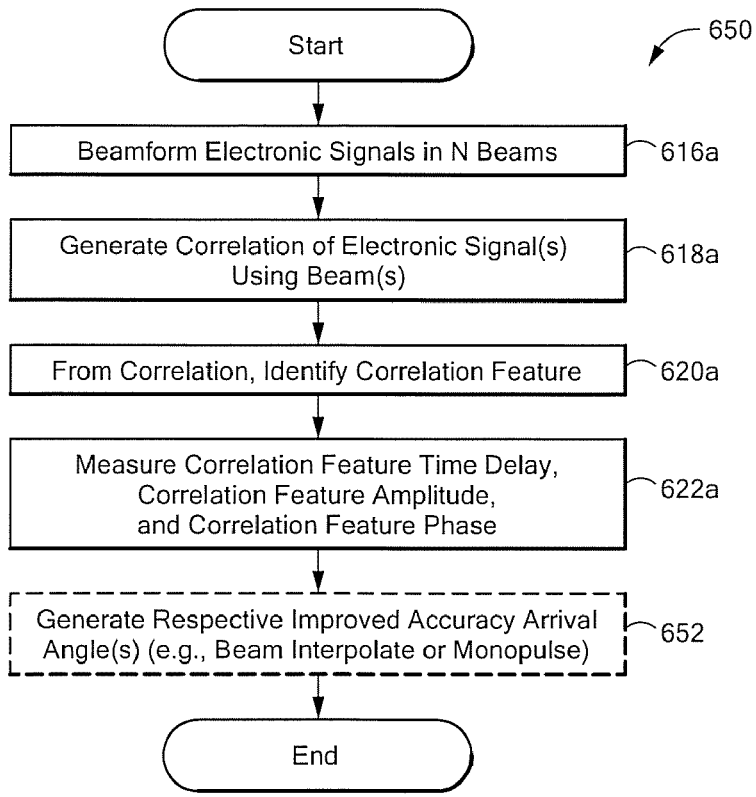

Referring now to FIG. 16, in which similar elements of FIG. 15 are shown having similar reference designators, but with an appended character "a," a process 650 shows further details of part of the process 600 of FIG. 15, in particular for a process that includes beamforming of the acoustic signal received at block 612 of FIG. 15.

At block 616a, the electronic signals of block 616 of FIG. 15 are beamformed to provide a number, N, of acoustic receive beams. At block 618a, the beamformed signal is correlated. For example an electronic signal representative of one acoustic beam can be autocorrelated. For another example, two electronic signals representative of two acoustic beams can be cross correlated.

At block 620a, in whatever form of correlation is generated at block 618a, a correlation feature is identified in the correlation. At block 622a, correlation feature parameter values are measured, for example, a correlation feature time delay value, a correlation feature amplitude value, and/or a correlation feature phase value.

At block 652, optionally, the beamformed signals corresponding to the plurality of acoustic beams generated at block 616a can be interpolated in order to generate improved accuracy arrival angles associated with the acoustic signal received at block 612 of FIG. 15. It will be understood that each correlation feature in the correlation generated in block 618a can be associated with two sound propagation paths, which can arrive at the sound sensors on different angles or at similar angles. Therefore, at block 652, one or two angles of arrival can be identified.

For example, where an autocorrelation in one beam is generated at block 618*a*, and a resulting correlation feature magnitude is measured, similar autocorrelations can be generated using adjacent beams, and magnitudes of corresponding correlation features comparable to the correlation feature of the first beam (similar time delay) can be combined to provide one improved accuracy arrival angle. This improved accuracy arrival angle can essentially assume that the two sound paths arrive at the same angle.

For another example, where a cross correlation between two beams is generated at block 618*a*, and a resulting correlation feature magnitude is measured, similar cross correlations can be generated using adjacent beams, and magnitudes of corresponding correlation features comparable to the correlation feature of the first beam pair can be combined to provide two improved accuracy arrival angles.

In some alternate arrangements, the improved accuracy arrival angle(s) is selected instead to be the beam steering angle of the beam(s) used to generate the correlation at block 618*a*.

In conjunction with FIGS. 7-14, a different technique to identify a vertical arrival path pair is shown. The vertical arrival path pair identified in FIGS. 7-14 can be substituted for block 652.

As described more fully below, in some embodiments, the improved accuracy arrival angles can be used in combination with other factors to generate the likelihood factors in block 632 of FIG. 15.

Figure 16A:
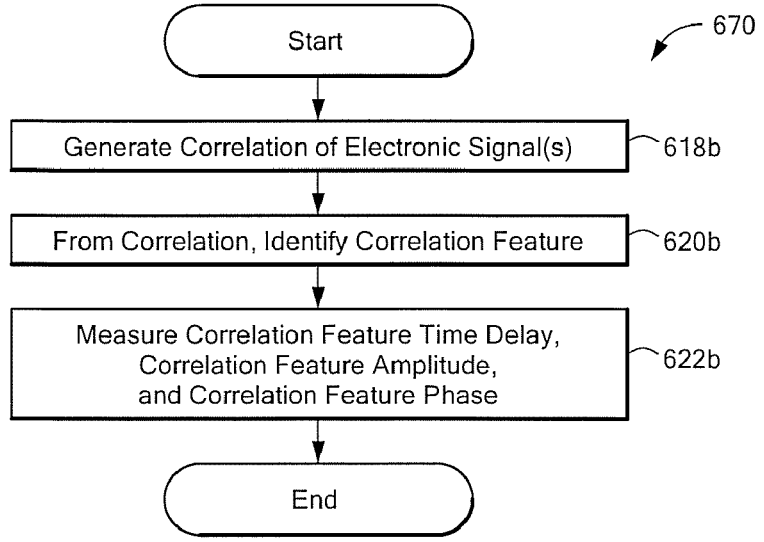
FIG. 16A is a flow chart showing further details of the process of FIG. 15 alternate to those of FIG. 16.

Referring now to FIG. 16A, in which similar elements of FIG. 15 are shown having similar reference designators, but with an appended character "b," a process 670 shows further details for a process that does not include beamforming. At block 618*b*, the electronic signal from block 616 of FIG. 15 is correlated. For example an electronic signal provided by one sound sensor having a single beampattern, for example, an omnidirectional beampattern, can be autocorrelated. For another example, two electronic signals provided by two respective sound sensors, each having a respective single beampattern, for example, respective omnidirectional beampatterns, can be cross correlated.

At block 620*b*, in whatever form of correlation is generated at block 618*b*, a correlation feature is identified in the correlation. At block 622*b*, correlation feature parameters are measured, for example, a correlation feature time delay, a correlation feature amplitude, and/or a correlation feature phase.

Referring now to FIG. 17, in which similar elements of FIG. 15 are shown having similar reference designators, but with an appended character "a," a process 680 shows further details of the blocks 626-628 of FIG. 15, in particular for a process that uses beamforming to achieve the sound arrival angles described in conjunction with of FIG. 16.

At block 682, a propagation model is selected. The selected propagation model can be any form of ray trace model or it can be an isovelocity propagation model. In general, it is advantageous to select a ray trace propagation model rather than an isovelocity propagation model, both of which are described above, since a ray trace model will ultimately yield a more accurate localization of the underwater target in range and in depth.

At block 684, using the selected propagation model, a first propagation path having a first path angle (first simulated arrival angle) is identified that could result in an arrival angle near to the first improve accuracy arrival angle identified at block 652 of FIG. 16 (or, in another embodiment, a beam angle of a beam generated in FIG. 16), and that could result in the depth assumed at block 624 of FIG. 15. Alternatively, a first vertical angle identified in conjunction with FIGS. 7-14 could be used.

At block 686, using the selected propagation model, a second propagation path having a second path angle (second simulated arrival angle) is identified that could result in an arrival angle near to a second improved accuracy arrival angle identified at block 652 of FIG. 16 (or, in another embodiment, a beam angle of a beam generated in FIG. 16), and that could result in the depth assumed at block 624 of FIG. 15. Alternatively, a second vertical angle identified in conjunction with FIGS. 7-14 could be used.

It should be recognized that, where autocorrelation of a single beam is used in block 618*a* of FIG. 16, the first and second path angles can be the same angle. This arrangement is described below in conjunction with FIG. 22. However, where cross correlation of two beams is used in block 618*a* of FIG. 16, the first and second path angles can be different angles. This arrangement is described below in conjunction with FIG. 19.

At block 688, using the selected propagation model and the first identified propagation path, a first range is calculated to the depth assumed at block 624 of FIG. 15. Similarly, at block 690, using the selected propagation model and the second identified propagation path, a second range is calculated to the depth assumed at block 624 of FIG. 15. Therefore, blocks 688 and 690 result in two ranges at the assumed depth.

At block 628*a*, the two ranges are combined to provide a single "estimated range/assumed depth," which can serve as the starting point for further calculation of range described above in conjunction with block 628 of FIG. 15. In some embodiments, a midpoint between the first and second ranges of blocks 688 and 690 can be computed at block 628*a*. In other embodiments, one of the first and second ranges can result from the calculation of block 628*a*. However, other starting ranges can be used, which are related to the first and second ranges of blocks 688 and 690.

Referring now to FIG. 17A, in which similar elements of FIG. 15 are shown having similar reference designators, but with an appended character "b," a process 700 shows further details of the blocks 626-628 of FIG. 15, in particular for a process that does not use beamforming in order to achieve the improved accuracy arrival angles described in conjunction with block 652 of FIG. 16. Essentially, arrival angles of the sound signal portions arriving on different propagation paths within the sound signal received at block 612 of FIG. 15 cannot be directly measured, but are estimated by techniques described below.

At block 702, a propagation model is selected. As described above in conjunction with FIG. 17, the selected propagation model can be any form of ray trace model or it can be an isovelocity propagation model. In general, it is advantageous to select a ray trace propagation model rather than an isovelocity propagation model, both of which are described above, as a ray trace model will ultimately yield a more accurate localization of the underwater target in range and in depth.

At block 704, however, regardless of the propagation model selected at block 702, in accordance with an isovelocity propagation model, first and second isovelocity (i.e., straight) propagation paths are selected, that could result in the identified correlation feature of block 620 of FIG. 15, having a measured time delay as in block 622 of FIG. 15, and the assumed depth of block 624 of FIG. 15. Using the isovelocity propagation model, the two propagation paths can be computed geometrically, using techniques described below in conjunction with FIG. 20, recognizing that the measured time delay is representative of a time delay difference of the two selected isovelocity propagation paths.

At block 706, from the first and second selected isovelocity propagation paths, first and second isovelocity arrival angles at sound sensor are computed at block 706. These arrival angles will be recognized to be mere estimates of potential arrival angles according to two isovelocity propagation paths. However, as described above, it is known that sound tends to travel on non-straight propagation paths as it travels in the ocean.

Therefore, at block 708, using the propagation model selected at block 702, which can be a ray trace model, and using the first isovelocity arrival angle, a first propagation path (e.g., non-straight) is identified that has an arrival angle near to the first isovelocity arrival angle. Similarly, at block 710, using the propagation model selected at block 702, and using the second isovelocity arrival angle, a second propagation path (e.g., non-straight) is identified that has an arrival angle near to the second isovelocity arrival angle.

It should be recognized that, though the process of FIG. 17A is associated with a system that does not have beamforming, i.e., has a generally omnidirectional receiving beampattern, the arrival angle of the first and second propagation paths described above in conjunction with blocks 708 and 710, provide similar angle of arrival information as block 652 of FIG. 16 but for a system that does not use beamforming, and therefore, subsequent blocks 712, 714, 628b are similar to blocks 688, 690, 628a of FIG. 17.

At block 712, using the selected propagation model and the first identified propagation path, a first range is calculated to the depth assumed at block 624 of FIG. 15. Similarly, at block 714, using the selected propagation model and the second identified propagation path, a second range is calculated to the depth assumed at block 624 of FIG. 15. Therefore, blocks 712 and 714 result in two ranges at the assumed depth.

At block 628b, the two ranges are combined to provide a single "estimated range/assumed depth," which can serve as the starting point for further calculation of range. In some embodiments, a midpoint between the first and second ranges of blocks 712, 714 can be computed at block 628b. In other embodiments, one of the first and second ranges can result from the calculation of block 628b. However, other starting ranges can be used, which are related to the first and second ranges of blocks 712 and 714.

Referring now to FIG. 17B, in which similar elements of FIG. 15 are shown having similar reference designators, but with an appended character "c," a process 720 shows further details of the blocks 626-628 of FIG. 15, alternate to the process 700 of FIG. 17A, in particular for a process that does not use beamforming to achieve the improved accuracy arrival angles described in conjunction with block 652 of FIG. 16. Essentially, arrival angles of the sound signal portions arriving on different propagation paths within the sound signal received at block 612 of FIG. 15 cannot be directly measured, but are estimated. However, unlike the process 700 of FIG. 17A, only an isovelocity propagation model is used.

At block 626c, similar to block 704 of FIG. 17A, in accordance with an isovelocity propagation model, first and second isovelocity (i.e., straight) propagation paths are selected, that could result in the identified correlation feature of block 620 of FIG. 15, having a measured time delay as in block 622 of FIG. 15, and the assumed depth of block 624 of FIG. 15. As described above, using the isovelocity propagation model, the two propagation paths can be computed geometrically, using techniques described below in conjunction with FIG. 20, recognizing that the measured time delay is representative of a time delay difference of the two selected isovelocity propagation paths.

At block 628c, an estimated range/assumed depth (starting point) is calculated based upon the isovelocity propagation paths. It should be noted that, unlike the process 700 of FIG. 17A, the angles of the propagation paths are not used.

Figure 18:
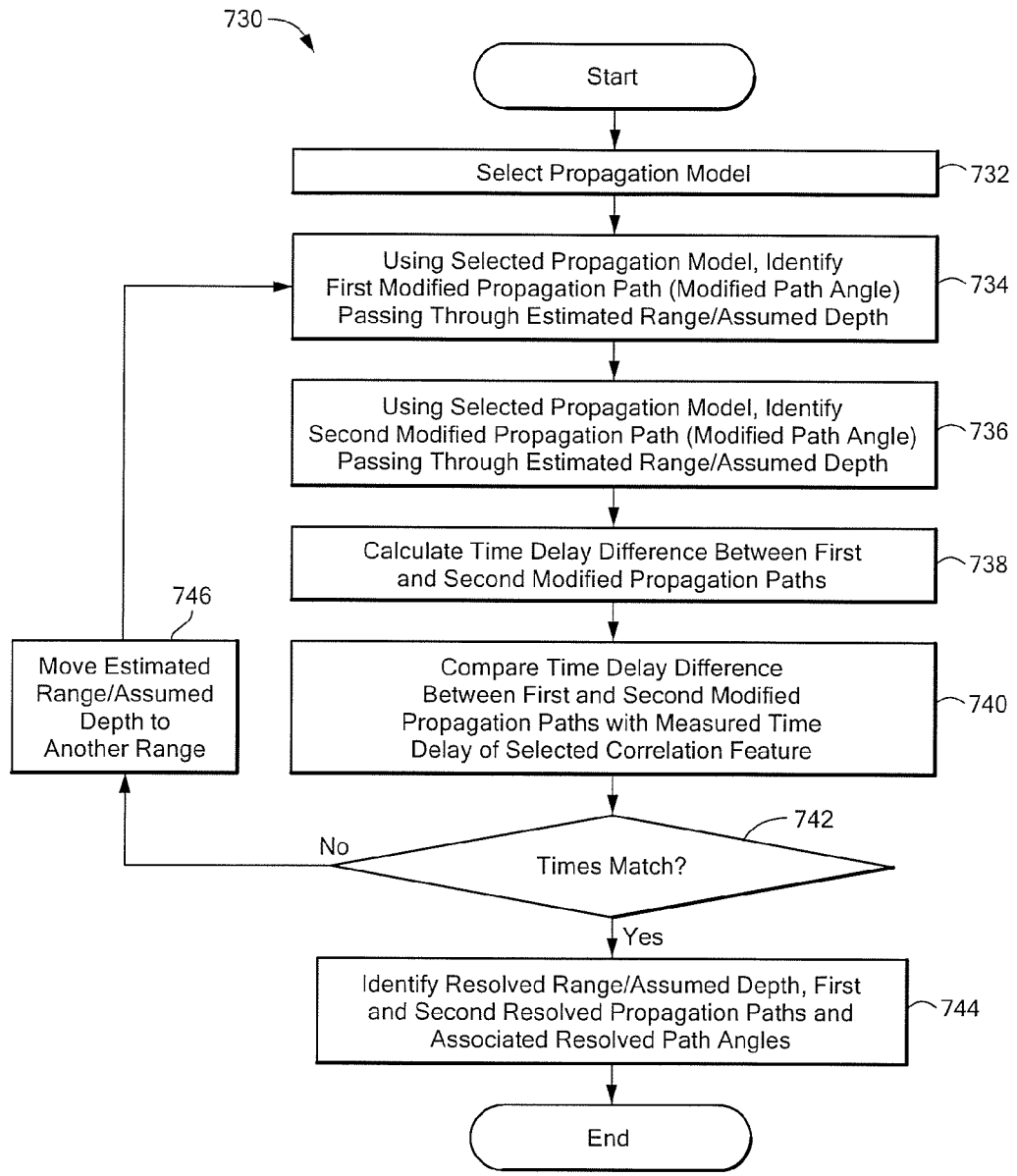

Referring now to FIG. 18, a process 730 can be representative of the process of block 630 of FIG. 15, and can result in a so-called "resolved range" at the assumed target depth (resolved range/assumed depth) of block 630 of FIG. 15. In essence, the resolved range/assumed depth can be more accurate than the estimated range/assumed depth provided at block 628 of FIG. 15, as represented in alternate methods 680, 700, 720 of FIGS. 17-17B, respectively.

The process 730 begins at block 732, where a propagation model is selected. As described above in conjunction with FIG. 17, the selected propagation model can be any form of ray trace model or it can be an isovelocity propagation model. In general, it is advantageous to select a ray trace propagation model rather than an isovelocity propagation model, both of which are described above, as a ray trace model will ultimately yield a more accurate localization of the underwater target in range and in depth. The propagation model selected at block 732 need not be the same propagation model selected at other blocks described above.

At block 734, using the selected propagation model, a first modified propagation path is identified that passes through a point represented by the estimated range/assumed depth described in blocks 628, 628a, 628b, 628c of FIGS. 15, 17, 17A, and 17B, respectively. Similarly, at block 736, using the selected propagation model, a second modified propagation path is identified that passes through a point represented by the estimated range/assumed depth.

At block 738, a time delay difference is calculated between the first and second modified propagation paths. In some embodiments, the time delay difference can be calculated in accordance with the propagation model selected at block 732.

At block 740, the time delay difference calculated at block 738 is compared with the measured time delay associated with the identified correlation feature, which is measured at blocks 622, 622a, 622b of FIGS. 15, 16, and 16A, respectively.

At block 742, if the compared time delays do not match within a predetermined matching threshold, then the process continues to block 746, where the point corresponding to the estimated range/assumed depth is moved to another range, and therefore, to a new estimated range/assumed depth. To this end, the range can be moved to a shorter range or a greater range at the assumed depth selected at box 624 of FIG. 15.

The direction of range movement of the estimated range/assumed depth can be determined in a variety of ways. In some embodiments, the direction is selected to toward greater ranges. In other embodiments, the direction is selected to be toward shorter ranges. In still other embodiments, the direction is selected in accordance with a reduction in the time delay difference resulting from another time delay comparison as in block 740.

The process then repeats at block 734, where the new estimated range/assumed depth is processed, resulting in yet another time delay difference at block 740. The process loops via decision block 742 until, at block 742, the compared time delays do match within the predetermined matching threshold. When this match occurs, at block 744, the estimated range/assumed depth that resulted in the match is deemed to be a resolved range at the assumed depth (resolved range/assumed depth), and the associated first and second propagation paths are deemed to be resolved first and second propagation paths, with respective first and second resolved path angles.

The resolved range/assumed depth is a point in space at which the underwater target may be present. However, by way of the looping process of FIG. 15, a plurality of resolved ranges at a plurality of assumed depths may be generated, for one or a plurality of correlation features resulting from one or a plurality of correlations. Eventually, the process of FIG. 15, at block 642, selects a localized range and a localized depth from the plurality of resolved ranges and corresponding assumed depths.

The selection of the one localized range/localized depth can be performed in a variety of ways. In one particular embodiment, the selection is based upon a likelihood factor of those assigned to the plurality of resolved ranges/assumed depths at block 632 of FIG. 15.

The likelihood factors can be generated in a variety of ways. In one particular embodiment, the likelihood factors are generated by comparing, for each one of the resolved ranges/assumed depths, at least one of a calculated arrival angle of the first resolved propagation path with the first improved accuracy arrival angle measured at block 652 of FIG. 16, or a calculated arrival angle of the second resolved propagation path with the second improved accuracy arrival angle measured at block 652 of FIG. 16. This comparison of arrival angles can be described by equation below.

$$q = e^{\frac{-(\tilde{\theta}_1 - \theta_1)^2}{2\sigma_{\theta_1}^2}} e^{\frac{-(\tilde{\theta}_2 - \theta_2)^2}{2\sigma_{\theta_2}^2}} \quad (1)$$

where: q is a likelihood factor, θ are the measured improved accuracy arrival angles, θ (with tilde) are the calculated arrival angles for the resolved range/assumed depth, and σ is standard deviation.

In other embodiments, and in particular, in embodiments for which an arrival angle is not measured (i.e., non-beamformed arrangements), other parameters can be used to generate likelihood factors, used to select the localized range and localized depth. For example, in some embodiments, the likelihood factors assigned to each resolved range/assumed depth at block 632 of FIG. 15 can be representative of a magnitude (or a signal to noise ratio) of the correlation feature identified at block 620 of FIG. 15. In these embodiments, a resolved range/assumed depth having a correlation feature with the best signal to noise ratio can be selected as the localized range/assumed depth.

In still other embodiments, still other parameters can be used to generate likelihood factors, used to select the localized range and localized depth. For example, multiple correlation features can support the generation of a multiplicity of possible range-depth pairs since the path order of arrival is not known apriori. In some embodiments, for each combination of assumed arrival path order, a resolved range/assumed depth is calculated. These ranges can then be used to calculate a mean range and variance. A likelihood factor can be developed, for example, using the inverse of the variance. The resolved range/assumed depth path combination having the highest likelihood factor is selected as the solution for localized range/localized depth; or alternatively, a weighted average can be used.

Referring now to Tables 1 and 2, an example is given that calculates likelihood factors by using the inverse of the variance of range, as described above. In this example, isovelocity (straight) propagation paths are used to generate ranges and depths geometrically according to calculations similar to those described below in conjunction with FIGS. 20 and 23. However, similar techniques can also be used when non-isovelocity propagation paths are assumed, as shown below in conjunction with FIG. 19.

In Table 1, resolved ranges/assumed depths are shown for a source at 60 yards depth and a range of 2500 yards from a receiver located at a depth of 170 yards. A water depth of 200 yards is assumed. The computed travel times for the direct (D1), surface reflected (S1), and bottom reflected (B1) paths are 1.472, 1.476 and 1.474 seconds respectively. These delays result in a corresponding set of autocorrelation time delays of 2.0, 2.8, and 4.8 ms, respectively.

For this particular example, range and depth solutions are obtained generally using the method of FIG. 15. However, for an isovelocity case, the resolved ranges/assumed depths of block 630 (FIG. 15) are the same as the estimated ranges/assumed depths of block 628 (FIG. 15). Table 1 shows calculated ranges for different path combinations that can be attributed to measured correlation features having the delays of 2.0, 2.8, and 4.8 ms. Notations, for example, D1:S1, are indicative of a correlation feature generated by an autocorrelation, and are representative of a path pair, for example, a direct path and a surface reflected path.

TABLE 1

| MEAS. DELAY | ASSUMED PATHS | ASSUMED DEPTH, yards | | | | | |
|---|---|---|---|---|---|---|---|
| | | 15 | 30 | 45 | 60 | 75 | 90 |
| 2.8 | D1:S1 | 1066 | 2132 | 3198 | 4264 | 5330 | 6396 |
| 2.0 | D1:B1 | 3309 | 3041 | 2772 | 2504 | 2236 | 1968 |
| 4.8 | S1:B1 | 737 | 0 | 737 | 1474 | 2212 | 2949 |
| | mean rng | 1704 | 1724 | 2236 | 2747 | 3259 | 3771 |
| | stdev rng | 1400 | 1561 | 1315 | 1411 | 1793 | 2326 |
| 4.8 | D1:S1 | 627 | 1253 | 1880 | 2506 | 3133 | 3760 |
| 2.0 | D1:B1 | 3309 | 3041 | 2772 | 2504 | 2236 | 1968 |
| 2.8 | S1:B1 | 1254 | 0 | 1254 | 2508 | 3762 | 5016 |
| | mean rng | 1730 | 1431 | 1969 | 2506 | 3044 | 3581 |
| | stdev rng | 1403 | 1528 | 763 | 2 | 767 | 1532 |
| 4.8 | D1:S1 | 627 | 1253 | 1880 | 2506 | 3133 | 3760 |
| 2.8 | D1:B1 | 2320 | 2132 | 1944 | 1756 | 1568 | 1379 |
| 2.0 | S1:B1 | 1789 | 0 | 1789 | 3577 | 5366 | 7155 |
| | mean rng | 1578 | 1128 | 1871 | 2613 | 3356 | 4098 |
| | stdev rng | 866 | 1071 | 78 | 915 | 1909 | 2902 |

Referring now to Table 2, likelihood factors are computed and normalized using the reciprocal of squares of the standard deviations of range (stdev rng) of Table 1. A localized range and localized depth is computed using the likelihood factors. In some embodiments, weighted ranges and likelihood factors can be computed for each of the assumed depths.

TABLE 2

| | ASSUMED DEPTH, yards | | | | | |
|---|---|---|---|---|---|---|
| | 15 | 30 | 45 | 60 | 75 | 90 |
| Wt. Range | 1638 | 1347 | 1873 | 2506 | 3110 | 3713 |
| Likelihood | 0.000 | 0.000 | 0.001 | 0.999 | 0.000 | 0.000 |

The minimum variance (maximum likelihood) solution is a localized range/assumed depth equal to 2506 yards range and 60 feet depth. In some embodiments, a single weighted localized range/assumed depth can be calculated, which, using the above table data, gives the same results. Note that there is a six yard error (0.24% error), which is due to an approximation described below (for most passive sonar applications this error is negligible).

In some embodiments, a resolved range/assumed depth having a largest likelihood factor is selected to be the localized range and localized depth. However, it should be apparent from discussion above, that in some other embodiments, the resolved ranges/assumed depths and the associated likelihood factors can be further processed (i.e., combined, e.g., by a weighted average) to provide the localized range/localized depth. Another example of further processing of the resolved ranges/assumed depths is described below in conjunction with FIGS. 27-29.

Figure 19:
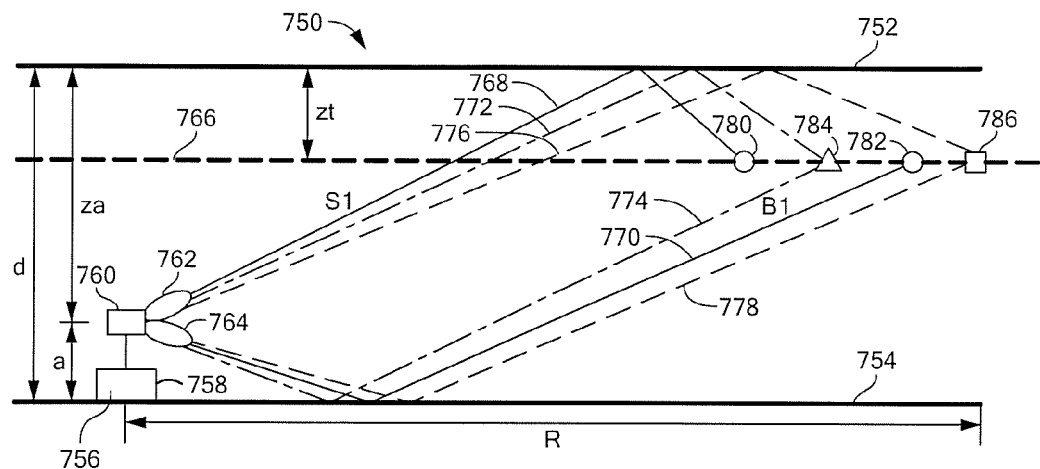

Referring now to FIG. 19, a scenario 750 is representative of the processes described above for systems that use beamforming and cross correlation between signals associated with two different receive beams. A line 752 is representative of a surface of a water basin, for example, a surface of the ocean. A line 754 is representative of a bottom of the water basin. A sonar system 756 is positioned generally at the bottom of the water basin. The sonar system 756 can be the same as or similar to the autonomous sonar system 20a of FIG. 2A. A dashed line 766 is representative of an assumed target depth in accordance with block 624 of FIG. 15.

The sonar system 756 includes a sound sensor 762 coupled to a processor 758. In some embodiments, the sound sensor 760 includes a single receiving element, for example, cylindrical receiving element, adapted to receive sound and to convert the received sound to an electronic signal. In other embodiments, the sound sensor 760 can include more than one receiving element, each adapted to receive sound and to convert the received sound to a respective electronic signal.

Whether the sound sensor 760 is a single receiving element or more than one receiving element, the sound sensor 760 is capable of being used to form at least two receive beams 762, 764. The receive beams can be pointed toward any vertical angle. Here, the receive beam 762 points upward, in order to receive sound arriving on a surface reflected path, and the receive beam 764 points downward, in order to receive sound arriving one a bottom reflected path.

It should be understood that various propagation paths described below are shown as straight lines in FIG. 19. However, as described above, sound propagating in water tends to propagate on non-straight propagation paths. The propagation paths shown in FIG. 19 are represented by straight lines for clarity, but will be understood to be curved, particularly when calculated by a ray trace propagation model as described below.

A first propagation path 768 corresponds to a surface reflected path selected in accordance with block 84 of FIG. 17. As described above in conjunction with FIG. 17, the first propagation path 768 is selected using a selected propagation model so that an arrival angle of the first propagation path 768 at the sonar system 756 is near to an improved accuracy arrival angle identified, for example, at block 652 of FIG. 16.

A second propagation path 770 corresponds to a bottom reflected path selected in accordance with block 86 of FIG. 17. As described above in conjunction with FIG. 17, the second propagation path 770 is selected using the selected propagation model so that an arrival angle of the second propagation path 770 at the sonar system 756 is near to another improved accuracy arrival angle identified, for example, at block 652 of FIG. 16.

The first and second propagation paths 768, 770, a surface reflected path and a bottom reflected path are those paths that are first selected in accordance with FIG. 17. The first propagation path 768 results in a calculated point 780 corresponding to a first range to the target at the assumed depth 766, in accordance with block 688 of FIG. 17. Similarly, the second propagation path 770 results in a calculated point 782 corresponding to a second range to the target at the assumed depth 766, in accordance with block 690 of FIG. 17.

The first and second points are used to compute a point 784 corresponding to an estimated range/assumed depth in accordance with block 628a of FIG. 17. The point 784 can be selected to be a midpoint in range between the points 780, 782. However, in other embodiments, the point 784 can be selected to be one of the points 780, 782. In still further embodiments, the point 784 can be selected based upon any function of the positions of the points 780, 782. The point 784 corresponds to the above-described "starting point" at block 628a of FIG. 17.

Again using the selected propagation model, and using the point 784, which corresponds to the estimated range/assumed depth calculated at block 628a of FIG. 17, propagation paths 772, 774, which pass though the point 784 can be calculated. Furthermore, a time delay between the propagation paths 772, 774 can be calculated, for example, using the selected propagation model.

Sound arriving in the two beams 762, 764 can be cross correlated by the sonar system 756, resulting in a correlation feature having a time delay, an amplitude, and a phase, which can be measured, for example, in blocks 622, 622a of FIGS. 15 and 16. It will be understood that the measured time delay of the correlation feature can correspond to a time delay between an actual (not modeled) surface reflected propagation path and an actual bottom reflected propagation path.

The above described calculated time delay difference between the propagation paths 772, 774 can be compared to the above-described measured time delay associated with the identified correlation feature, which, in this case, is a correlation feature in a cross correlation. If the time delay difference is too large, the point 784 can be moved in range at the assumed depth 766, for example to the right. At each movement, in accordance with block 742 of FIG. 18, the time delay difference is examined to identify if the time delay difference is sufficiently small, i.e., below a time delay difference threshold. Eventually, after one of more movements of the point 784, the point 786 is identified at which the time delay difference is sufficiently small. The point 786 corresponds to the above-described resolved range/assumed depth identified at block 744 of FIG. 18.

The resolved range/assumed depth 786 has a first resolved propagation path 776 with a first resolved path angle (not shown) at the sonar system 756 and a second resolved propagation path 778 having a second resolved path angle (not shown) at the sonar system 756.

It will be appreciated that the point 786 can correspond to but one of a plurality of resolved ranges/assumed depths identified by the process 600 of FIG. 15. One localized angle/localized depth is selected from among the plurality of resolved ranges/assumed depths by the process described above in conjunction with block 642 of FIG. 15.

Figure 20:
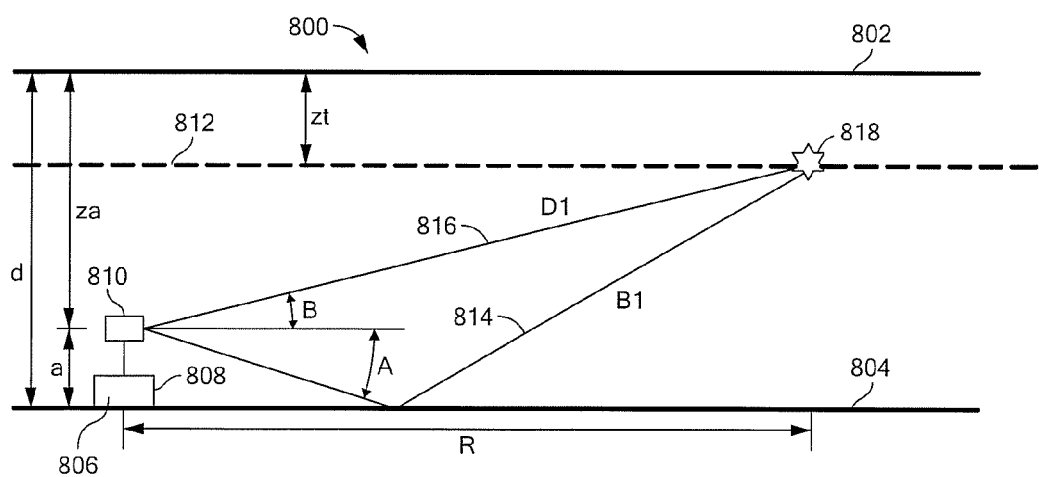
Figure 20A:
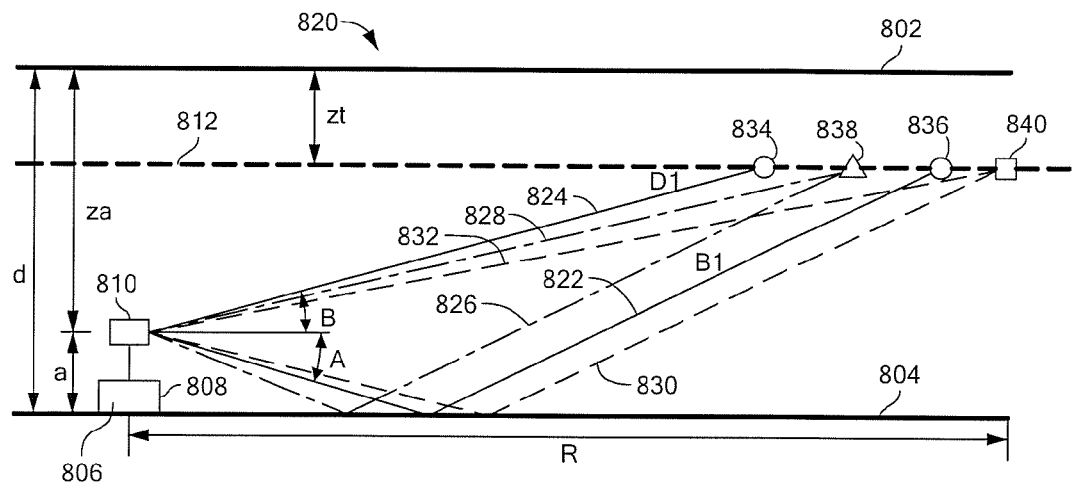
FIG. 20A is a pictorial showing further details of the omnidirectional arrangement of FIG. 20.

Referring now to FIGS. 20 and 20A, scenarios 800, 820 are representative of the processes described above for system that does not use beamforming and that uses autocorrelation of a signal associated with an unidirectional receive beam. As described below, the autocorrelation can result in a correlation feature having a measured time delay associated, for example, with a direct propagation path and a bottom reflected propagation path, which propagation paths are described more fully below Referring first to FIG. 20, a line 802 is representative of a surface of a water basin, for example, a surface of the ocean. A line 804 is representative of a bottom of the water basin. A sonar system 806 is positioned generally at the bottom of the water basin. The sonar system 806 can be the same as or similar to the autonomous sonar system 20a of FIG. 2A. A dashed line 812 is representative of an assumed target depth in accordance with block 624 of FIG. 15.

The sonar system 806 includes a sound sensor 810 coupled to a processor 808. In some embodiments, the sound sensor 810 includes a single receiving element, for example, cylindrical receiving element, adapted to receive sound and to convert the received sound to an electronic signal. In other embodiments, the sound sensor 810 can include more than one receiving element, each adapted to receive sound and to convert the received sound to a respective electronic signal.

Whether the sound sensor 810 is a single receiving element or more than one receiving element, the sound sensor 810 provides a substantially unidirectional receiving beampattern.

It should be understood that various propagation paths described below are shown as straight lines in FIGS. 20 and 20A. Propagation paths shown in FIG. 20 are intended to be associated with an isovelocity propagation model, and therefore, are, in fact, assumed to be straight. However, propagation paths shown in FIG. 20A are represented by straight lines for clarity, but will be understood to be curved, particularly when calculated by a ray trace propagation model as described below.

A first propagation path 814 corresponds to an isovelocity bottom reflected propagation path. A second propagation path 816 corresponds to an isovelocity direct propagation path. The first and second isovelocity propagation paths 814, 816 correspond to the first and second isovelocity propagation paths selected above in conjunction with block 704 of FIG. 17A.

The first and second isovelocity propagation paths 814, 816 intersect at a point 818 at the assumed depth 812 (depth zt), resulting in arrival angles labeled A and B. The arrival angles labeled A and B correspond to the first and second isovelocity arrival angles identified above in conjunction with block 106 of FIG. 17A.

The first and second isovelocity propagation paths 814, 818, the point 818, and the angles labeled A and B can be computed geometrically, for example, by equations below.

$$\text{Direct Path } (D1): SR(D1)^2 = (za-zt)^2 + R^2; \text{ and} \quad (2)$$

$$\text{Bottom Reflected Path } (B1): SR(B1)^2 = (za-zt+2a)^2 + R^2 \quad (3)$$

Where: SR=slant range, and a=d−za and is the height of the sound sensor (e.g., the sound sensor 810 of FIG. 20) above the bottom. For convenience, let h=za−zt. Expanding the above equations and then taking the difference yields:

$$SR(B1)^2 - SR(D1)^2 = 4ha + 4a^2 \quad (4)$$

Next, the above expression can be factored into:

$$(SR(B1)-SR(D1))(SR(B1)+SR(D1)) = 4a(h+a) \quad (5)$$

Now, SR(B1)−SR(D1) is c (the average sound speed) times the time delay tau (τ) (also denoted as TSR(B1)) associated with an identified autocorrelation feature. The quantity, a, is known.

The above equations for SR(D1) and SR(B1) can be rewritten in terms of h and a.

$$\text{Direct Path } (D1): SR(D1) = \sqrt{h^2+R^2} \approx R(1+h^2/2R^2), \quad h^2/R^2 \ll 1 \quad (6)$$

$$\text{Bottom Reflected Path } (B1): SR(B1) = \sqrt{(h+2a)^2+R^2} \approx R[1+(h+2a)^2/2R^2] \quad (7)$$

Often of most interest is a solution for a near-bottom sonar system (e.g. the sonar system 806 of FIG. 20) and for a near-surface target. Therefore, both $h^2+R^2$ and $(h+2a)^2+R^2$ can be approximated by $R^2+d^2$. Then:

$$SR(D1)+SR(B1) \approx 2\sqrt{R^2+d^2} 2(R+d^2/2R^2) \quad (8)$$

This results in an approximate relationship between range, R, and the depth, zt:

$$2(R+d^2/2R^2)c\tau = 4a(a+h) \quad (9)$$

The above expression may be solved as a quadratic. However, the above expression can be further simplified by ignoring the factor, d, when $d^2/R^2 \ll 1$ (e.g., shallow water). This leads to the approximate relationship between the range, R, and the depth, zt:

$$R \approx 2a(h+a)/c\tau \quad (10)$$

A slightly more convenient form of the above result is obtained by noting that h+a=za−zt+a=d−zt; and therefore, the approximate relationship between the range, R, and the depth, zt, becomes:

$$R \approx 2a(d-zt)/c\tau \quad (11)$$

It should be recognized that a computed range, R, identifies the point 818 at the assumed depth 812. Having the range, R, it will be recognized that the angles labeled A and B can be computed geometrically. The geometrically computed angles are described above in conjunction with block 706 of FIG. 17A.

While a geometric calculation involving the bottom reflected path 814 and the direct path 816 is shown above, it will be recognized that similar calculations using other combinations of isovelocity sound paths can yield an isovelocity range and other isovelocity propagation path angles. For example, a surface reflected path and the direct path 816 can be used.

The isovelocity propagation path angles labeled A and B can be used in further estimations described below in conjunction with FIG. 20, in order to find a subsequent starting point, also referred to above as an estimated range/assumed depth, which is associated with the assumed depth 812. However, in accordance with the process described above in FIG. 17B, in some embodiments, the range and assumed depth represented directly by the point 818 can serve as the starting point.

Referring now to FIG. 20A, in which like elements of FIG. 20 are shown having like reference designations, a scenario 820 shows how the angles labeled A and B in FIG. 20 can be used to identify a starting point, i.e., an estimated range/assumed depth, represented by block 628b of FIG. 17A, and how the starting point can be used to identify a resolved range, represented by block 744 for FIG. 18.

A bottom reflected path 822 (first path) and a direct propagation path 824 (second path) are generated using a selected propagation model, for example a ray trace propagation model, using the arrival angles labeled A and B, which were identified from isovelocity propagation paths 814, 816 of FIG. 20. As described above, while the propagation paths 822, 824 are represented by straight lines, it will be recognized that the propagation paths using the selected propagation model need not be straight.

The bottom reflected path 822 results in a point 836 at the assumed depth 812. The direct path 824 results in a point 834 at the assumed depth 812. The two points 834, 836 (ranges) can first be combined in order to find a starting point 838, i.e., an estimated range/assumed depth. The estimated range/assumed depth is described above, for example, in conjunction with block 628 of FIG. 15, block 628a of FIG. 17, block 628b of FIG. 17A, and block 628c of FIG. 17B.

In one particular embodiment, the starting point 838 is selected to be at the midpoint in range between the points 834, 836. In another embodiments, the point 834 is selected to be the starting point. In another embodiment, the point 836 is selected to be the starting point. In another embodiment, the starting point 838 is calculated as another combination of the points 834, 836.

The starting point 838 can be used in conjunction with the selected propagation model, selected, for example at block 732 of FIG. 18, in order to identify a first modified propagation path 826 and a second modified propagation path 828, which both pass through the estimated range/assumed depth starting point 838, as described, for example, in conjunction with blocks 734, 736 of FIG. 18. In accordance with block 738 of FIG. 18, a time delay difference of the first and second modified propagation paths 826, 828 can be computed. In accordance with block 740 of FIG. 18, the time delay difference can be compared with a time delay of an identified correlation feature, which in this case, is a correlation feature in an autocorrelation.

Sound arriving at the sound sensor 810 can be autocorrelated by the sonar system 806, resulting in a correlation feature having a time delay, and amplitude, and a phase, which can be measured, for example, in block 622 of FIG. 15 and block 622b of FIG. 16A. It will be understood that the measured time delay of the correlation feature can correspond to a time delay between an actual (not modeled) bottom-reflected propagation path and an actual direct propagation path.

The above described calculated time delay difference between the propagation paths 826, 828 can be compared to the above-described measured time delay associated with the identified correlation feature. If the time delay difference is too large, the point 838 can be moved in range at the assumed depth 812, for example to the right. At each movement, in accordance with block 742 of FIG. 18, the time delay difference is examined to identify if the time delay difference is sufficiently small, i.e., below a time delay difference threshold. Eventually, after one of more movements of the point 838, a point 840 is identified at which the time delay difference is sufficiently small. The point 840 corresponds to the above-described resolved range/assumed depth identified at block 744 of FIG. 18.

The resolved range/assumed depth 840 has a first resolved propagation path 830 with a first resolved path angle (not labeled) at the sonar system 806 and a second resolved propagation path 832 having a second resolved path angle (not labeled) at the sonar system 806.

It will be appreciated that the point 840 can correspond to but one of a plurality of resolved ranges/assumed depths identified by the process 600 of FIG. 15. One localized angle/localized depth is selected from among the plurality of resolved ranges/assumed depths as described above in conjunction with FIG. 18.

Figure 21:
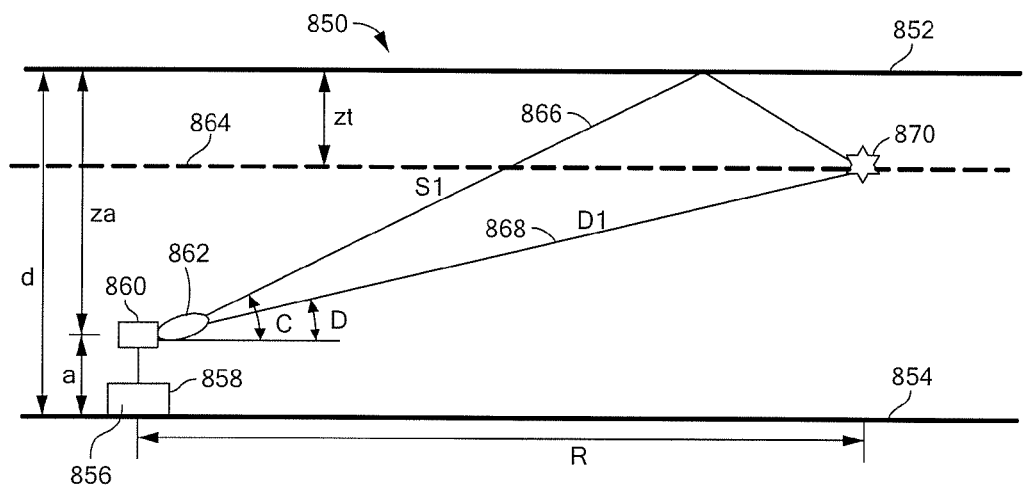
Figure 21A:
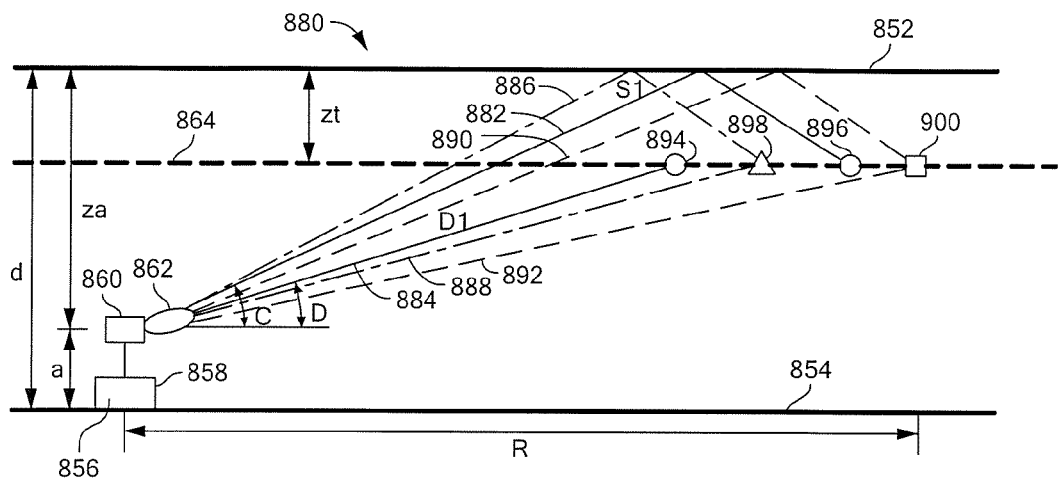
FIG. 21A is a pictorial showing further details of the beamformed arrangement of FIG. 20.

Referring now to FIGS. 21 and 21A, scenarios 850, 880 are representative of the processes described above for system that does uses beamforming and that uses autocorrelation of a signal associated with a directional receive beam. As described below, the autocorrelation can result in a correlation feature having a measured time delay associated, for example, with a direct propagation path and a surface reflected propagation path, which propagation paths are described more fully below Referring first to FIG. 21, a line 852 is representative of a surface of a water basin, for example, a surface of the ocean. A line 854 is representative of a bottom of the water basin. A sonar system 856 is positioned generally at the bottom of the water basin. The sonar system 856 can be the same as or similar to the autonomous sonar system 20a of FIG. 2A. A dashed line 864 is representative of an assumed target depth in accordance with block 624 of FIG. 15.

The sonar system 856 includes a sound sensor 860 coupled to a processor 858. In some embodiments, the sound sensor 860 includes a single receiving element, for example, cylindrical receiving element, adapted to receive sound and to convert the received sound to an electronic signal. In other embodiments, the sound sensor 860 can include more than one receiving element, each adapted to receive sound and to convert the received sound to a respective electronic signal.

Whether the sound sensor 860 is a single receiving element or more than one receiving element, the sound sensor 860 is capable of being used to form at least one receive beam 862. The receive beam 862 can be pointed toward any vertical angle. Here, the beam 862 points upward, in order to receive sound arriving on a surface reflected path and on a direct path. While the beam 862 is shown, processing described below is similar to the scenarios of FIGS. 20 and 20A, and the beam 862 is not used for angle of arrival information.

It should be understood that various propagation paths described below are shown as straight lines in FIGS. 21 and 21A. Propagation paths shown in FIG. 21 are intended to be associated with an isovelocity propagation model, and therefore, are, in fact, assumed to be straight. However, propagation paths shown in FIG. 21A are represented by straight lines for clarity, but will be understood to be curved, particularly when calculated by a ray trace propagation model as described below.

A first propagation path 866 corresponds to an isovelocity surface reflected propagation path. A second propagation path 868 corresponds to an isovelocity direct propagation path. The first and second isovelocity propagation paths 866, 868 correspond to the first and second isovelocity propagation paths selected above in conjunction with block 704 of FIG. 17A.

The first and second isovelocity propagation paths 866, 868 intersect at a point 870 at the assumed depth 864 (depth zt), resulting in arrival angles labeled C and D. The arrival angles labeled C and D correspond to the first and second isovelocity arrival angles identified above in conjunction with FIG. 17A.

The first and second isovelocity propagation paths 866, 870, the point 870, and the angles labeled C and D can be computed geometrically, for example, by equations similar to those described above in conjunction with FIG. 20.

It should be recognized that a computed range, R, identifies the point 870 at the assumed depth 864. Having the range, R, it will be recognized that the angles labeled C and D can be computed geometrically. The geometrically computed angles are described above in conjunction with block 706 of FIG. 17A.

While a geometric calculation involving the surface reflected path 866 and the direct path 868 is shown above, it will be recognized that similar calculations using other combinations of isovelocity sound paths can yield an isovelocity range and other isovelocity propagation path angles. For example, a bottom reflected path and the direct path 868 can be used.

The isovelocity propagation path angles labeled C and D can be used in further estimations described below in conjunction with FIG. 21A, in order to find a subsequent starling point, also referred to above as an estimated range/assumed depth, which is associated with the assumed depth 864. However, in accordance with the process described above in FIG. 17B, in some embodiments, the estimated range and assumed depth, represented directly by the point 870, can serve as the starting point.

Referring now to FIG. 21A, in which like elements of FIG. 21 are shown having like reference designations, a scenario 880 shows how the angles labeled C and D in FIG. 20 can be used to identify a starting point, i.e., an estimated range/assumed depth, represented by block 628*a* of FIG. 17, and how the starting point can be used to identify a resolved range, represented by block 744 for FIG. 18.

A surface reflected path 882 (first path) and a direct propagation path 884 (second path) are generated using a selected propagation model, for example a ray trace propagation model, using the arrival angles labeled C and D, which were identified from isovelocity propagation paths 866, 868 of FIG. 21. As described above, while the propagation paths 882, 884 are represented by straight lines, it will be recognized that the propagation paths using the selected propagation model need not be straight.

The surface reflected path 882 results in a point 896 at the assumed depth 864. The direct path 884 results in a point 894 at the assumed depth 864. The two points 894, 896 (ranges) can first be combined in order to find a starting point 898, i.e., an estimated range/assumed depth. The estimated range/assumed depth is described above, for example, in conjunction with block 628 of FIG. 15, block 628*a* of FIG. 17, block 628*b* of FIG. 17A, and block 628*c* of FIG. 17B.

In one particular embodiment, the starting point 898 is selected to be at the midpoint in range between the points 894, 896. In another embodiments, the point 894 is selected to be the starting point. In another embodiment, the point 896 is selected to be the starting point. In another embodiment, the starting point 898 is calculated as another combination of the points 894, 896.

The starting point 898 can be used in conjunction with the selected propagation model, selected, for example at block 732 of FIG. 18, in order to identify a first modified propagation path 886 and a second modified propagation path 888, which both pass through the estimated range/assumed depth starting point 898, as described, for example, in conjunction with blocks 734, 736 of FIG. 18. In accordance with block 738 of FIG. 18, a time delay difference of the first and second modified propagation paths 886, 888 can be computed. In accordance with block 740 of FIG. 18, the time delay difference can be compared with a time delay of an identified correlation feature, which in this case, is a correlation feature in an autocorrelation.

Sound arriving at the sound sensor 860 can be autocorrelated by the sonar system 856, resulting in a correlation feature having a time delay, an amplitude, and a phase, which can be measured, for example, in block 622 of FIG. 15 and block 622*b* of FIG. 16A. It will be understood that the measured time delay of the correlation feature can correspond to a time delay between an actual (not modeled) surface reflected propagation path and an actual direct propagation path.

The above described calculated time delay difference between the propagation paths 886, 888 can be compared to the above-described measured time delay associated with the identified correlation feature. If the time delay difference is too large, the point 898 can be moved in range at the assumed depth 864, for example to the right. At each movement, in accordance with block 742 of FIG. 18, the time delay difference is examined to identify if the time delay difference is sufficiently small, i.e., below a time delay difference threshold. Eventually, after one of more movements of the point 898, a point 900 is identified at which the time delay difference is sufficiently small. The point 900 corresponds to the above-described resolved range/assumed depth identified at block 744 of FIG. 18.

The resolved range/assumed depth 900 has a first resolved propagation path 890 having a first resolved path angle (not labeled) at the sonar system 856 and a second resolved propagation path 892 having a second resolved path angle (not labeled) at the sonar system 856.

It will be appreciated that the point 900 can correspond to but one of a plurality of resolved ranges/assumed depths identified by the process 600 of FIG. 15. One localized angle/localized depth is selected from among the plurality of resolved ranges/assumed depths as described above in conjunction with FIG. 18.

Figure 22:
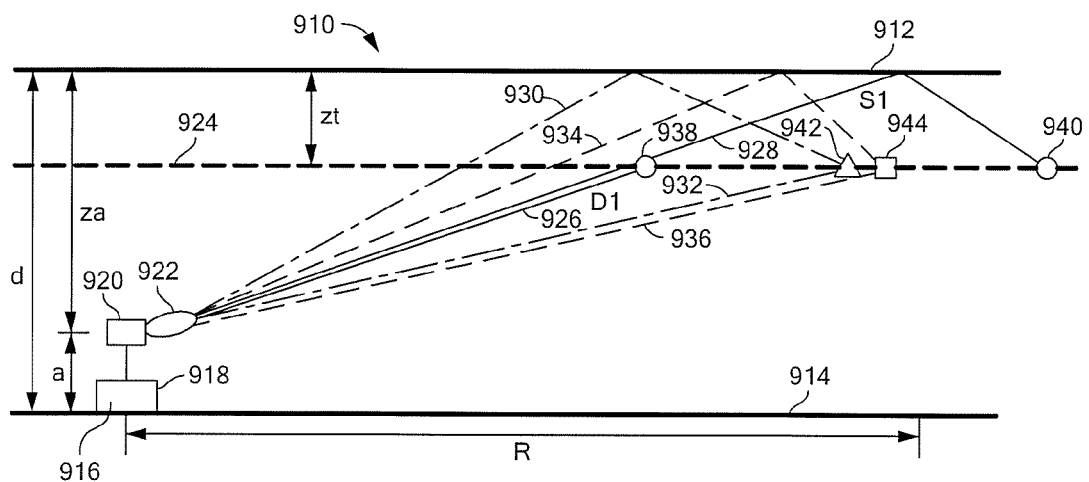

Referring now to FIG. 22, another scenario 910 is similar to that of FIGS. 21 and 21A, except in the description that follows no isovelocity propagation paths will be identified as they were in FIG. 21. The scenario 910 is representative of the processes described above for systems that use beamforming and autocorrelation correlation of a signal received in one acoustic beam.

A line 912 is representative of a surface of a water basin, for example, a surface of the ocean. A line 914 is representative of a bottom of the water basin. A sonar system 916 is positioned generally at the bottom of the water basin. The sonar system 916 can be the same as or similar to the autonomous sonar system 20*a* of FIG. 2A. A dashed line 924 is representative of an assumed target depth in accordance with block 624 of FIG. 15.

The sonar system 916 includes a sound sensor 920 coupled to a processor 918. In some embodiments, the sound sensor 920 includes a single receiving element, for example, cylindrical receiving element, adapted to receive sound and to convert the received sound to an electronic signal. In other embodiments, the sound sensor 920 can include more than one receiving element, each adapted to receive sound and to convert the received sound to a respective electronic signal.

Whether the sound sensor 920 is a single receiving element or more than one receiving element, the sound sensor 920 is capable of being used to form at least one receive beam 922. The receive beam 922 can be pointed toward any vertical angle. Here, the beam 922 points upward, in order to receive sound arriving on a surface reflected path, and on a direct path.

It should be understood that various propagation paths described below are shown as straight lines in FIG. 22. However, the propagation paths shown in FIG. 22 are represented by straight lines for clarity, but will be understood to be curved, particularly when calculated by a ray trace propagation model as described below.

A first propagation path 928 corresponds to a surface reflected path selected in accordance with block 684 of FIG. 17. As described above in conjunction with FIG. 17, the first propagation path 928 is selected using a selected propagation model so that an arrival angle of the first propagation path 928 at the sonar system 916 is near to an improved accuracy arrival angle identified, for example, at block 652 of FIG. 16.

A second propagation path 922 corresponds to a bottom reflected path selected in accordance with block 686 of FIG.

17. As described above in conjunction with FIG. 17, the second propagation path 922 is selected using the selected propagation model so that an arrival angle of the second propagation path 922 at the sonar system 916 is near to an improved accuracy arrival angle identified, for example, at block 652 of FIG. 16, which is the same angle as that provided by the first propagation path 928.

The first and second propagation paths 928, 922, a surface reflected path and a direct path, respectively, are those paths that are first selected in accordance with FIG. 17. The first propagation path 928 results in a calculated point 940 corresponding to a first range to the target at the assumed depth 924, in accordance with block 688 of FIG. 17. Similarly, the second propagation path 922 results in a calculated point 938 corresponding to a second range to the target at the assumed depth 924, in accordance with block 690 of FIG. 17.

The first and second points 940, 938 are used to compute a point 942 corresponding to an estimated range/assumed depth in accordance with block 628a of FIG. 17. The point 942 can be selected to be a midpoint in range between the points 938, 940. However, in other embodiments, the point 942 can be selected to be one of the points 938, 940. In still further embodiments, the point 942 can be selected based upon any function of the positions of the points 938, 940. The point 942 corresponds to the "starting point" described above at block 628a of FIG. 17.

Again using the selected propagation model, and using the point 942, which corresponds to the estimated range/assumed depth calculated at block 628a of FIG. 17, propagation paths 930, 932, which pass though the point 942 can be calculated. Furthermore, a time delay between the propagation paths 930, 932 can be calculated, for example, using the selected propagation model.

Sound arriving in the beam 922 can be autocorrelated by the sonar system 916, resulting in a correlation feature having a time delay, an amplitude, and a phase, which can be measured, for example, in block 622a of FIG. 16. It will be understood that the measured time delay of the correlation feature can correspond to a time delay between an actual (not modeled) surface reflected propagation path and an actual bottom reflected propagation path.

The above described calculated time delay difference between the propagation paths 930, 932 can be compared to the above-described measured time delay associated with the identified correlation feature, which, in this case, is a correlation feature in an autocorrelation. If the time delay difference is too large, the point 942 can be moved in range at the assumed depth 924, for example to the right. At each movement, in accordance with block 742 of FIG. 18, the time delay difference is examined to identify if the time delay difference is sufficiently small, i.e., below a time delay difference threshold. Eventually, after one of more movements of the point 942, the point 944 is identified at which the time delay difference is sufficiently small. The point 944 corresponds to the above-described resolved range/assumed depth identified at block 744 of FIG. 18.

The resolved range/assumed depth 944 has a first resolved propagation path 934 having a first resolved path angle at the sonar system 916 and a second resolved propagation path 936 having a second resolved path angle at the sonar system 916.

It will be appreciated that the point 944 can correspond to but one of a plurality of resolved ranges/assumed depths identified by the process 600 of FIG. 15. One localized angle/localized depth is selected from among the plurality of resolved ranges/assumed depths by the process described above in conjunction with FIG. 18.

Figure 23:
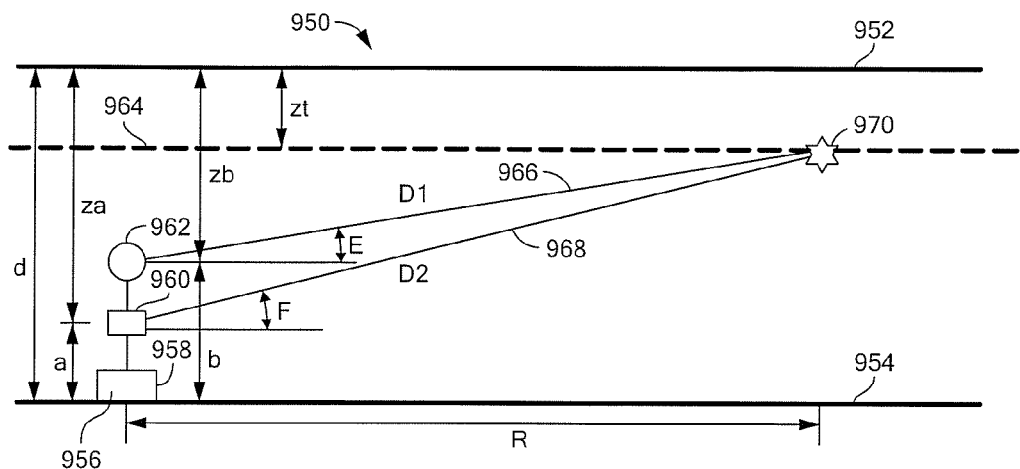
Figure 23A:
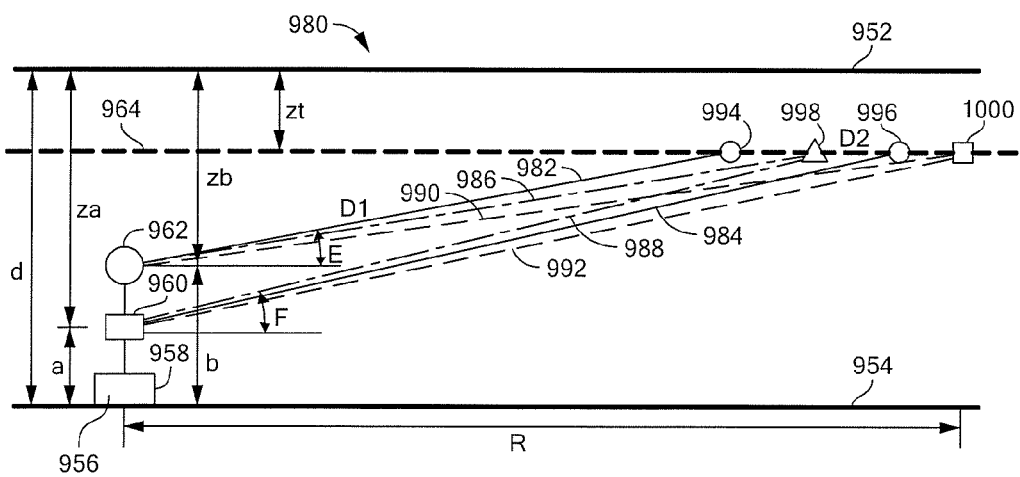
FIG. 23A is a pictorial showing further details of the omnidirectional arrangement of FIG. 23.

Referring now to FIGS. 23 and 23A, scenarios 950, 980 are representative of the processes described above for a system that does not use beamforming and that uses cross correlation of signals associated with two separate omnidirectional receive beams (not shown). The cross correlation can result in a correlation feature having a measured time delay associated, for example, with a first direct propagation path and a second direct propagation path, which propagation paths are described more fully below Referring first to FIG. 23, a line 952 is representative of a surface of a water basin, for example, a surface of the ocean. A line 954 is representative of a bottom of the water basin. A sonar system 956 is positioned generally at the bottom of the water basin. The sonar system 956 can be the same as or similar to the autonomous sonar system 20a of FIG. 2A. A dashed line 964 is representative of an assumed target depth in accordance with block 624 of FIG. 15.

The sonar system 956 includes a first sound sensor 960 and a second sound sensor 962, each coupled to a processor 958. In some embodiments, the sound sensors 960, 962 each include a single receiving element, for example, cylindrical receiving element, adapted to receive sound and to convert the received sound to a respective electronic signal.

The sound sensors 960, 962 are each capable of receiving sound omnidirectionally, i.e., with respective unidirectional or nearly omnidirectional receive beams (not shown). The sound sensors 960, 962 can each receive sound arriving on any propagation path to the sound sensors 960, 962, including, but not limited to, a surface reflected path, a bottom reflected path, and a direct path.

It should be understood that various propagation paths described below are shown as straight lines in FIGS. 23 and 23A. Propagation paths shown in FIG. 23 are intended to be associated with an isovelocity propagation model, and therefore, are, in fact, assumed to be straight. However, propagation paths shown in FIG. 23A are represented by straight lines for clarity, but will be understood to be curved, particularly when calculated by a ray trace propagation model as described below.

A first propagation path 966 corresponds to a first isovelocity direct propagation path. A second propagation path 968 corresponds to a second isovelocity direct propagation path. The first and second isovelocity propagation paths 966, 968 correspond to the first and second isovelocity propagation paths selected above in conjunction with block 704 of FIG. 17A.

The first and second isovelocity propagation paths 966, 968 intersect at a point 970 at the assumed depth 964 (depth zt), resulting in arrival angles labeled E and F. The arrival angles labeled E and F correspond to the first and second isovelocity arrival angles identified above in conjunction with FIG. 17.

The first and second isovelocity propagation paths 966, 968, the point 970, and the angles labeled E and F can be computed geometrically, using techniques similar to those described above in conjunction with FIG. 20.

It should be recognized that the computed range, R, identifies the point 970 at the assumed depth 964. Having the range, R, it will be recognized that the angles labeled E and F can be computed geometrically. The geometrically computed angles are described above in conjunction with block 706 of FIG. 17A.

While a geometric calculation involving the direct paths 966, 968 may be used above, it will be recognized that similar calculations using other combinations of isovelocity sound paths can yield an isovelocity range and other isovelocity propagation path angles. For example, a surface reflected path and the direct path can be used.

The isovelocity propagation path angles labeled E and F can be used in further estimations described below in conjunction with FIG. 23A, in order to find a subsequent starting point, also referred to above as an estimated range/assumed depth, which is associated with the assumed depth 964. However, in accordance with the process described above in FIG. 17B, in some embodiments, the estimated range and assumed depth represented directly by the point 970 can serve as the starting point.

Referring now to FIG. 23A, in which like elements of FIG. 23 are shown having like reference designations, a scenario 980 shows how the angles labeled E and F in FIG. 23 can be used to identify a starting point, i.e., an estimated range/assumed depth, represented by block 628b of FIG. 17A, and how the starting point can be used to identify a resolved range, represented by block 744 for FIG. 18.

A direct propagation path 982 (first path) and a direct propagation path 984 (second path) are generated using a selected propagation model, for example a ray trace propagation model, using the arrival angles labeled E and F, which were identified from isovelocity propagation paths 966, 968 of FIG. 23. As described above, while the propagation paths 982, 984 are represented by straight lines, it will be recognized that the propagation paths using the selected propagation model need not be straight.

The direct path 982 results in a point 994 at the assumed depth 964. The direct path 984 results in a point 996 at the assumed depth 964. The two points 994, 996 (ranges) can first be combined in order to find a starting point 998, i.e., an estimated range/assumed depth. The estimated range/assumed depth is described above, for example, in conjunction with block 628 of FIG. 15, block 628a of FIG. 17, block 628b of FIG. 17A, and block 628c of FIG. 17B.

The starting point 998 can be selected by techniques described above in conjunction with FIG. 19. The starting point 998 can be used in conjunction with the selected propagation model, selected, for example at block 732 of FIG. 18, in order to identify a first modified propagation path 986 and a second modified propagation path 988, which both pass through the estimated range/assumed depth starting point 998, as described, for example, in conjunction with blocks 734, 736 of FIG. 18. In accordance with block 738 of FIG. 18, a time delay difference of the first and second modified propagation paths 986, 988 can be computed. In accordance with block 740 of FIG. 18, the time delay difference can be compared with a time delay of an identified correlation feature.

Sound arriving at the sound sensors 962, 960 can be cross correlated by the sonar system 956, resulting in a correlation feature having a time delay, an amplitude, and a phase, which can be measured, for example, in block 622 of FIG. 15 and block 622b of FIG. 2A. It will be understood that the measured time delay of the correlation feature can correspond to a time delay between an actual (not modeled) direct propagation path and another actual direct propagation path.

The above described calculated time delay difference between the propagation paths 986, 988 can be compared to the above-described measured time delay associated with the identified correlation feature, which, in this case, is a correlation feature in an autocorrelation. If the time delay difference is too large, the point 998 can be moved in range at the assumed depth 964, for example to the right. At each movement, in accordance with block 742 of FIG. 18, the time delay difference is examined to identify if the time delay difference is sufficiently small, i.e., below a time delay difference threshold. Eventually, after one of more movements of the point 998, a point 1000 is identified at which the time delay difference is sufficiently small. The point 1000 corresponds to the above-described resolved range/assumed depth identified at block 744 of FIG. 18.

The resolved range/assumed depth 1000 has a first resolved propagation path 990 with a first resolved path angle (not labeled) at the sonar system 956 and a second resolved propagation path 992 having a second resolved path angle (not labeled) at the sonar system 956.

It will be appreciated that the point 1000 can correspond to but one of a plurality of resolved ranges/assumed depths identified by the process 600 of FIG. 15. One localized angle/localized depth is selected from among the plurality of resolved ranges/assumed depths described above in conjunction with FIG. 18.

Figure 24:
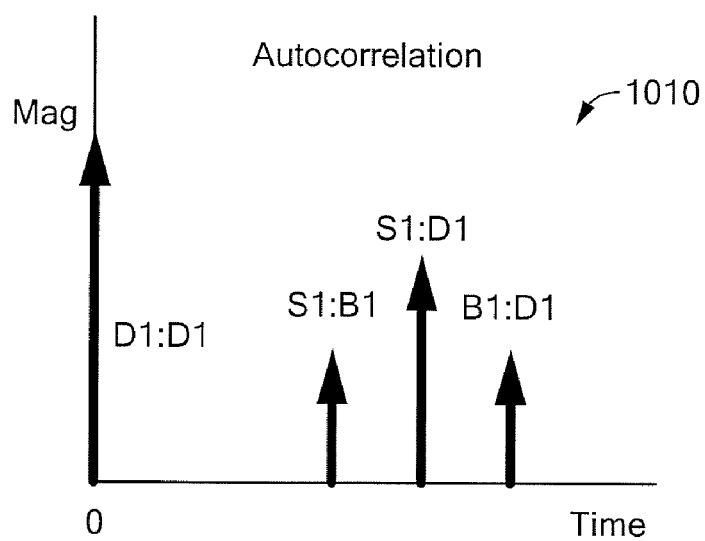

Referring now to FIG. 24, a graph 1010 includes a horizontal scale in units of time in arbitrary units and a vertical scale in units of magnitude in arbitrary units. Features labeled D1, S1:B1, S1:D1, and B1:D1 correspond to correlation feature in an output of an autocorrelation, where S refers to a surface reflected propagation path, D refers to a direct propagation path, and B refers to a bottom reflected propagation path. Therefore, for example, S1:B1 refers to a correlation feature associated with a propagation path pair corresponding to a surface reflected propagation path and a bottom reflected propagation path.

While three correlation features are shown, it should be understood that there can be other correlation features corresponding to other combinations of propagation paths.

Figure 25:
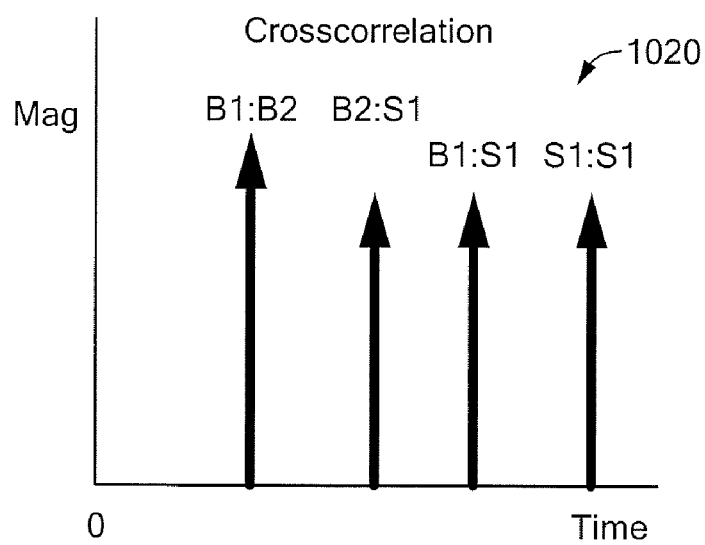

Referring now to FIG. 25, a graph 1020 includes a horizontal scale in units of time in arbitrary units and a vertical scale in units of magnitude in arbitrary units. Features labeled B1:B2, B2:S1, B1:S1, and S1:S1 correspond to correlation feature in an output 1010 of a cross correlation, where S refers to a surface reflected propagation path, D refers to a direct propagation path, B refers to a bottom reflected propagation path, 1 refers to a path to a first sound sensor or array, and 2 refers to a path to a second sound sensor or array. Therefore, for example B1:B2 refers to a correlation feature associated with a propagation path pair corresponding to a bottom reflected propagation path to a first sound sensor and a bottom reflected propagation path to a second sound sensor.

While four correlation features are shown, it should be understood that there can be other correlation features corresponding to other combinations of propagation paths.

Figure 26:
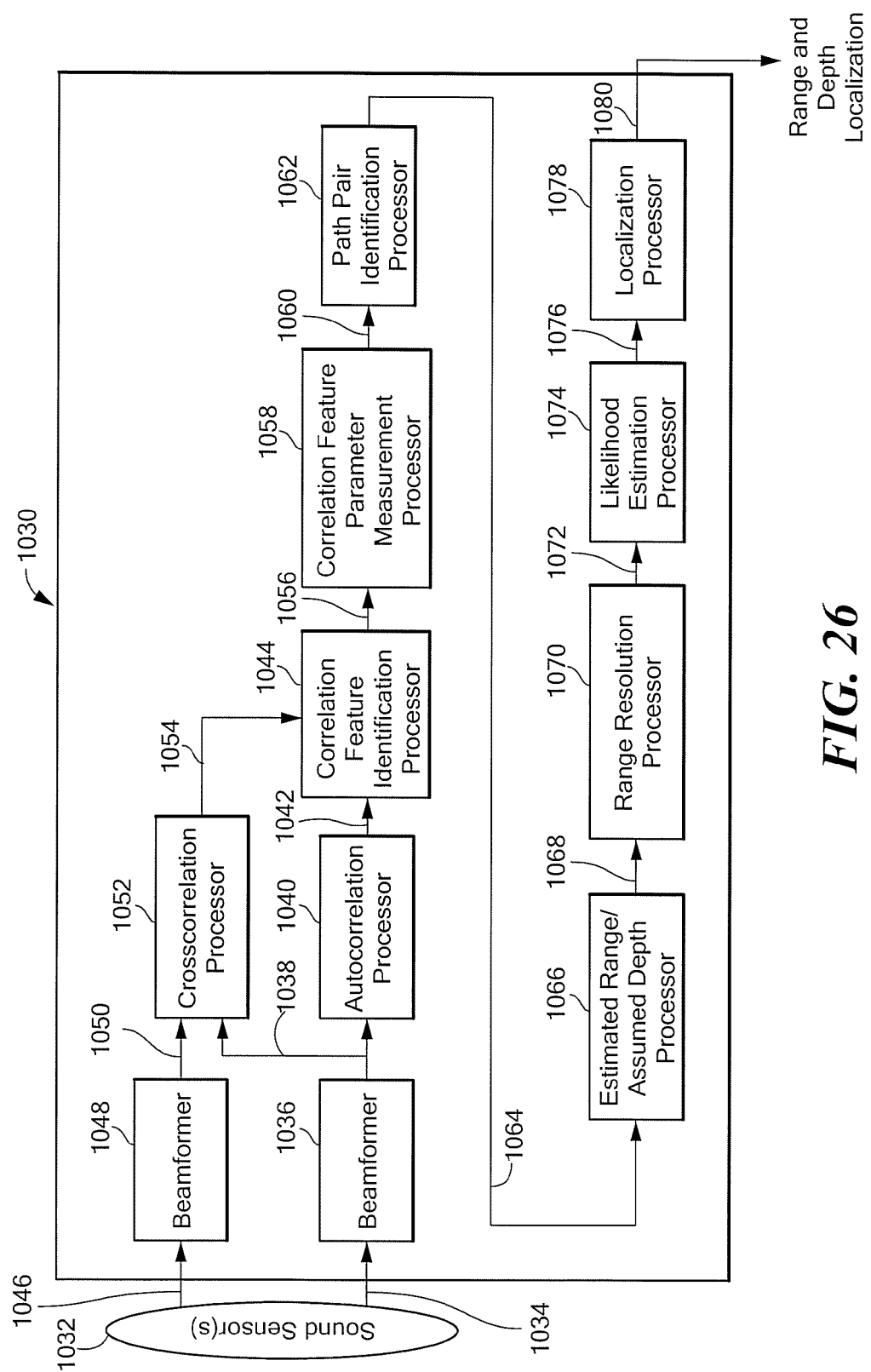

Referring now to FIG. 26, a sonar system 1030 can be the same as or similar to any of the sonar system 756, 806, 856, 916, 956 of FIGS. 19-23A. The sonar system 1030 can also be the same as or similar to the modules 92, 136 of FIG. 3, in combination with beamforming modules 60, 70, 128 and the receiving array 52 shown in FIG. 3. The sonar system 1030 can include one or more sound sensors 1032 adapted to generate electronic signals 1034, 1046 in response to a received sound signal.

The sonar system can include a beamformer 1036 coupled to the one or more sound sensors 1032 and adapted to generate a beamformed signal 1038. An autocorrelation processor 1040 is adapted to generate a correlation signal 1042 in response to the beamformed signal 1038. A correlation feature identification processor 1044 is adapted to identify a correlation feature 1056 in the correlation signal 1042. A correlation feature parameter measurement processor 1058 is adapted to measure a parameter of the identified correlation feature 1056 and to generate measured correlation feature values 1060. A path pair identification processor 1062 is adapted to assume a depth of the target and adapted to select a propagation path pair 1064 associated with the identified correlation feature 1056 and with the assumed depth. An estimated range/assumed depth processor 1066 is adapted to estimate a range of the target 1068 at the assumed depth using the identified propagation path pair 1064. A range resolution processor 1070 is adapted to process the estimated range 1068 of the target at the assumed depth to provide a resolved range 1072 of the target at the assumed depth and an associated first resolved propagation path pair 1072. A likelihood estimation processor 1074 is adapted to assign a likelihood factor 1076 to the resolved range 1072 of the target at the assumed depth. A localization processor 1078 is adapted to process the likelihood factor 1078 and to generate a localization signal 1080, which localizes the target in depth and in range based upon the likelihood factor 1078.

In some embodiments, the sonar system 1030 also includes another beamformer 1048 coupled to the one or more sound sensors 1032 and adapted to generate another beamformed signal 1038. A cross correlation processor 1052 is adapted to generate a correlation signal 1054 associated with the beamformed signals 1050, 1038. The correlation feature identification processor 1044 is adapted to identify another correlation feature 1056 in the correlation signal 1054.

Figure 27:
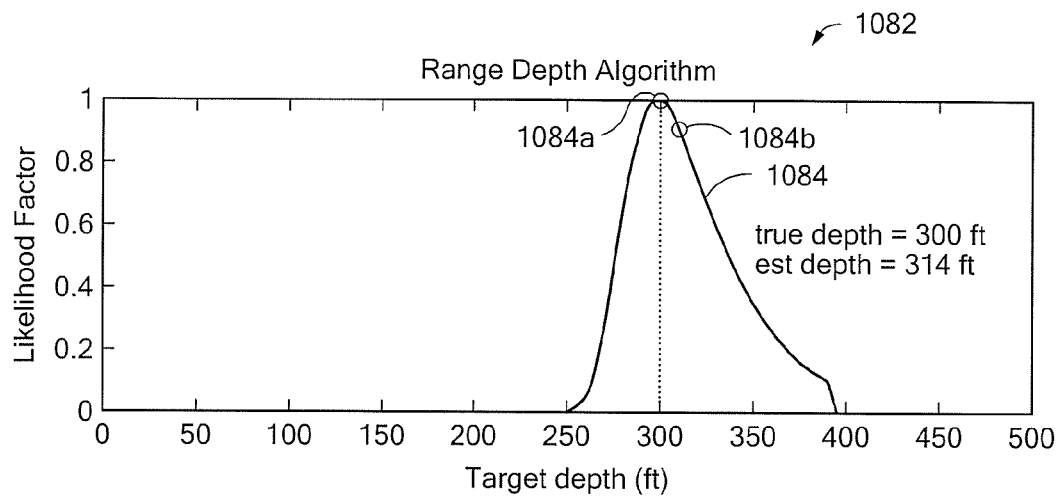
Figure 28:
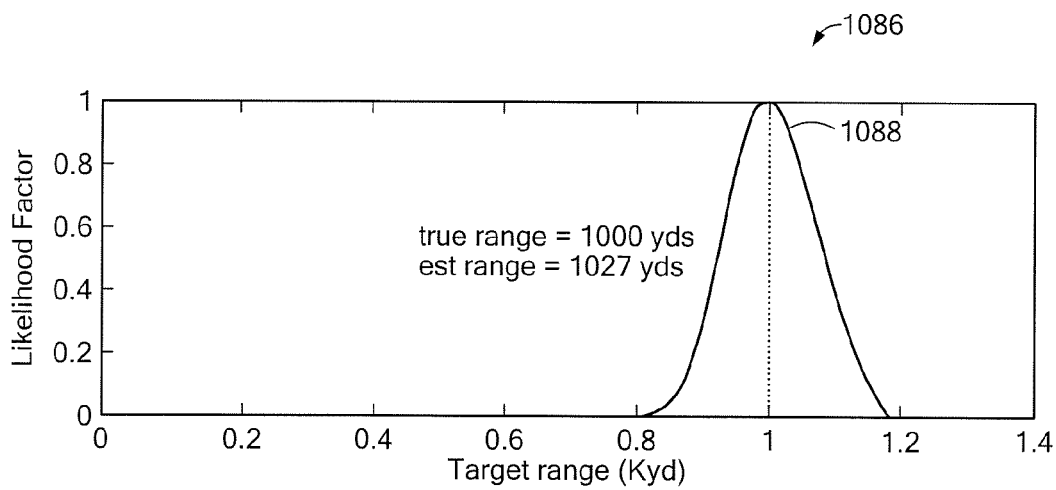
Figure 29:
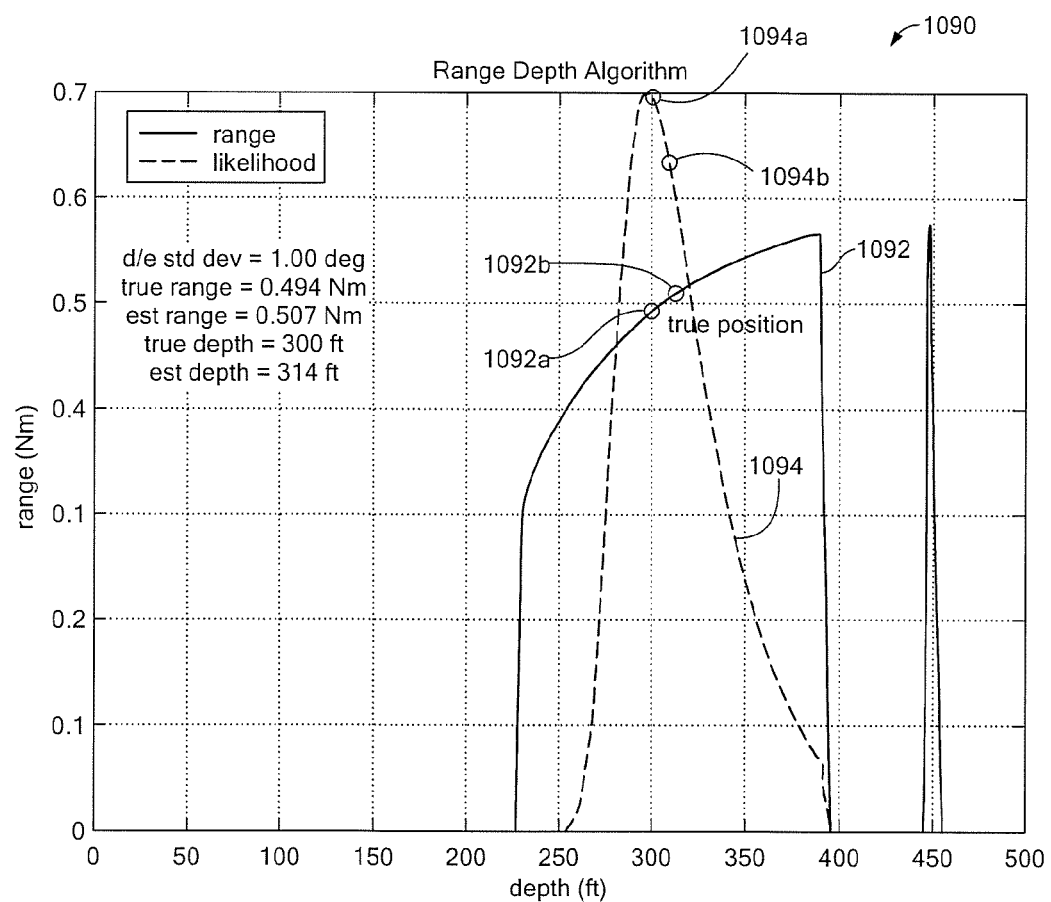

FIGS. 27-29 present results for an illustrative case. However, before turning to FIGS. 27-29, some general background discussion is presented.

The above-described likelihood factor is a measure of the quality of a solution for range and depth. In some embodiments, the likelihood factor is formed by a multiplicative chain of likelihood factors (also referred to below as quality factors). The quality factors can be associated with a system, measurement, or solution constraint. In one arrangement described above, an angle likelihood (quality) factor can be indicative of the likelihood of a valid solution based on a measured angle, a calculated angle, and an uncertainty associated with the measurement and/or calculation. In another arrangement described above, a quality factor can be determined in conjunction with a set of assumed arrival path-pairs being matched to a set of correlation time delay measurements. In this arrangement, the quality factor is related to the variance of the multiple estimates of source range. Another likelihood factor can be a combination, for example, a product, of the above likelihood factors.

Referring now to FIG. 27, a graph 1082 includes a horizontal scale in units of target depth in feet and a vertical scale in units of the above described likelihood factor. A curve 1084 shows (a simulation of) a normalized likelihood for the above-described assumed depths, computed by summing the likelihood factors over all resolved range/ray path pair combinations for each assumed depth, each resolved range computed by the process of FIG. 15, and each one of normalized likelihood factors plotted against its associated target depth. The curve 1084 is non-symmetrical and has a peak at three hundred feet target depth, typified by a point 1084a. A weighted average of the curve 1084 occurs at approximately three hundred fourteen feet, typified by a point 1084b.

In some embodiments, the peak depth at three hundred feet can be used as the localized target depth. However, in other embodiments, the depth of three hundred fourteen feet can be used as the localized target depth.

Referring now to FIG. 28, a graph 1086 includes a horizontal scale in units of target range in kiloyards (Kyds) and a vertical scale in units of the above described likelihood factor. A curve 1088 shows (a simulation of) a normalized target range likelihood factor as a function of target range. This normalized range likelihood factor is computed from the distribution of the likelihood factors of the above-described resolved ranges/assumed depths computed by the process 600 of FIG. 15. The curve 1088 is non-symmetrical and has a peak at one kiloyard target range. A weighted average of the curve 1088 occurs at approximately 1.027 kiloyards.

In some embodiments, the peak range at one kiloyard can be used as the localized range. However, in other embodiments, the range of 1.027 kiloyards can be used as the localized target range.

Referring now to FIG. 29, a graph 1090 includes a horizontal scale in units of target depth in feet and a vertical scale in units of target range in nautical miles (Nm) and a vertical scale in units of the above described likelihood factor. A curve 1092 shows (a simulation of) the joint variation of the above-described resolved ranges/assumed depths computed by the process of FIG. 15, plotted in range and in depth.

The curve 1092 shows (a simulation of) average resolved target range, computed by a likelihood factor weighted average over all path pair combinations for each of the above-described assumed depths computed by the process 600 of FIG. 15. A curve 1094 shows (a simulation of) the un-normalized depth likelihood factor of each one of the target depths plotted against its associated assumed depth, in accordance with the curve 1084 (scaled) of FIG. 27. As described above in conjunction with FIG. 27, the curve 1094 is non-symmetrical and has a peak at three hundred feet target depth, typified by a point 1094a. A weighted average of the curve 1094 occurs at approximately three hundred fourteen feet, typified by a point 1094b.

The point 1094a aligns on the curve 1092 with a point 1092a at a target range of 0.494 nautical miles (1000 yards). The point 1094b aligns on the curve 1092 with a point 1092b at a target range of 0.507 nautical miles (1027 yards).

In some embodiments, the peak at three hundred feet can be used as the localized depth and the corresponding range of 0.497 nautical miles can be used as the localized target range. However, in other embodiments, the depth of three hundred fourteen feet can be used as the localized target depth and the corresponding range of 0.507 nautical miles can be used as the localized target range, which are generated by the above described weighted averages.

The graphs 1082, 1086, 1090 of FIGS. 27, 28, 29, respectively, are indicative of but one way in which the resolved ranges/assumed depths and the likelihood factors associated therewith generated by the process 600 of FIG. 15 can be combined to achieve a localized range and localized depth of the target. Other techniques can also be used without departure from the present invention.

The detection provided by detection of envelope modulation on noise modules 86, 146 of FIG. 3 are described more fully below in conjunction with FIGS. 30-33.

Figure 30:
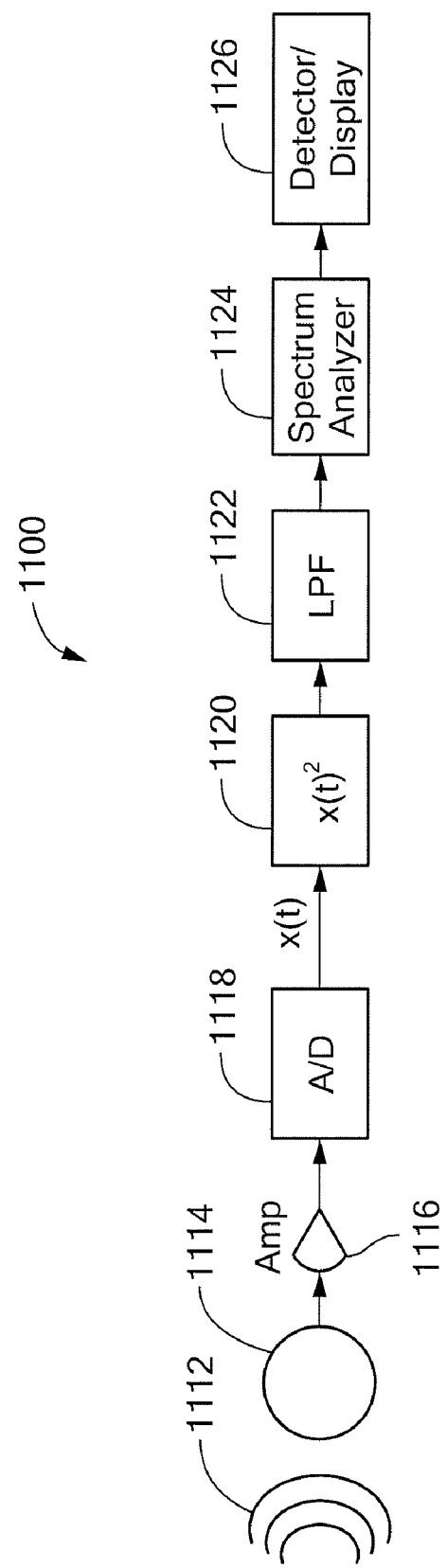

Referring to FIG. 30, a conventional "detection of envelope modulation on noise" system 1100 includes a hydrophone 1114 adapted to receive underwater sound 1112. The hydrophone 1114 can be an omnidirectional hydrophone, which has substantially the same sensitivity to sound received from all spatial directions. The hydrophone 1114 generates a signal in response to the sound signal 1112. The signal is preprocessed, for example, by an amplifier 1116. The amplifier 1116 is coupled to an analog to digital (A/D) converter 1118, which generates a signal x(t), which is comprised of digital time samples of the preprocessed signal.

The signal x(t) can be processed to identify the above-described amplitude modulation of the received sound 1112. One of ordinary skill in the art will recognize a variety of circuits that can be used to identify the amplitude modulation of the received sound 1112. In one conventional arrangement, the signal x(t) can be processed by a "square law" detector, including a squaring module 1120 and a low pass filter (LPF)

module 1122. An output signal generated by the low pass filter 1122 is representative of the envelope of (i.e., the amplitude modulation of) the received sound signal 1112.

The output signal generated by the low pass filter module 1122 can be analyzed by a spectrum analyzer 1124, for example, a Discrete Fourier Transform (DFT). It will be understood that the spectrum analyzer 1124 provides a frequency domain signal (e.g., one or more frequency spectra) representative of frequency content of the envelope of the received sound signal 1112. The frequency spectra generated by the spectrum analyzer 1124 can be further processed and displayed by a detector/display module 1126. For example, the detector/display module 1126 can display the frequency spectra in a waterfall type display (not shown). The detector/display module 1126 can also detect and analyze spectral lines present in the frequency spectra. The detector/display module 1126 can be the same as or similar to the data processing module 112 of FIG. 3.

It is possible to determine a propeller shaft rate (revolutions per second (rps)) and a number of propeller blades of a detected vessel by analyzing the frequency spectra. From the shaft rate and the number of propeller blades it is often possible to identify the type of vessel and whether the vessel is a surface vessel or a submarine.

In general, a fundamental frequency of the frequency domain signal (frequency spectra) generated by the spectrum analyzer 1124 in Hz corresponds to the propeller shaft rate of the unknown vessel in revolutions per second. Furthermore, the number of propeller blades can be determined from frequencies and relative amplitudes of harmonic signal components in the frequency domain signal generated by the spectrum analyzer 1124.

The "detection of envelope modulation on noise" system and methods described above are often able to detect and to classify a vessel. However, in general, it is always desirable to improve detection performance, localization performance, and/or classification performance of a sonar system.

Referring now to FIG. 31, an exemplary system 1150 includes first and second sound sensors 1152a, 1152b, respectively. The first and second sound sensors 1152a, 1152b can be omnidirectional hydrophones, each of which has substantially the same sensitivity to sound received from all spatial directions. The first and second sound sensors 1152a, 1152b can be physically separated by at least a correlation distance, which will be understood by one of ordinary skill in the art. However, in other arrangements, the sound sensors 1152a, 1152b can be separated by less than a correlation distance.

The first sound sensor 1152a generates a signal 1154a, which is received by an amplifier 1156a. The amplifier 1156a generates an amplified signal 1158a, which is received by an analog to digital (A/D) converter 1160a. The A/D converter 1160a generates a first digital signal 1162a, which is comprised of digital time samples $x_1(t)$ (referred to herein as a first electrical signal) representative of a sound signal received by the first sound sensor 1152a.

The second sound sensor 1152b generates a signal 1154b, which is received by an amplifier 1156b. The amplifier 1156b generates an amplified signal 1158b, which is received by an analog to digital (A/D) converter 1160b. The A/D converter 1160b generates a second digital signal 1162b, which is comprised of digital time samples $x_2(t)$ (referred to herein as a second electrical signal) representative of a sound signal received by the second sound sensor 1152b.

The first and second electrical signals 1162a, 1162b, respectively, are received by a cross-correlation module 1164. The cross-correlation module 1164 cross correlates the two signals 1162a, 1162b resulting in a correlation signal 1166.

Cross-correlation of time sampled signal x(t) and y(t) can be described by the following relationship:

$$X\mathrm{Corr}(\tau)=1/N|\Sigma(x(t)*y(t-\tau))|$$

where:
$t=t_1 \ldots t_N$=time sample times
$\tau=\tau_1 \ldots \tau_N$=correlation function times (correlation time delays)
N=number of time samples From the above expression, it should be understood that the time samples 1 to N of the signals x(t) and y(t) are multiplied together and summed at each correlation time, $\tau$, resulting in one correlation value for each correlation time, $\tau$. The correlation time is then changed and the multiplication and sum is repeated. A plurality of correlation values are thus obtained, each correlation value associated with a corresponding correlation time.

The correlation signal 1166 will be understood to have a time delay scale and an amplitude scale, when graphically represented. In particular, for certain relative time delays applied between the signals $x_1(t)$ and $x_2(t)$, the correlation signal 1166 may have relatively high correlation magnitudes, also referred to herein as correlation peaks.

The correlation signal 1166 is received by a peak detector module 1168, which is operable to identify correlation peaks. In some arrangements, the peak detector module 1168 uses a threshold, and portions of the correlation signal 1166 that are above the threshold are deemed to be correlation peaks.

The peak detector 1168 generates a time delay output signal 1170 representative of a time delay used by the cross correlation module 1164 that produces the highest magnitude correlation peak in the correlation signal 1166. The time delay output signal 1170 is received by a time delay module 1172, which applies a time delay to the first electrical signal $x_1(t)$ corresponding to the time delay signal 1170, in order to generate a time delayed first electrical signal 1174, $x_1(t-T)$.

The time delayed first electrical signal 1174 and the second electrical signal 1162b are received by a cross-correlation module 1176. The cross-correlation module 76 operates with only one correlation time delay by the following expression:

$$X\mathrm{Corr}(T)=1/N|\Sigma(x(t)*y(t-T))|$$

where:
$t=t_1 \ldots t_N$=time sample times
$\tau$=single time delay T
N=number of time samples Therefore, the cross-correlation module 1176 operates as a multiplication and summing (multiplication/summing) module 1176, which multiplies the two signals 1174, 1162b, (e.g., time samples 1 to N), resulting in a plurality of product values, and which sums the plurality of product values, resulting in a summed-product value. The multiplication/summing module 1176 repeats the multiplication and summation for other portions (e.g., time samples 10 to N+10, etc.) of the two signals 1174, 1162b, resulting in a summed-product signal 1178 having a plurality of summed-product values.

The summed-product signal 1178 can be received by an optional low pass filter module 1180, which can generate a filtered signal 1182. The filtered signal 1182, or in other arrangements, the summed-product signal 1178, can be received by a spectrum analyzer 1184. The spectrum analyzer 1184 can generate a frequency domain signal 1186 (or frequency spectrum). A detector/display 188 can receive the frequency domain signal 1186, and can present the frequency domain signal in a display, for example, in a waterfall display. However, the detector/display module 1188 can be the same as or similar to the data processing module 112 of FIG. 3.

It will be appreciated that the time delay, T, can be a positive or a negative time delay relative to the second electrical signal 1162*b*. It will also be appreciated that a negative time delay, T, applied to the first electrical signal 1162*a* is equivalent to a positive time delay applied to the second electrical signal 1162*b*. The time delay, T, is shown to be applied to only the first electrical signal 1162*a* for clarity.

Referring now to FIG. 31A, in which like elements of FIG. 31 are shown having like reference designations, a system 1200 includes a first array 1202*a* and a second array 1202*b*, the array centers of which are physically separated by at least a correlation distance, which will be understood by one of ordinary skill in the art.

The arrays 1202*a*, 1202*b* can be any form of arrays formed by a plurality of array elements. For example, the arrays 1202*a*, 1202*b* can be line arrays, planar arrays, or volumetric arrays, each of which is capable of generating spatial receiving beams. The arrays 1202*a*, 1202*b* need not be the same form of array. The arrays 1202*a*, 1202*b* also need not have the same number of acoustic array elements.

Signals 1204*aa*-1204*a*N from acoustic elements of the first array 1202*a* are received and amplified by amplifiers 1206*aa*-1206*a*N, respectively, resulting in amplified signals 1208*aa*-1208*a*N. The amplified signals 1208*aa*-1208*a*N are received by A/D converters 1210*aa*-1210*a*N, respectively, resulting in intermediate signals 1212*aa*-1212*a*N, respectively. The intermediate signals 1212*aa*-1212*a*N are received by a first beamformer 1214*a*. The first beamformer 1214*a* combines the intermediate signals 1212*aa*-1212*a*N so as to generate a first beamformed signal 1216*a*, which is comprised of digital time samples $x_1(t)$ (referred to herein as a first electrical signal) representative of a sound signal received by the first array 1202*a* from a first (beamformed) spatial direction.

Similarly, signals 1204*ba*-1204*b*M from acoustic elements of the second array 1202*b* are received and amplified by amplifiers 1206*ba*-1206*b*M, respectively, resulting in amplified signals 1208*ba*-1208*b*M. The amplified signals 1208*ba*-1208*b*M are received by A/D converters 1210*ba*-1210*b*M, respectively, resulting in intermediate signals 1212*ba*-1212*b*M, respectively. The intermediate signals 1212*ba*-1212*b*M are received by a second beamformer 1214*b*. The second beamformer 1214*b* combines the intermediate signals 1212*ba*-1212*b*M so as to generate a second beamformed signal 1216*b*, which is comprised of digital time samples $x_2(t)$ (referred to herein as a second electrical signal) representative of a sound signal received by the second array 1202*b* from a second (beamformed) spatial direction.

The first and second spatial directions can be the same spatial directions, or they can be different spatial directions. In some arrangements, the first and second spatial directions are changed from time to time, for example, during sequential processing cycles, so that the system 1200 processes signals from a first pair of spatial directions, then from another pair of spatial directions, and so forth.

It will be apparent that the first and second electrical signals 1216*a*, 1216*b* ($x_1(t)$ and $x_2(t)$), respectively, are processed by the same elements 1164-1188 described above in conjunction with FIG. 31, and therefore, those elements are not discussed again.

It should be appreciated from the discussion of FIGS. 31 and 31A that a system can be constructed, which has one omnidirectional sound sensor, e.g. 1152*a* or 1152*b* of FIG. 31, in combination with one array, e.g., 1202*a*, or 1202*b*. Therefore, in one arrangement, the array 1202*a*, the amplifiers 1206*aa*-1206*a*N, the A/D converters 1208*aa*-1208*a*N and the beamformer 1214*a* can be replaced by the sound sensor 1152*a*, the amplifier 1156*a*, and the A/D converter 1160*a* of FIG. 31. In another arrangement, the array 1202*b*, the amplifiers 1206*ba*-1206*b*M, the A/D converters 1208*ba*-1208*b*M and the beamformer 1214*b* can be replaced by the sound sensor 1152*b*, the amplifier 1156*b*, and the A/D converter 1160*b* of FIG. 31.

Figure 31B:
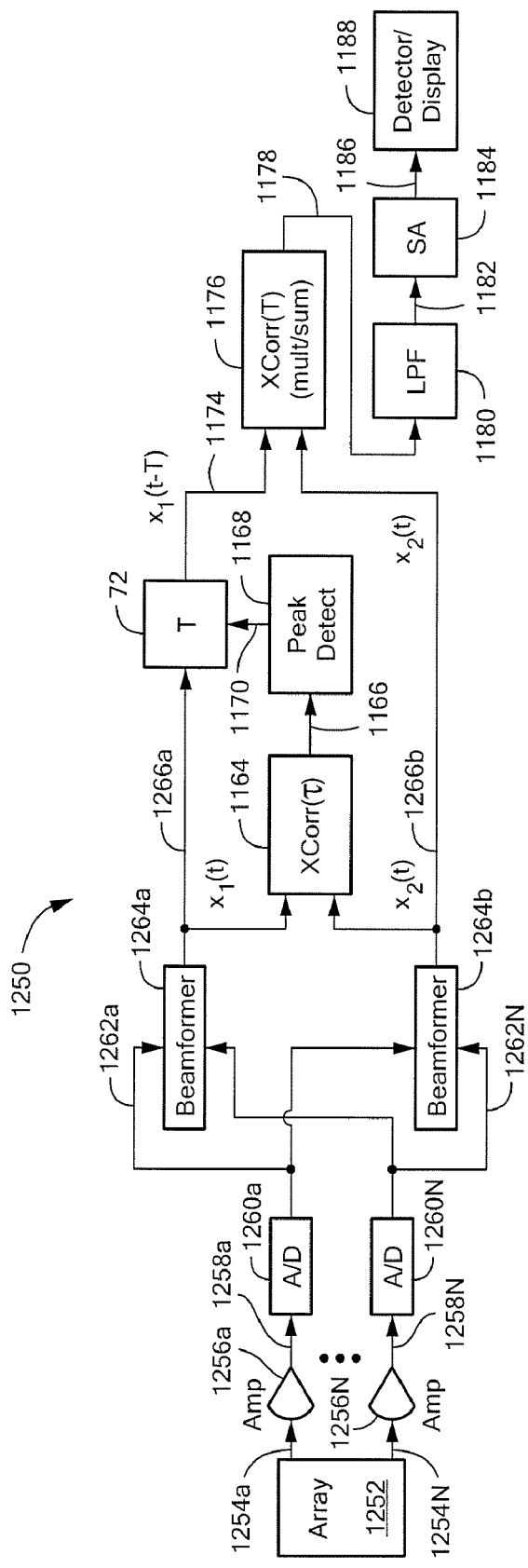
FIG. 31B is a block diagram showing a system having one array, the system adapted to perform dual-channel modulation detection (DCMD)

Referring now to FIG. 31B, in which like elements of FIG. 31 are shown having like reference designations, a system 1250 includes one array 1252. The array 1252 can be any form of array formed by a plurality of array elements. For example, the array 1252*a* can be a line array, a planar array, or a volumetric array, each of which are capable of generating spatial receiving beams.

Signals 1254*a*-1254N from acoustic elements of the first array 1252 are received and amplified by amplifiers 1256*a*-1256N, respectively, resulting in amplified signals 1258*a*-1258N. The amplified signals 1258*a*-1258N are received by A/D converters 1260*a*-1260N, respectively, resulting in intermediate signals 1262*a*-1262N, respectively. The intermediate signals 1262*a*-1262N are received by a first beamformer 1264*a*. The first beamformer 1264*a* combines the intermediate signals 1262*a*-1262N so as to generate a first beamformed signal 1266*a*, which is comprised of digital time samples $x_1(t)$ (referred to herein as a first electrical signal) representative of a sound signal received by the array 1252 from a first (beamformed) spatial direction. The intermediate signals 1262*a*-1262N are also received by a second beamformer 1264*b*. The second beamformer 1264*b* combines the intermediate signals 1262*a*-1262N so as to generate a second beamformed signal 1266*b*, which is comprised of digital time samples $x_2(t)$ (referred to herein as a second electrical signal) representative of a sound signal received by the array 1252 from a second (beamformed) spatial direction.

The first and second spatial directions can be the same spatial direction or different spatial directions. In some arrangements, the first and second spatial directions are changed from time to time, for example, during sequential processing cycles, so that the system 1250 processes signals from a first pair of spatial directions, then from another pair of spatial directions, and so forth.

It will be apparent that the first and second electrical signals 1266*a*, 1266*b* ($x_1(t)$ and $x_2(t)$), respectively, are processed by the same elements 1164-1188 described above in conjunction with FIG. 31, and therefore, those elements are not discussed again.

Figures 32, 32A:
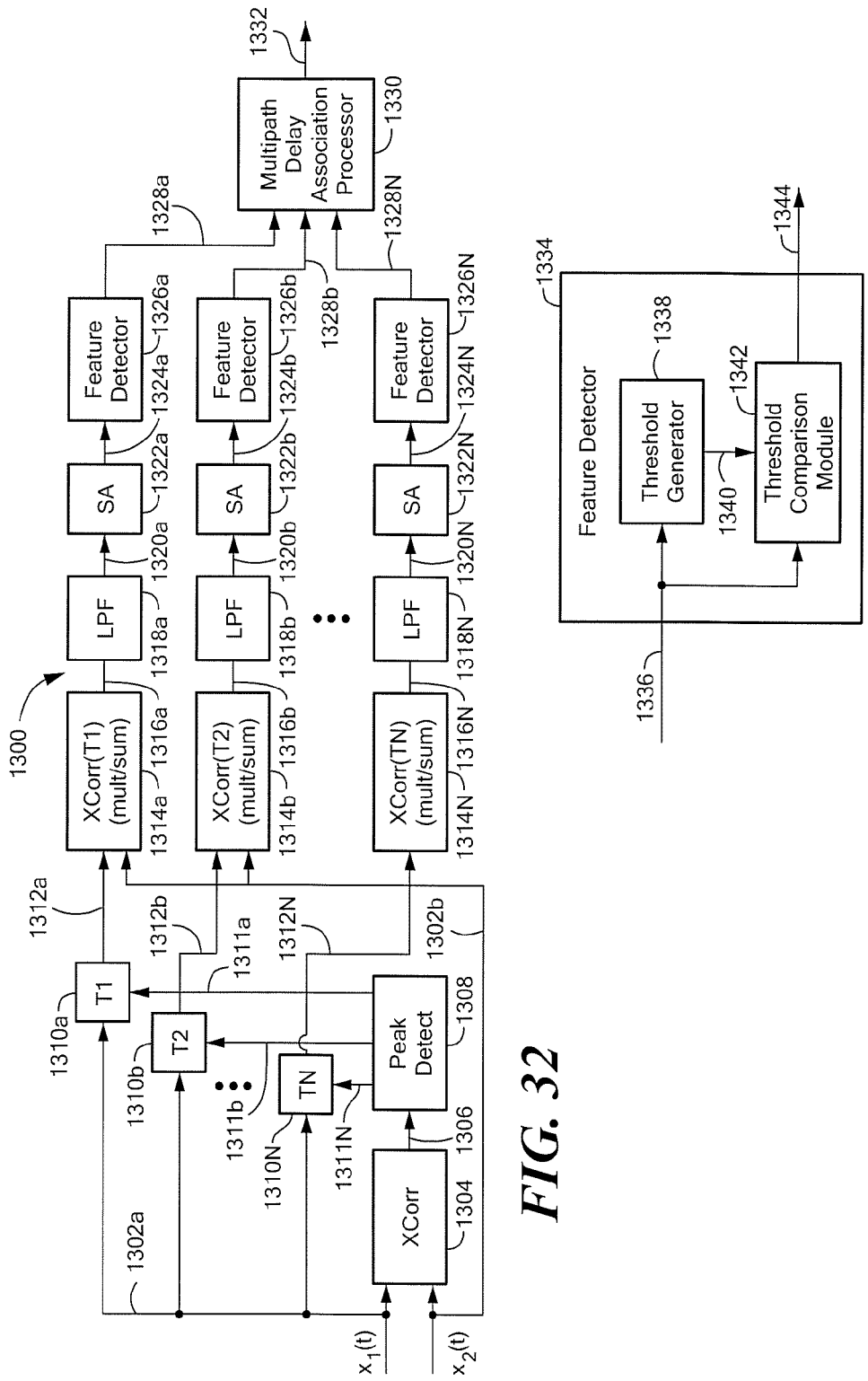

Referring now to FIG. 32, the first and second electrical signals, $x_1(t)$ and $x_2(t)$ of any of the above-described systems 1150, 1200, 1250 of FIGS. 31, 31A, and 31B, respectively, can be processed by the system portion 1300, instead of or in addition to the system portions shown in those figures. The signals $x_1(t)$ and $x_2(t)$ can be received by a cross-correlation module 1304, the same as or similar to the cross-correlation module 1164 of FIGS. 31-31B. The cross-correlation module 1304 generates a correlation signal 1306 accordingly. The correlation signal 1306 is received by a peak detector module 1308. The peak detector module 1308 is adapted to identify two or more peaks in the correlation signal 1306, unlike the peak detector modules 1168 of FIGS. 31-31B, which, in some embodiments, identifies only a largest correlation peak. In some arrangements, the peak detector module 1308 uses a threshold, and portions of the correlation signal 1306 that are above the threshold are deemed to be correlation peaks.

As will be understood, each identified correlation peak is associated with a time delay, here T1, T2, . . . TN. Time delay signals 1311*a*-1311N generated by the peak detector module

1308 are applied to time delay modules 1310a-1310N, respectively, and the time delay modules 1310a-1310N apply time delays T1-TN, respectively, to the first electric signal 1302a, resulting in time delayed first electrical signals 1312a-1312N, respectively.

The time delayed first electrical signals 1312a-1312N and the second electrical signal 1302b are received by respective cross-correlation modules 1314a-1314N. The cross-correlation modules 1314a, 1314N each operate with only one correlation time delay. Therefore, the cross correlation modules 1314a-1314N operate as multiplication and summing (multiplication/summing) modules 1314a-1314N, respectively, each one of which multiplies and sums respective values in a process the same as or similar to that described above for the multiplication/summing module 1176 of FIG. 31, resulting in summed-product signals 1316a-1316N, respectively, each having a respective plurality of summed-product values.

The summed-product signals 1316a-1316N can be received by optional low pass filter modules 1318a-1318N, respectively, which can generate filtered signals 1320a-1320N, respectively. The filtered signals 1320a-1320N, or in other arrangements, the summed-product signals 1316a-1316N, can be received by spectrum analyzers 1322a-1322N, respectively. The spectrum analyzers 1322a-1322N can generate frequency domain signals 1324a-1324N (or frequency spectra), respectively. The frequency domain signals 1324a-1324N can be received by feature detectors 1326a-1326N, respectively. Each one of the feature detectors 1326a-1326N can identify one or more features (e.g., spectral lines) in a respective frequency domain signal 1324a-1324N, resulting in feature signals 1328a-1328N, respectively. A multipath delay association processor 1330 can receive two or more of the feature signals 1328a-1328N.

Operation of the multipath delay association processor 1330 will be better understood from the discussion below in conjunction with FIG. 33. However, let it suffice here to say that the delay association processor 1330 can identify similarities among the feature signal 1328a-1328N, and therefore, can identify which of the frequency spectra 11324a-1324N were likely to have originated from the same vessel. The multipath delay association processor can generate an association signal 1332 accordingly, which can be used by further processing (not shown) in order to detect, localize, and classify the vessel. The association signal 1332 can be provided to the data processing module 112 of FIG. 3.

The multipath delay association processor 1330 can also apply Doppler corrections to the feature signals 1328a-1328N. The Doppler corrections are discussed more fully below in conjunction with FIG. 33.

Referring now to FIG. 32A, a feature detector 1334 can be the same as or similar to one of the feature detectors 1326a-1326N of FIG. 32. The feature detector 1334 can include a threshold generator 1338 coupled to receive a frequency domain signal 1336, which can be the same as or similar to one of the frequency domain signals 1324a-1324N of FIG. 32. The threshold generator 1338 can generate a threshold signal 1340. A threshold comparison module 1340 can receive the threshold signal 1340 and the frequency domain signal 1336 and can compare the frequency domain signal 1336 with the threshold signal 1340, resulting in a feature signal 1344, which can be the same as or similar to one of the feature signals 1328a-1328N of FIG. 32.

The threshold generator 1338 can select a threshold in a variety of ways. For example, the threshold generator 1338 can select a signal threshold level based upon an average of the frequency domain signal 1336. In other arrangements, the threshold generator 1338 can select a threshold to be a predetermined number of decibels above the frequency domain signal (excluding spectra line or features) across a frequency band. In yet other an arrangements, the threshold generator 1338 can select a threshold to be a predetermined number of decibels above the frequency domain signal (excluding spectra line or features) across a frequency band (e.g., one to ten Hz) and another predetermined number of decibels above the frequency domain signal in another frequency band (e.g., ten to twenty Hz). In some arrangements, the above-described predetermined numbers of decibels are statically defined and in other arrangements, the predetermined numbers of decibels are dynamically defined. For example, the predetermined numbers of decibels can be related to a variance across a band of the frequency domain signal 1336, such that a higher variance results in a higher predetermined number of decibels.

Figure 33:
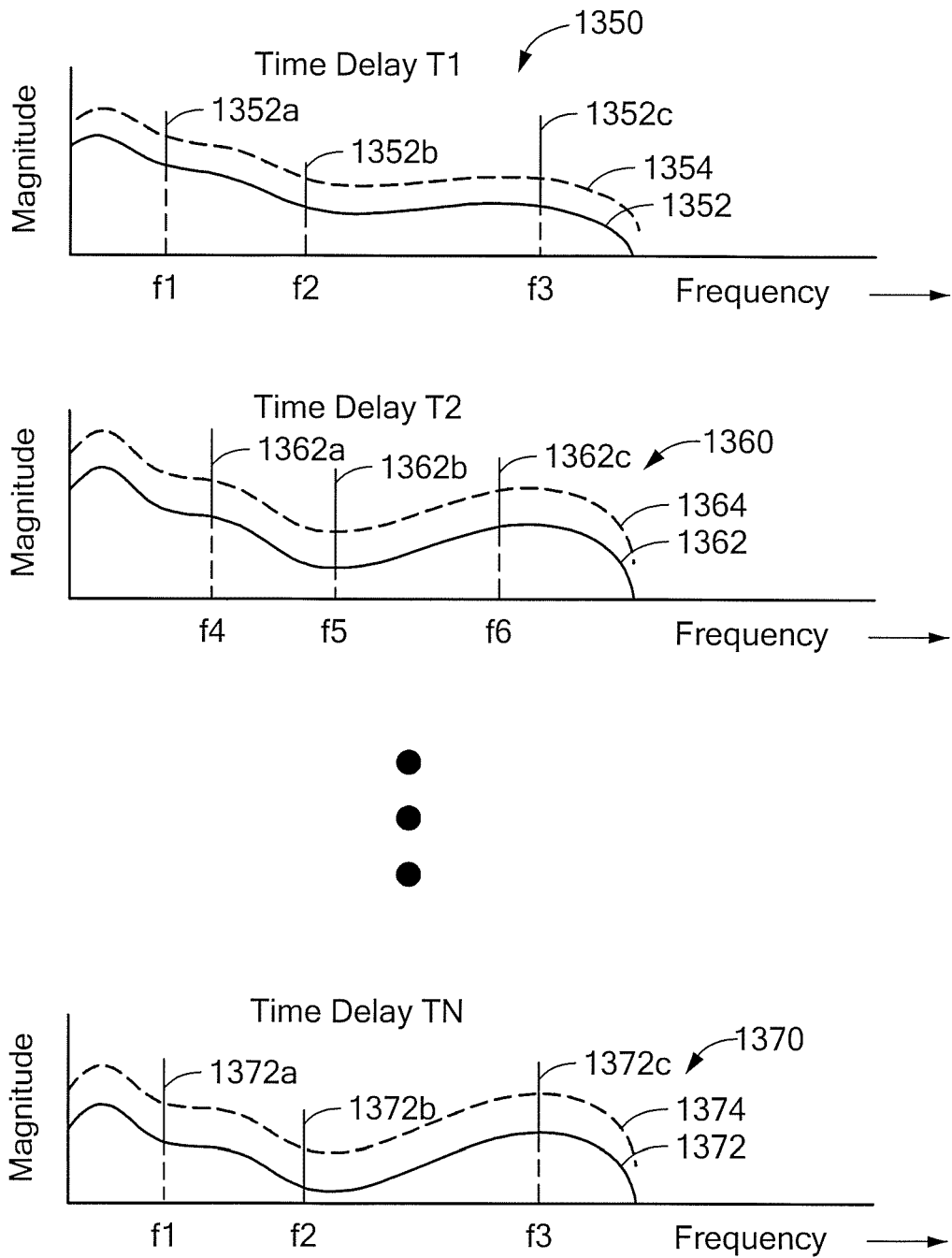

Referring now to FIG. 33, graphs 1350, 1360, 1370 include horizontal scales in units of frequency in Hz and vertical scales in units of amplitude in arbitrary units. A curve 1352 is indicative of a frequency domain signal, for example, the frequency domain signal 1324a of FIG. 32. A curve 1364 is indicative of a threshold generated by and used by the feature detector 1326a of FIG. 32. Spectral lines 1352a, 1352b, 1352c are indicative of features detected by the feature detector 1326a, which are above the threshold 1354.

A curve 1362 is indicative of another frequency domain signal, for example, the frequency domain signal 1324b of FIG. 32. A curve 1364 is indicative of another threshold generated by and used by the feature detector 1326b of FIG. 32. Spectral lines 1362a, 1362b, 1362c are indicative of features detected by the feature detector 1326b, which are above the threshold 1364.

A curve 1372 is indicative of another frequency domain signal, for example, the frequency domain signal 1324N of FIG. 32. A curve 1374 is indicative of another threshold generated by and used by the feature detector 1326N of FIG. 32. Spectral lines 11372a, 1372b, 1372c are indicative of features detected by the feature detector 1326N, which are above the threshold 1374.

It will be apparent that the features 1352a, 1352b, 1352c, which occur at frequencies f1, f2, and f3, have similarity to the features 1372a, 1372b, 1372c, which can also occur at (or near) the frequencies f1, f2, and f3. Therefore, the multipath delay association processor 1330 of FIG. 32 can identify that the two spectra 1352 and 1372 likely originated from the same vessel, whereas the spectrum 1362, which has spectral lines at different frequencies, did not.

The frequencies of the features 1352a, 1352b, 1352c need not be at exactly the same frequency as the features 11372a, 1372b, 1372c in order to identify that sound signal associated with the features 1352a, 1352b, 1352c originated from the same vessel as the features 1372a, 1372b, 1372c. For example, in some arrangements, a calculated or predetermined frequency ratio threshold is used, so that the features 1352a, 1352b, 1352c are deemed to have come from the same vessel as the features 1372a, 1372b, 1372c if frequency ratios between corresponding features (1352a and 1372a, 1352b and 1372b, 1352c and 1372c) are less than the calculated or predetermined frequency ratio threshold. In some arrangements, more than one calculated or predetermined frequency ratio threshold is used, so that the frequency ratios between features 1352a and 1372a, 1352b and 1372b, 1352c and 1372c must meet different threshold criteria in order to deem that the spectra 1352 and 1372 originated from the same vessel. Use of calculated or predetermined frequency ratio thresholds is particularly useful in view of Doppler shifts and corrections thereof described more fully below.

It will be appreciated that each one of the spectra 1352, 1362, 1372 can be associated with a particular respective time delay. For example, the spectrum 1352 can be associated with the time delay T1 of FIG. 32, the spectrum 1362 can be associated with the time delay T2, and the spectrum 1372 can be associated with the time delay TN. It will be further understood that each one of the time delays T1-TN of FIG. 32 is associated with a particular propagation path of sound as it traverses from a vessel to one of the systems 1150, 1200, 1250, 1300 of FIG. 2, 2A, 2B, or 3.

As is known, sound travels in a variety of paths as it traverses through water. For example, on a direct path, D, the sound travels directly from a source to a receiver. On a surface reflected path (SR), the sound travels from the source to the ocean surface, where it generally reflects, traveling downward to the sound receiver. On a bottom reflected path, BR, the sound travels from the source to the ocean bottom, where it generally reflects, traveling upward to the sound receiver. On each path, the sound experiences a different time delay and possibly a phase shift. Knowledge of the relative time delays may be used to identify a depth of the sound source, i.e., and the vessel. Therefore, knowledge of the time delays, the associated propagation paths, and the associated receive angles of sound propagating from the vessel to the sound receiver can be used not only to distinguish a submarine from a surface vessel, but also to localize a depth, and in some cases, a range, to the vessel.

As mentioned above, some methods and systems that can be used to localize the vessel in range and/or in depth are described, for example in U.S. Pat. No. 7,315,488, entitled Methods and Systems for Passive Range and Depth Localization, issued Jan. 1, 2008, which application is incorporated herein by reference in its entirety.

While the spectral lines at the frequencies f1, f2, and f3 in the spectrum 1352 are shown to be the same frequencies f1, f2, and f3 in the spectrum 1372, it should be recognized that the frequencies, which arrive on different sound paths and therefore on different angles, may be differently affected by Doppler shift resulting from a relative speed between the detected vessel and the platform on which the systems 1150, 1200, 1250, or 1300 are disposed. It will also be understood that an absolute frequency shift due to the Doppler effect is proportional to the frequency of a feature. However, because the multipath delay association processor 1330 of FIG. 32 has knowledge of the spectral feature time delays, the associated sound propagation paths, and therefore, the arrival angle of the sound on the sound paths, in some arrangements, the multipath delay association processor 1330 operates to adjust the feature signals 1328a-1328N according to one or more estimated relative speeds between the detected vessel and the platform on which the sonar system is disposed. For each estimated relative speed, the frequency of the adjusted spectral features can be compared.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

Additionally, the software included as part of the invention may be embodied in a computer program product that includes a computer-readable storage medium. For example, such a computer-readable storage medium can include a readable memory device, such as a hard drive device, a CD-ROM, a DVD-ROM, or a computer diskette, having computer readable program code segments stored thereon. A computer-readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. An autonomous acoustic signal processing system, comprising:
a vertical beamformer coupled to receive a plurality of hydrophone signals from a corresponding plurality of hydrophones responsive to sound in water, wherein the vertical beamformer is configured to form a plurality of vertical receive beam signals, the plurality of vertical receive beam signals representative of a respective plurality of acoustic receive beams non-directional in azimuth and directional in elevation;
an azimuth beamformer coupled to receive the plurality of vertical receive beam signals and configured to form a plurality of directional receive beam signals, the plurality of directional receive beam signals representative of a respective plurality of acoustic receive beams directional in azimuth and directional in elevation;
a loud target detection module coupled to receive the plurality of directional receive beam signals and configured to generate detections and to determine directions of one or more loud targets associated with the plurality of directional receive beam signals; and
a matrix module coupled to receive the plurality of vertical receive beam signals, coupled to receive the detections of the one or more loud targets, coupled to receive the directions of the one or more loud targets, configured to generate a covariance matrix in accordance with the plurality of vertical receive beam signals, and further configured to generate a non-inverted modified covariance matrix based upon the covariance matrix and in accordance with the detections of and directions of the loud targets.

2. The autonomous system of claim 1, further comprising:
an adaptive azimuth beamformer coupled to receive the modified covariance matrix, coupled to receive the plurality of vertical receive beam signals, and configured to form a plurality of adaptively directional receive beam signals in accordance with the modified covariance matrix, wherein the plurality of adaptively directional receive beam signals are representative of a respective plurality of adaptively directional acoustic receive beams directional in azimuth and directional in elevation with a respective plurality of adaptively directional nulls, wherein the plurality of adaptively directional nulls are adaptively directed toward the directions of the one or more loud targets; and
a quiet target detection module coupled to receive the plurality of adaptively directional receive beam signals and configured to generate detections of and directions of one or more quiet targets associated with the plurality of adaptively directional receive beam signals.

3. The system of claim 2, further comprising at least one vertical arrival angle estimation module coupled to receive the plurality of directional receive beam signals or the plurality of adaptively directional receive beam signals, and configured to generate estimates of vertical angles of arrival of received sound from the one or more loud targets or from the one or more quiet targets.

4. The system of claim 3, further comprising at least one bearing/range/depth estimation module coupled to receive the plurality of directional receive beam signals or the plurality of adaptively directional receive beam signals, coupled to receive the estimates of vertical angles of arrival of received sound, and configured to generate estimated ranges, estimated depths, and estimated bearings of the one or more loud targets or of the one or more quiet targets.

5. The system of claim 4, further comprising a two-dimensional detection module coupled to receive the estimated ranges and the estimated bearings of the one or more loud targets or of the one or more quiet targets, configured to generate two-dimensional tracks of the one or more loud targets or of the one or more quiet targets in bearing and in range, configured to process the two-dimensional tracks, and configured to generate detections of the one or more loud targets or of the one or more quiet targets in accordance with a characteristic of the two-dimensional tracks.

6. The system of claim 5, further comprising a three-dimensional tracking module coupled to receive the two-dimensional tracks, coupled to receive the detections from the two-dimensional detection module, coupled to receive the estimated depths of the one or more loud targets or the estimated depths of the one or more quiet targets, and configured to generate three-dimensional tracks of the one or more loud targets or of the one or more quiet targets in azimuth bearing, in range, and in depth.

7. The system of claim 6, further comprising a data processing module coupled to receive the three-dimensional tracks, wherein the data processing module is configured to process the three-dimensional tracks and to assign a respective classification to one of the three-dimensional tracks according to the processing.

8. The system of claim 7, wherein the data processing module includes a propagation model module configured to convert received signal levels within the plurality of directional receive beam signals or within the plurality of adaptively directional receive beam signals associated with the three dimensional tracks to corresponding source levels, wherein the data processing module is configured to combine the source levels with the classifications.

9. The system of claim 7, further comprising a DEMON module coupled to receive the plurality of directional receive beam signals or the plurality of adaptively directional receive beam signals, and configured to identify frequencies of one or more acoustic spectral lines indicative of a propeller associated with the one or more loud targets or with the one or more quiet targets, wherein the data processing module is further coupled to receive the frequencies of one or more acoustic spectral lines associated with the propeller, and wherein the data processing module is further configured to calculate a probability that one of the three-dimensional tracks is associated with a submarine based upon the identified frequencies of the one or more acoustic spectral lines associated with the propeller.

10. The system of claim 7, further comprising a classification and reporting module coupled to receive the classification and to generate a classification report.

11. The system of claim 10, further comprising a communications module coupled to receive the one or more classification reports and configured to communicate the classification report to a receiving station.

12. A computer-implemented method of autonomous acoustic signal processing, comprising:
forming a plurality of vertical receive beam signals using a plurality of hydrophone signals, the plurality of vertical receive beam signals representative of a respective plurality of acoustic receive beams non-directional in azimuth and directional in elevation;
forming a plurality of directional receive beam signals using the plurality of vertical receive beam signals, the plurality of directional receive beam signals representative of a respective plurality of acoustic receive beams directional in azimuth and directional in elevation;
generating detections of and directions of one or more loud targets associated with the plurality of directional receive beam signals;
generating a covariance matrix in accordance with the plurality of vertical receive beam signals; and
generating a non-inverted modified covariance matrix based upon the covariance matrix and in accordance with the detections of and directions of the loud targets.

13. The method of claim 12, further comprising:
forming a plurality of adaptively directional receive beam signals in accordance with the modified covariance matrix, wherein the plurality of adaptively directional receive beam signals are representative of a respective plurality of adaptively directional acoustic receive beams directional in azimuth and directional in elevation with a respective plurality of adaptively directional nulls, wherein the plurality of adaptively directional nulls are adaptively directed toward the directions of the one or more loud targets; and
generating detections of and directions of one or more quiet targets associated with the plurality of adaptively directional receive beam signals.

14. The method of claim 13, further comprising generating estimates of vertical angles of arrival of received sound from the one or more loud targets or from the one or more quiet targets.

15. The method of claim 14, further comprising generating estimated ranges, estimated depths, and estimated bearings of the one or more loud targets or of the one or more quiet targets.

16. The method of claim 15, further comprising:
generating two-dimensional tracks of the one or more loud targets or of the one or more quiet targets in bearing and in range;
processing the two-dimensional tracks; and
detecting the one or more loud targets or the one or more quiet targets in accordance with a characteristic of the two-dimensional tracks.

17. The method of claim 16, further comprising generating three-dimensional tracks of the one or more loud targets or of the one or more quiet targets in bearing, in range, and in depth.

18. The method of claim 17, further comprising:
processing the three-dimensional tracks; and
assigning a respective classification to one of the three-dimensional tracks according to the processing.

19. The method of claim 18, further comprising:
measuring received signal levels within the plurality of directional receive beam signals or within the plurality of adaptively directional receive beam signals associated with the three dimensional tracks;
converting the measured received signal levels to corresponding source levels; and
using the source levels, combined with measured target speed, to generate the classification.

20. The method of claim 18, further comprising:
identifying frequencies of one or more acoustic spectral lines indicative of a propeller associated with the one or more loud targets or associated with the one or more quiet targets; and using the frequencies of the one or more spectral lines to generate the classification.

21. The method of claim 18, further comprising generating a classification report in accordance with the classification.

22. The method of claim 21, further comprising communicating the classifications report to a receiving station.

23. The sonar system of claim 1, wherein the modified covariance matrix is formed by artificially placing two very loud synthetic sources in two respective directions on either side of one of the loud targets.

24. The method of claim 12, wherein the generating the modified covariance matrix comprises artificially placing two very loud synthetic sources in two respective directions on either side of one of the loud targets.

* * * * *